United States Patent
Turkistani

(10) Patent No.: US 6,759,489 B1
(45) Date of Patent: Jul. 6, 2004

(54) FLUIDIZED BED METHODS FOR MAKING POLYMERS

(75) Inventor: Nabil M. Turkistani, Jubail Industrial (SA)

(73) Assignee: Eastern Petrochemical Co., Jubail Industrial (SA)

( * ) Notice: Subject to any disclaimer, the term of this patent is extended or adjusted under 35 U.S.C. 154(b) by 0 days.

(21) Appl. No.: 10/441,379

(22) Filed: May 20, 2003

(51) Int. Cl.⁷ .................................................. C08F 2/34
(52) U.S. Cl. ........................... 526/68; 526/59; 526/61; 526/67; 526/348.5; 526/348.6
(58) Field of Search ............................. 526/59, 61, 67, 526/68, 348.5, 348.6

(56) References Cited

U.S. PATENT DOCUMENTS

| | | | |
|---|---|---|---|
| 3,627,129 A | 12/1971 | Hartmann et al. | 209/474 |
| 3,931,134 A | 1/1976 | Hartmann et al. | 260/93.7 |
| 4,543,399 A | 9/1985 | Jenkins, III et al. | 526/70 |
| 4,547,616 A | 10/1985 | Avidan et al. | 585/640 |
| 4,557,264 A | 12/1985 | Hinsch | 128/335.5 |
| 4,588,790 A | 5/1986 | Jenkins, III et al. | 526/70 |
| 4,710,538 A | 12/1987 | Jorgensen | 525/53 |
| 4,746,762 A | 5/1988 | Avidan et al. | 585/415 |
| 4,827,069 A | 5/1989 | Kushnerick et al. | 585/415 |
| 4,858,144 A * | 8/1989 | Marsaly et al. | 364/494 |
| 4,877,587 A | 10/1989 | Rhee et al. | 422/135 |
| 4,933,149 A | 6/1990 | Rhee et al. | 422/131 |
| 5,269,807 A | 12/1993 | Liu | 606/228 |
| 5,352,749 A | 10/1994 | DeChellis et al. | 526/68 |
| 5,405,922 A | 4/1995 | DeChellis et al. | 526/68 |
| 5,436,304 A | 7/1995 | Griffin et al. | 526/68 |
| 5,453,471 A | 9/1995 | Bernier et al. | 526/68 |
| 5,462,999 A | 10/1995 | Griffin et al. | 526/68 |
| 5,521,264 A | 5/1996 | Mehra et al. | 526/68 |
| 5,541,270 A | 7/1996 | Chinh et al. | 526/68 |
| 5,621,046 A | 4/1997 | Iwanami et al. | 525/240 |
| 5,698,642 A | 12/1997 | Govoni et al. | 526/65 |
| 5,712,352 A | 1/1998 | Brant et al. | 526/68 |
| 5,712,353 A | 1/1998 | Poirot et al. | 526/88 |
| 5,733,510 A | 3/1998 | Chinh et al. | 422/143 |
| 5,804,677 A | 9/1998 | Chinh et al. | 526/68 |
| 5,834,571 A | 11/1998 | Bernier et al. | 526/68 |
| 6,001,938 A | 12/1999 | Chinh et al. | 526/68 |
| 6,063,877 A * | 5/2000 | Kocian et al. | 526/61 |
| 6,096,840 A | 8/2000 | Bernier et al. | 526/68 |
| 6,113,862 A | 9/2000 | Jorgensen et al. | 422/142 |
| 6,117,399 A | 9/2000 | Jorgensen et al. | 422/142 |
| 6,143,843 A | 11/2000 | Bresch | 526/68 |
| 6,218,484 B1 | 4/2001 | Brown et al. | 526/68 |
| 6,384,156 B1 | 5/2002 | Bernier et al. | 526/88 |
| 6,384,157 B1 | 5/2002 | Cai et al. | 526/88 |
| 6,391,985 B1 * | 5/2002 | Goode et al. | 526/70 |
| 6,403,730 B1 | 6/2002 | Mutsers | 526/68 |
| 2001/0024625 A1 | 9/2001 | Olson et al. | 422/139 |

FOREIGN PATENT DOCUMENTS

| | | |
|---|---|---|
| EP | 0 089 691 | 9/1983 |
| EP | 0 359 444 A1 | 3/1990 |
| GB | 1398965 | 6/1975 |
| WO | WO 01/94900 A1 | 12/2001 |

OTHER PUBLICATIONS

Al–Zahrani et al., Bed *expansion and average bubble rise velocity in a gas–solid fluidized bed*, Powder Technology 87:255–7, 1996.

Bai et al., *Characterization of gas fluidization regimes using pressure fluctuations*, Powder Technology 87:105–111, 1996.

Burdett et al., *Recent Developments in Fluidized–Bed Process for Olefin Polymerization*, presented at the AIChE Annual Meeting, Miami, FL, Nov. 15–20, 1998.

Cai et al., *Effect of Operating Temperature and Pressure on the Transition from Bubbling to Turbulent Fluidization*, Fluidization and Fluid Particle Systems: Fundamentals and Applications 270(85)37–43, 1989.

Cai et al., *Mechanism of Flow Regime Transition from Bubbling to Turbulent Fluidization*, AIChE Journal 36(6)955–6, 1990.

Chehbouni et al., *Characterization of the Flow Transition Between Bubbling and Turbulent Fluidization*, Ind. Eng. Chem. Res. 33(8)1889–1896, 1994.

Lee et al., *Pressure Fluctuations in Turbulent Fluidized Beds*, Journal of Chem. Eng'g of Japan 21(5) 515–521, 1988.

Rhodes, *What is turbulent fluidization?*, Powder Technology 88:3–14, 1996.

Sinclair, *Third–Generation Polyolefin Technologies and Their Capabilities*, presented at Society of Plastics Engineers Polyolefins IX International Conference, Feb. 26, 1995, Houston, TX.

Odian, *Principles of Polymerization*, McGraw–Hill, New York, 1970, pp. 522–523, 538–541.

Bovey, *High Resolution NMR of Macromolecules*, Academic Press, New York, 1972, pp. 55, 132–141 and 158.

Billmeyer, *Textbook of Polymer Science*, 2ⁿᵈ Edition, Wiley-Interscience, New York, 1971, pp. 330–331.

* cited by examiner

*Primary Examiner*—Fred Teskin
(74) *Attorney, Agent, or Firm*—Jones Day

(57) ABSTRACT

The invention relates to continuous gas fluidized bed methods for making a polymer featuring a condensing agent in a recycle stream; and also to methods for monitoring and providing continuity in a gas fluidized bed method for making a polymer featuring a condensing agent in a recycle stream. Certain ranges of $\Delta\rho$, in some cases combined with certain ranges of values for $A_n$, can be used to find and define desirable operating states, i.e., the "steady state," "alert state," "corrective action state," "continuity impairment state" and/or "$\Delta\rho$ alarm state," for the gas fluidized bed reactor polymerization method (where $\Delta\rho$, $A_n$ and the particular states are disclosed herein).

100 Claims, 8 Drawing Sheets

FLUIDIZED BED METHODS FOR MAKING POLYMERS

FIELD OF THE INVENTION

The invention relates generally to continuous gas fluidized bed methods for making a polymer featuring a condensing agent in a recycle stream; and also to methods for monitoring and providing continuity in a gas fluidized bed method for making a polymer featuring a condensing agent in a recycle stream.

BACKGROUND OF THE INVENTION

In general, polymerization reactions are exothermic. Therefore, producing a polymer in a fluidized bed necessitates that the heat generated by the polymerization reaction be removed in order to keep the reaction temperature within the bed in a desirable range. Conventionally, the temperature of the reactor fluidized bed is controlled to an essentially isothermal level through continuously removing the heat of polymerization by circulating the gas exiting from the fluidized bed to a condenser/heat exchanger outside the reactor and recirculating the cooled gas stream back into the reactor. When the temperature of the recirculating stream introduced or recycled into the fluidized bed polymerization reactor is above the dew point temperature, substantially no liquid is present and, thus, such operation is known in the art as a "dry mode" process. However, it has been recognized that the recycled stream need not be completely gaseous but can comprise both gas and liquid. In this process, fluid is formed by cooling the recycle stream below the dew point temperature, thereby converting a portion of the gas into a liquid, and the cooled recycle stream is introduced into the fluidized bed polymerization reactor. This mode of operation is known in the art as a "condensing mode" or "condensed mode" process.

Condensed mode fluidized bed reactor polymerization processes have been disclosed by, e.g., U.S. Pat. Nos. 4,543,399 and 4,588,790 to Jenkins et al., each of which describes introducing an inert liquid into the recycle stream to increase the dew point temperature of the recycle stream and allowing the process to operate at levels of up to 17.4% liquid by weight, based on the total weight of the cooled recycle stream. A condensed mode process is considered to be advantageous because its ability to remove greater quantities of heat generated by polymerization increases the polymer production capacity of a fluidized bed polymerization reactor.

Condensed mode fluidized bed reactor polymerization processes operating with above 17.4% liquid by weight in the cooled recycle stream have been disclosed; however, such processes must be confined within a limited range of operating conditions to avoid destabilizing the fluidized bed, thereby halting the process. For example, the teachings of U.S. Pat. No. 5,352,749 to DeChellis et al. require that the ratio of the fluidized bed density ("FBD") to the settled bulk density ("SBD"), the latter being the density of the polymer particles produced, be maintained above 0.59 throughout the fluidized bed polymerization process. In particular, this reference discloses that "as a general rule a reduction in the ratio of FBD to SBD to less than 0.59 may involve risk of fluidized bed disruption and is to be avoided."

Different, but still limited, ranges for condensed mode fluidized bed polymerization reactor operating conditions are disclosed in U.S. Pat. Nos. 5,436,304 and 5,462,999, each to Griffin et al. Each of these references defines a so-called "bulk density function (Z)" (see, e.g., col. 12, lines 31–42 of U.S. Pat. No. 5,436,304 for a definition of Z) and teaches that Z is to be maintained at a value equal to or greater than a so-called "calculated limit of the bulk density function" (see, e.g., col. 12, lines 66–68 in U.S. Pat. No. 5,436,304) throughout the fluidized bed polymerization process to avoid destabilizing the fluidized bed.

Yet another different, but still limited, range for condensed mode fluidized bed polymerization reactor operating conditions is disclosed in U.S. Pat. No. 6,391,985 B1 to Goode et al. This reference teaches operating the fluidized bed polymerization process with at least 17.5% liquid by weight in the cooled recycle stream and in the so-called "turbulent regime," defined (see, e.g., col. 4, lines 20–27 and 52–54; col. 2, lines 3–9) as "the state of a fluidized bed existing between the conditions of (1) the presence of discernable bubbles and (2) fast fluidization, and/or the regime of conditions between (a) the transition velocity $U_c$ and (b) the transport velocity $U_k$, expressed as the superficial gas velocity."

There remains, however, a need for identifying a broader range of operating conditions of a condensed mode fluidized bed reactor polymerization method. Confining a condensed mode fluidized bed reactor polymerization process within limited operating ranges, e.g., those discussed above, to avoid destabilizing the fluidized bed prevents the benefits of condensed mode operation from being fully realized. Moreover, none of the above references even suggests focusing on, e.g., the difference between the lower fluidized bed density and the upper fluidized bed density, in a method for making a polymer featuring a condensing agent in a recycle stream and/or in a method for monitoring and providing continuity in a gas fluidized bed method for making a polymer featuring a condensing agent in a recycle stream.

The citation to any reference in Section 2 of this application is not an admission that any such reference is prior art to this application.

SUMMARY OF THE INVENTION

An embodiment of the invention relates to a continuous gas fluidized bed method for making a polymer featuring a condensing agent in a recycle stream comprising:

continuously passing a gaseous stream comprising monomer and the condensing agent through a fluidized bed in a reaction zone having a controlled reactor bed temperature, a lower fluidized bed density, an upper fluidized bed density and a plurality of measuring site$_n$ temperatures, in the presence of catalyst;

withdrawing from the reaction zone polymer product and a stream comprising unreacted gases;

recycling the stream into the reaction zone with sufficient additional monomer to replace monomer polymerized and withdrawn as polymer product;

cooling the recycle stream to condense a portion thereof and form a liquid-containing mixture having a recycle stream dew point temperature, a reactor inlet temperature and comprising from about 17.5% to about 70% liquid by weight based on the total weight of the cooled recycle stream where the difference between the controlled reactor bed temperature and the recycle stream dew point temperature of the mixture is greater than or equal to about 5° C.; and introducing the mixture into the reaction zone where the liquid in the mixture is vaporized;

where $\Delta\rho$ satisfies the condition $0 \text{ kg/m}^3 \leq \Delta\rho < 70 \text{ kg/m}^3$ and, when $\Delta\rho \geq 10 \text{ kg/m}^3$, simultaneously, at least a critical number of $A_n$ satisfy the condition $0.25 \leq A_n \leq 0.8$.

Another embodiment of the invention relates to a method for monitoring and providing continuity in a gas fluidized bed method for making a polymer featuring a condensing agent in a recycle stream comprising:

monitoring the fluidized bed reaction zone, where the reaction zone has a controlled reactor bed temperature, a lower fluidized bed density, an upper fluidized bed density and a plurality of measuring site$_n$ temperatures;

monitoring the recycle stream into the reaction zone where the stream has a reactor inlet temperature;

determining $\Delta\rho$ and comparing $\Delta\rho$ to at least one limit; and when $\Delta\rho \geq 10 \text{ kg/m}^3$, determining a plurality of $A_n$ and comparing each $A_n$ to a lower value and an upper value. Each of $A_n$ and $\Delta\rho$ are as defined herein.

DETAILED DESCRIPTION OF THE INVENTION

The invention relates generally to a continuous gas fluidized bed method for making a polymer featuring a condensing agent in a recycle stream and to a method for monitoring and providing continuity in a gas fluidized bed method for making a polymer featuring a condensing agent in the recycle stream.

Figure 1:
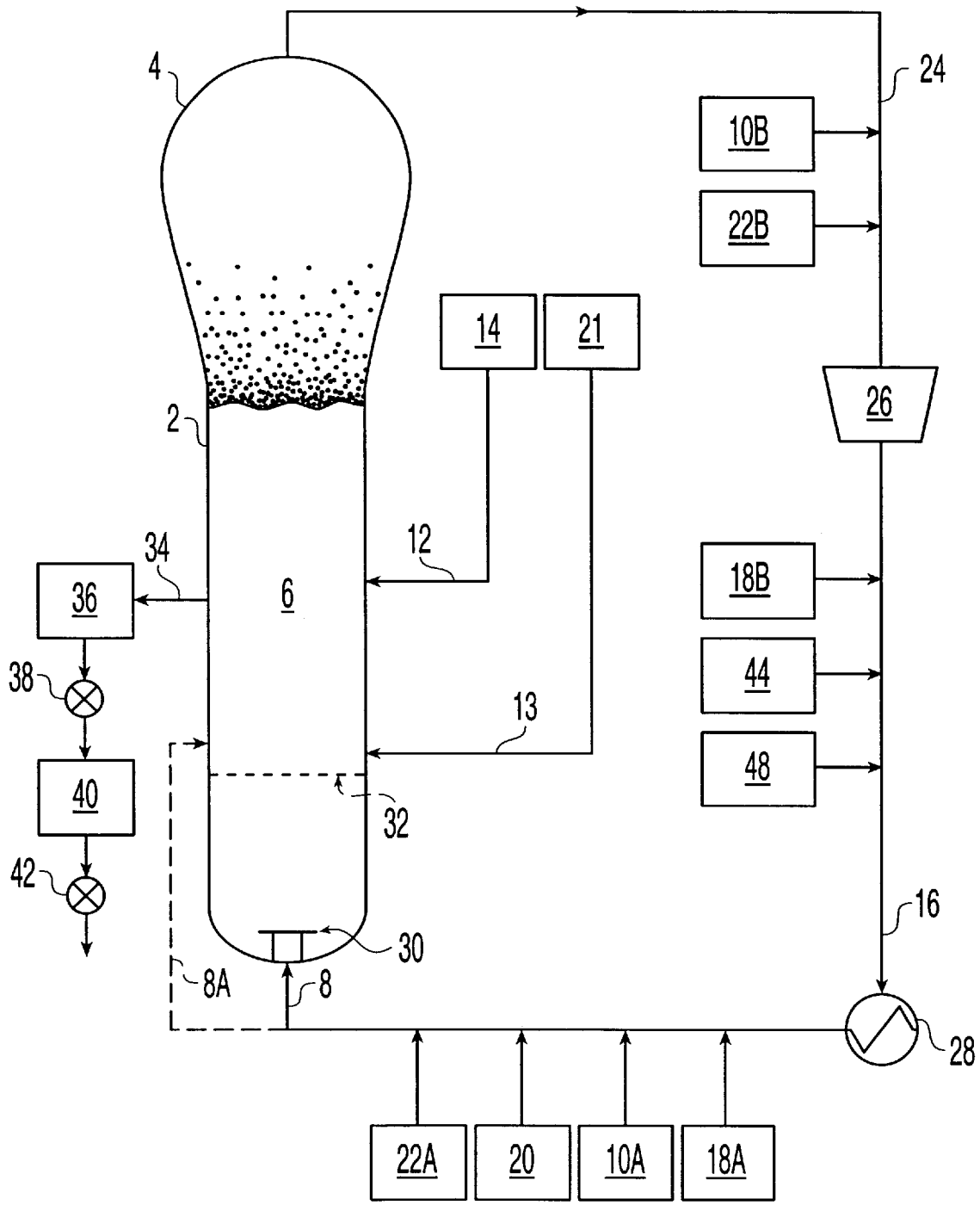
FIG. 1 shows a non-limiting schematic diagram of a typical commercial fluidized bed reactor polymerization apparatus.

Referring to FIG. 1, a non-limiting schematic diagram of a typical commercial continuous gas fluidized bed reactor polymerization apparatus, the reactor column comprises a reaction zone 2 and an expansion zone 4. Within the reaction zone 2 is a fluidized bed 6 comprising particulate polymer or copolymer product made in the reaction zone by polymerizing monomer, e.g., ethylene, introduced into the reactor with a mixture of materials either through line 8 from source 10A or through lines 24, 16 and 8 from source 10B. Catalyst can be introduced into the reactor through line 12 from source 14. For example, it is conventional to use pure, high pressure nitrogen for conveying the catalyst into the reactor.

While FIG. 1 illustrates an embodiment with a cylindrically-shaped reaction zone, the cylindrical shape is not required. For example, the reactor walls can be vertical, sloped, or can expand inward or outward with increasing reactor height. Thus, the reaction zone may, for example, be of a cylindrical, conical or rectangular geometry. Furthermore, the geometry of the expansion zone is not critical, e.g., it can be of cylindrical, conical, spherical, elliptical or rectangular geometry. The ratio of the height to the cross-sectional area of the reaction zone 2 can vary depending on, e.g., the production capacity desired and the residence time, that is, the ratio of the bed weight in metric tons to the production rate in metric tons/hour. For a cylindrical reactor, the height to inner diameter ratio of the reaction zone 2 can vary depending upon the desired production capacity, e.g., from about 1:1 to about 12:1 in one embodiment and from about 2.5:1 to about 8:1 in another embodiment. The maximum inner cross-sectional area of the expansion zone 4 can also vary. In one embodiment, it can be about 2 to about 3 times the inner cross-sectional area of the reaction zone 2.

During continuous gas fluidized bed polymerization, only a minority, e.g., less than about 10 wt. %, of the gaseous stream flowing through the fluidized bed reacts. The majority of the stream does not react in the fluidized bed, leaves reaction zone 2 of the reactor column, and passes into expansion zone 4 above the bed, also called the freeboard zone. This stream carries entrained particulate polymer product with it. As this stream's velocity decreases, due to the increased cross-sectional area of the expansion zone, the larger of the entrained particles drop back into the fluidized bed, thereby reducing particulate product carryover out of the reactor column. The smaller entrained particles that are carried out of the reactor column in line 24 are conventionally known as "fines." Optionally, line 24 can have a separator, such as a cyclone separator, for removing entrained particles and returning them to the fluidized bed. Each of these features is conventional.

Optionally, additional monomer(s), e.g., butene-1, can be introduced into the mixture, e.g., through line 8 from source 18A or through line 16 from source 18B. Optionally, additionally cocatalyst component(s) can be introduced into the mixture, e.g., through line 8 from source 20. If it is desired to introduce catalyst and/or cocatalyst components together, the combination, e.g., supplied from source 21, can be introduced to the fluidized bed through line 13. Each of these features is conventional.

Optionally, at least one molecular weight control agent, e.g., a hydrogen chain transfer agent, can be introduced into the mixture, e.g., through line 8 from source 22A or through line 24 from source 22B. Of course, inert gases, such as nitrogen and ethane, can be present in the mixture as long as they are not detrimental to the polymerization. Each of these features is conventional.

Recycle line 24 continuously removes unreacted gases from expansion zone 4. The recycle stream is passed through compressor 26 and condenser/heat-exchanger 28 to remove the thermal energy originating as the heat of reaction from the exothermal polymerization process in reaction zone 2. For example, a conventional centrifugal compressor and a shell and tube condenser can be used. In the embodiment of FIG. 1, the mixture is recycled through line 8 via deflector 30 and distributor plate 32, each containing multiple perforations, into the fluidized bed 6, along with makeup monomer to replace that which is polymerized, e.g., from source 10A and, optionally, from source 18A. Each of these features is conventional.

The process for compressing, condensing and reintroducing the recycle stream into the fluidized bed reactor can vary from the arrangement described in FIG. 1, as known to those in the art. For example, a single condenser can be used or a plurality of condensers connected in parallel or series can be used. Water is often the coolant of choice. The capacity to remove heat from the fluidized bed reactor can be increased by refrigerating the coolant. The compressor can be located before (as shown in FIG. 1) or after the condenser, or between the condensers if a plurality of condensers is used.

In the embodiment illustrated in FIG. 1, the point of entry for the recycle stream, e.g., through line 8, is below the lowest point of the fluidized bed. Without wishing to be bound by theory, this mode of entry is thought to provide a relatively uniform flow of the recycle stream throughout the reactor, keep the fluidized bed suspended, and ensure that a uniform recycle stream passes upwardly throughout the fluidized bed. In another embodiment, the recycle stream can be divided into a plurality of separate streams, at least one of which can be introduced directly into the fluidized bed, e.g., through line 8A. For example, as disclosed by, e.g., U.S. Pat. No. 6,001,938 to Chinh et al. and GB 1,398,965, the recycle stream can be divided into a liquid recycle stream and a recycle stream comprising gas. The liquid recycle stream can then be separately introduced into the side of the reactor through the direct-feed line 8A while the recycle stream comprising gas can be introduced below the fluidized bed through line 8. Of course, as those in the art recognize, any number of split recycle streams can be used and such split recycle streams can each have the same or different ratios of liquid to gas.

The gas fluidized bed reactor, and its associated compressing and cooling system, operates under pressure; therefore, the continuous gas fluidized bed reactor polymerization apparatus is contained within pressure vessels. The reactor pressure can be from about 7 to about 70 kg/cm$^2$. In another embodiment, the reactor pressure is from about 11 to about 42 kg/cm$^2$. In another embodiment, the reactor pressure is from about 14 to about 39 kg/cm$^2$. In another embodiment, the reactor pressure is from about 17 to about 28 kg/cm$^2$. In another embodiment, the reactor pressure is from about 18 to about 24 kg/cm$^2$.

Conventionally, the height of the fluidized bed in reaction zone 2 is prevented from continuously increasing by withdrawing a portion of the particulate polymer product at a rate commensurate with the rate of formation of that product. For example, particulate polymer product is removed through at least one product discharge system ("PDS"). In the embodiment illustrated in FIG. 1, an exemplary PDS comprises line 34 feeding the product into discharge tank 36, from which it can be removed, intermittently or continuously as desired, through valve 38, tank 40 and valve 42, each as known in the art. In another embodiment, two parallel discharge systems are present and alternate in operation.

The mixture entering the reactor through line 8 preferably includes not only fresh monomer from source 10A or 10B, but also at least one condensing agent introduced, e.g., through line 16 from source 44, to assist in removing the heat of polymerization from the reactor as is known in the art. Condensing agent that is removed from the reactor, e.g., with the polymer into tank 36, can be collected, recycled into source 44, and delivered into line 16. If an optional comonomer(s) is used, that optional comonomer that is removed from the reactor, e.g., with the polymer into tank 36, can be collected, recycled into source 48, and delivered into line 16. Likewise, combined monomer, optional comonomer(s) and condensing agent that are removed from the reactor, e.g., with the polymer into tank 36, can be collected, recycled into source 48, and delivered into line 16. Each of these features is conventional. Of course, it is also known in the art to combine some of the sources discussed above so as to reduce the amount of equipment necessary for conducting the continuous gas fluidized bed reactor polymerization. For example, the condensing agent can be introduced together with any or all of the monomer from source 10A, optional comonomer(s), optional molecular weight control agent from source 22A, and optional cocatalyst.

The invention is not limited to any particular type of polymerization or copolymerization reaction. For example, the invention is applicable to the polymerization or copolymerization of one or more of the following monomers and/or monomer types: olefin monomers, such as norbornene and $\alpha$-olefin monomers, such as ethylene, propylene, butene-1, pentene-1, 4-methylpentene-1, hexene-1, heptene-1, octene-1, styrene, $\alpha$-methyl styrene and p-methyl styrene; dienes, which can be conjugated or non-conjugated, such as 1,3-cyclopentadiene, 2-methyl-1,3-cyclohexadiene, 5-methyl-1,3-cyclohexadiene, 1,3-cycloheptadiene, ethylidene norbornene and those comprising at least one $\alpha$-carbon-carbon double bond, such as butadiene, isoprene, chloroprene, 1,3-pentadiene and 1,4-hexadiene; acetylenic monomers, such as acetylene, methyl acetylene and ethyl acetylene; polar vinyl monomers, such as vinyl acetate, vinyl acrylate, vinyl methacrylate, vinyl chloride, vinyl fluoride, methyl vinyl ether, methyl acrylate, methyl methacrylate, tetrafluoroethylene and acrylonitrile; and aldehyde monomers, such as formaldehyde and acetaldehyde.

In one embodiment, the method is directed to the polymerization of an olefin monomer. In another embodiment, the method is directed to the copolymerization of at least two different olefin monomers. In another embodiment, the method is directed to the copolymerization of an olefin monomer and a diene monomer. In another embodiment, the method is directed to the copolymerization of at least two different olefin monomers and a diene monomer. In another embodiment, the method is directed to the copolymerization of an olefin monomer and at least two different diene monomers. In another embodiment, the method is directed to the copolymerization of at least two different olefin monomers and at least two different diene monomers. In another embodiment, the method is directed to the copolymerization of an olefin monomer and a polar vinyl monomer. In another embodiment, the method is directed to the copolymerization of at least two different olefin monomers and a polar vinyl monomer. In another embodiment, the method is directed to the copolymerization of an olefin monomer and at least two different polar vinyl monomers. In another embodiment, the method is directed to the copolymerization of at least two different olefin monomers and at least two different polar vinyl monomers.

In one embodiment, the method is directed to the polymerization of ethylene. In another embodiment, the method is directed to the polymerization of propylene. In another embodiment, the method is directed to the copolymerization of ethylene and propylene. In another embodiment, the method is directed to the copolymerization of ethylene and butene-1. In another embodiment, the method is directed to the copolymerization of ethylene and hexene-1. In another embodiment, the method is directed to the copolymerization of propylene and butene-1.

The catalyst or catalysts used in the method of the invention are conventional and can include free-radical catalysts, anionic catalysts, coordinated anionic catalysts, cationic catalysts, and a catalyst which includes a transition metal component or a metallocene component including a single or multiple cyclopentadienyl component reacted with either a metal alkyl, metal alkoxy or an ionic compound component. The catalyst can include a partially or fully activated precursor composition or compositions. Optionally, the catalyst can be modified by prepolymerization to form a prepolymer, can be encapsulated, or be supported on an inorganic or organic support. As used herein, the term "catalyst" includes element(s) or compound (s) that can also be known to the art as cocatalyst(s). As used herein, the term "catalyst" includes multiple components that can make up a catalyst system, e.g., activator, solvent, carrier.

In particular, the conventional catalyst can be of the Ziegler-Natta type, known to the art to contain a solid catalyst comprising a compound of a transition metal and a cocatalyst comprising an organic compound of a metal, e.g., an organometallic compound, for example an alkylaluminium compound. Ziegler catalysts supported on silica can also be employed. Additionally, the conventional catalyst can be of the high-activity catalyst type, i.e., those which are capable of producing large quantities of polymer in a relatively short time, thereby making it possible to avoid removing catalyst residues from the polymer. High-activity catalysts are known to comprise a solid catalyst comprising atoms of transition metal, magnesium and halogen. It is also possible to use a conventional high-activity catalyst comprising chromium oxide activated by a heat treatment and associated with a granular support based on a refractory oxide. Metallocene catalysts and metallocene catalysts supported on silica can also be employed.

The catalyst can be added as a solid, slurry or solution. The catalyst can be conveyed into the reactor with a gas, a liquid, a slurry or with a gas and liquid mixture. If any catalyst or catalyst component used is sensitive to oxygen, moisture and/or air, the catalyst and/or that component is, conventionally, stored in its reservoir under a blanket of gas that is inert relative to the stored catalyst, such as nitrogen or argon. Conventionally, the height at which the catalyst is added to the reactor can be varied to reduce the quantity of fines entrained in the recycle stream. For example, adding the catalyst lower in the reactor can reduce the carryover of fines.

In one embodiment, the catalyst used in the polymerization of ethylene is a Ziegler-Natta type catalyst comprising titanium trichloride and aluminum alkyl. In another embodiment, the catalyst used in the copolymerization of ethylene and butene-1 is a Ziegler-Natta type catalyst comprising titanium trichloride and aluminum alkyl.

The operating temperature of the reactor fluidized bed is set and controlled at a temperature lower than the sticking or fusion temperature of the polymer particles produced. This is important, e.g., so as to prevent the plugging of the reactor by polymer chunks or sheets that can grow rapidly if the controlled reactor bed temperature reaches excessive levels.

The controlled reactor bed temperature can be measured using any conventional means, e.g., by using at least one thermometer, thermocouple, thermistor or platinum resistance thermometer. The controlled reactor bed temperature can be controlled using any conventional means, e.g., by controlling the cooling capacity of the condenser such as by adjusting the condenser cooling water flow rate to effect the reactor inlet gas temperature, or by controlling the quantity of condensing agent or agents in the recycle stream.

Figures 2A, 2B:
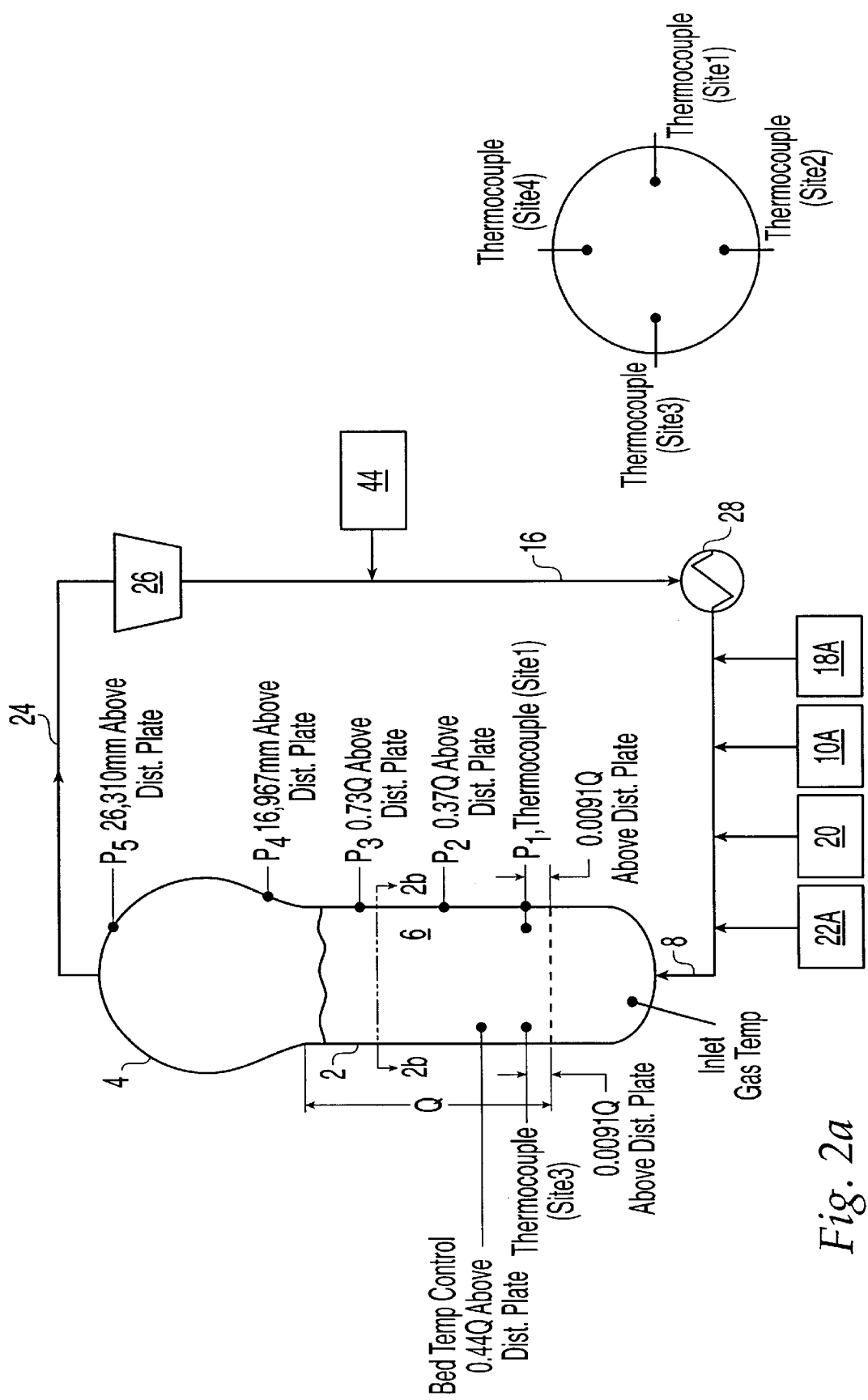
FIG. 2 shows a non-limiting simplified schematic diagram indicating typical temperature and pressure measurement locations in a fluidized bed reactor polymerization apparatus of the invention.

FIG. 2 shows a non-limiting schematic diagram, simplified from FIG. 1 in that some components have been omitted, that indicates typical temperature and pressure measurement locations in a fluidized bed reactor polymerization apparatus of the invention. Of course, many other variations can be made without departing from the spirit or scope of this invention. Conventionally, the controlled reactor bed temperature is measured in a portion of the fluidized bed removed from the distributor plate. Relative to the dimension denoted as "Q" in FIG. 2a, that is, the height measured beginning at the surface of the distributor plate, e.g., 32 in FIG. 1, facing the fluidized bed and extending to the uppermost extent of the reaction zone 2 of the reactor column, i.e., before entering the expansion zone 4 of the reactor column, the controlled reactor bed temperature is measured at a location greater than or equal to about 0.17Q in height above the surface of the distributor plate facing the fluidized bed. In another embodiment, the controlled reactor bed temperature is measured at a location greater than or equal to about 0.17Q and less than or equal to about 0.6Q in height. In another embodiment, the controlled reactor bed temperature is measured at a location greater than or equal to about 0.33Q and less than or equal to about 0.55Q in height. In another embodiment, the controlled reactor bed temperature is measured at a location greater than or equal to about 0.33Q and less than or equal to about 0.48Q in height. In another embodiment, the controlled reactor bed temperature is measured at a location greater than or equal to about 0.18Q and less than or equal to about 0.25Q in height. In one embodiment, Q is about 13.6 m. In another embodiment, Q is about 16.64 m. In another embodiment, Q is about 21.0 m. In another embodiment, as indicated in FIG. 2a, when Q is about 16.64 m, the controlled reactor bed temperature is measured at a height of about 7.27 m (about 0.44Q) above the surface of the distributor plate 32 facing the fluidized bed.

Controlling the reactor bed temperature is important for providing process continuity. Process continuity can be impaired, or even lost, e.g., by the formation of polymer chunks. Such chunks can grow rapidly through polymer particle agglomeration by sticking if the controlled reactor bed temperature reaches too-high levels. If the polymer chunks grow too large to be withdrawn from the reactor as particulate polymer product through the PDS, they can block the reactor and lead to loss of continuity of the method. On the other hand, if polymer chunks enter the PDS, such chunks can disrupt the functioning of that system and/or its components, e.g., the drier, extruder or transfer lines, thereby also unfavorably impacting upon continuity of the method.

The temperature at which the reactor fluidized bed is controlled is directly dependent upon three main factors: (1) the rate of catalyst injection, (2) the reactor inlet temperature of the stream that is introduced or recycled into the reaction zone and (3) the mass flow rate of the gas stream passing through the fluidized bed which, of course, is equal to the superficial gas velocity ("SGV") times the internal cross-sectional area of the reactor times the recycle gas density. The SGV generally ranges from about 0.12 to about 2.44 m/sec. In one embodiment, the SGV is from about 0.21 to about 1.8 m/sec. In another embodiment, the SGV is from about 0.65 to about 0.90 m/sec. In another embodiment, the SGV minus the minimum velocity required for fluidization is greater than about 0.09 m/sec. In another embodiment, the SGV minus the minimum fluidization velocity is greater than about 0.21 m/sec. In another embodiment, the SGV minus the minimum fluidization velocity is greater than about 0.275 m/sec. In another embodiment, the ratio of the SGV to the minimum fluidization velocity is from about 2 to about 20. In another embodiment, the ratio of the SGV to the minimum fluidization velocity is from about 3 to about 10.

Of course, the amount of liquid introduced into the bed, either with the recycle stream and/or by a separate direct-feed stream into the fluidized bed, can also indirectly influence the controlled reactor bed temperature because, as heat is removed from the fluidized bed to vaporize the incoming liquid, its vaporization thereby acts to reduce the controlled reactor bed temperature.

The rate of catalyst injection generally controls the rate of polymerization. As such polymerizations are exothermic, the rate of polymerization controls the rate of heat generated. The temperature of the reactor fluidized bed is controlled to an essentially isothermal level, under stable operating state conditions, by continuously removing the heat generated by polymerization. A stable operating state includes a state of operation of the polymerization method where the main factors of the system are substantially unchanged over a reasonable period of time, e.g., at least about an hour. Thus, in a stable operating state, the amount of heat generated by the polymerization is balanced by the amount of heat removed through cooling and the total quantity of material being introduced or recycled into the system is balanced by the amount of particulate polymer product being removed.

In one embodiment for making polyethylene from ethylene, the controlled reactor bed temperature is from about 100° C. to about 115° C. In another embodiment for making polyethylene, the controlled reactor bed temperature is from about 105° C. to about 110° C.

In one embodiment for making poly(ethylene-co-butene-1) from ethylene and butene-1, the controlled reactor bed temperature is from about 80° C. to about 95° C. In another embodiment for making poly(ethylene-co-butene-1), the controlled reactor bed temperature is from about 80° C. to about 90° C. In another embodiment for making poly(ethylene-co-butene-1), the controlled reactor bed temperature is from about 85° C. to about 89° C. In another embodiment for making poly(ethylene-co-butene-1), the controlled reactor bed temperature is from about 85° C. to about 88° C.

In one embodiment for making poly(ethylene-co-hexene-1) from ethylene and hexene-1, the controlled reactor bed temperature is from about 78° C. to about 90° C. In another embodiment for making poly(ethylene-co-hexene-1), the controlled reactor bed temperature is from about 100° C. to about 110° C.

Many polymers and copolymers can be prepared using the method of the invention. As used herein, a "copolymer" includes a polymer comprising two different monomeric subunits. Thus, a polymeric chain comprising three different monomers (also known as a terpolymer) is included within the term "copolymer," as is a polymer chain comprising more than three different monomeric units. As used herein, the term "polymer" includes a homopolymer and a copolymer.

Polymers containing a series of asymmetric carbon atoms along the chain, e.g., polypropylene or polystyrene, are conventionally known to exist in various stereoregular forms. For example, if the polymer chain were to be present in the fully extended planar zigzag conformation, the configuration resulting when all of the substituent groups on the polymer (methyl for polypropylene, phenyl for polystyrene) lie above or below the plane of the main chain is known as isotactic, when adjacent substituent groups (a "diad") lie alternately above and below the plane is known as syndiotactic, when two adjacent substituent groups lie above plane and the next adjacent group (a "triad") lies below, and vice versa, is known as heterotactic, and when the substituent groups lie randomly above and below the plane is known as atactic. See, e.g., G. Odian, *Principles of Polymerization,* McGraw-Hill, New York, 1970, pp. 522–523, 538–541. In relation to polypropylene, for example, isotactic polypropylene is described in, e.g., column 3, line 24 to column 6, line 3 (and in the references cited therein) of U.S. Pat. No. 5,621,046, syndiotactic polypropylene is described in, e.g., column 1, lines 18–21 and 53–67 (and in the patents cited therein) of U.S. Pat. No. 5,269,807, and heterotactic polypropylene is described in, e.g., F.A. Bovey, *High Resolution NMR of Macromolecules,* Academic Press, New York, 1972, pp. 55, 132–141 and 158 (and in the references cited therein) and U.S. Pat. No. 4,557,264. As used herein, the term "polymer" includes each of the stereoregular forms of that polymer, e.g., isotactic, syndiotactic, heterotactic and atactic.

In one embodiment, the polymer product of the invention is isotactic, syndiotactic or heterotactic. In another embodiment, the polymer product of the invention is isotactic, i.e., comprises at least 94 mol % isotactic triads. In another embodiment, the polymer product of the invention is substantially isotactic, i.e., comprises at least 85 mol % isotactic triads. In another embodiment, the polymer product of the invention is syndiotactic, i.e., comprises at least 94 mol % syndiotactic triads. In another embodiment, the polymer product of the invention is substantially syndiotactic, i.e., comprises at least 85 mol % syndiotactic triads. In another embodiment, the polymer product of the invention is heterotactic, i.e., comprises at least 94 mol % heterotactic triads. In another embodiment, the polymer product of the invention is substantially heterotactic, i.e., comprises at least 85 mol % heterotactic triads.

In one embodiment, the polymer product of the invention is isotactic, syndiotactic or heterotactic polypropylene. In another embodiment, the polymer product of the invention is isotactic polypropylene. In another embodiment, the polymer product of the invention is substantially isotactic propylene. In another embodiment, the polymer product of the invention is syndiotactic polypropylene. In another embodiment, the polymer product of the invention is substantially syndiotactic polypropylene. In another embodiment, the polymer product of the invention is heterotactic polypropylene. In another embodiment, the polymer product of the invention is substantially heterotactic polypropylene.

In one embodiment, the polymer product of the invention is isotactic, syndiotactic or heterotactic polystyrene. In another embodiment, the polymer product of the invention is isotactic polystyrene. In another embodiment, the polymer product of the invention is substantially isotactic styrene. In another embodiment, the polymer product of the invention is syndiotactic polystyrene. In another embodiment, the polymer product of the invention is substantially syndiotactic polystyrene. In another embodiment, the polymer product of the invention is heterotactic polystyrene. In another embodiment, the polymer product of the invention is substantially heterotactic polystyrene.

Exemplary types of polymers that can be prepared using the method of the invention include polyolefins, polydienes, which can be conjugated or non-conjugated, poly(acetylenic monomers), poly(polar vinyl monomers), and polyaldehydes. As used herein, a "polyolefin" is a polymer or copolymer comprising an olefin monomer. Exemplary polyolefins include polymers and copolymers comprising ethylene, propylene, butene-1, pentene-1, 4-methylpentene-1, hexene-1, heptene-1, octene-1, norbornene and the like.

Copolymers can be formed using many ways known to those skilled in the art, e.g., by polymerization of two or more different monomers, which copolymerization can be of the random type, the alternating type or intermediate between these two types. A copolymer is conventionally known as "random" or "ideal" when a radical formed from either monomer unit at the end of the growing polymer chain has about the same preference for adding either of the monomers and as "alternating" when a radical formed from one monomer at the end of the growing polymer chain prefers to add to the other monomer. See, e.g., F. W. Billmeyer, Jr., *Textbook of Polymer Science*, 2$^{nd}$ Ed., Wiley-Interscience, New York, 1971, pp. 330–331.

In one embodiment, the copolymer product of the invention is a random copolymer. In another embodiment, the copolymer product of the invention is a substantially random copolymer, i.e., the copolymerization by which the copolymer product is formed is nearer in character to a random copolymerization than to an alternating copolymerization.

Exemplary types of copolymers that can be prepared using the method of the invention include poly(olefin-co-diene), poly(olefin-co-(acetylenic monomer)), poly(olefin-co-(polar vinyl monomer)), poly(olefin-co-aldehyde), poly((polar vinyl monomer)-co-diene), poly((polar vinyl monomer)-co-(acetylenic monomer)), poly((polar vinyl monomer)-co-aldehyde), poly(diene-co-(acetylenic monomer)), poly(diene-co-aldehyde), and poly((acetylenic monomer)-co-aldehyde). It is to be understood that, for each of the above exemplary types of copolymers, each monomer type can, of course, optionally and independently, be present in the form of a plurality of specific monomers. Taking only as an example the copolymer type "poly(olefin-co-diene)," that copolymer type can include poly(ethylene-co-butadiene), poly(ethylene-co-1,4-hexadiene), poly(butene-1-co-butadiene), poly(butene-1-co-1,4-hexadiene), poly(ethylene-co-butene-1-co-butadiene), poly(ethylene-co-butene-1-co-1,4-hexadiene), poly(ethylene-co-butadiene-co-1,4-hexadiene), poly(butene-1-co-butadiene-co-1,4-hexadiene), and poly(ethylene-co-butene-1-co-butadiene-co-1,4-hexadiene), to mention only a few.

Exemplary polymers that can be prepared using the method of the invention include polyethylene, polypropylene, poly(butene-1), poly(pentene-1), poly(4-methylpentene-1), poly(hexene-1), poly(heptene-1), poly(octene-1), polybutadiene, polyisoprene, polychloroprene, poly(1,3-pentadiene), polycyclopentadiene, poly(1,4-hexadiene), poly(ethylidene norbornene), polyacetylene, poly(methyl acetylene), poly(ethyl acetylene), polystyrene, poly($\alpha$-methyl styrene), poly(p-methyl styrene), poly(norbornene), poly(vinyl acetate), poly(vinyl acrylate), poly(vinyl methacrylate), poly(vinyl chloride), poly(vinyl fluoride), poly(methyl vinyl ether), poly(methyl acrylate), poly(methyl methacrylate), polytetrafluoroethylene, polyacrylonitrile, polyformaldehyde, and polyacetaldehyde.

In one embodiment, the polymer product prepared using the method of the invention is polyethylene. In another embodiment, the polymer product prepared using the method of the invention is polypropylene.

Exemplary copolymers that can be prepared using the method of the invention include copolymers of ethylene and at least one other olefin monomer, such as propylene, butene-1, 4-methylpentene-1, hexene-1, heptene-1, octene-1, styrene, $\alpha$-methyl styrene, p-methyl styrene and norbornene; copolymers of propylene and at least one other olefin monomer, such as butene-1, pentene-1, 4-methylpentene-1, hexene-1, heptene-1, octene-1, styrene, $\alpha$-methyl styrene, p-methyl styrene and norbornene; copolymers of butene-1 and at least one other olefin monomer, such as pentene-1, 4-methylpentene-1, hexene-1, heptene-1, octene-1, styrene, $\alpha$-methyl styrene, p-methyl styrene and norbornene; copolymers of ethylene, propylene and at least one other olefin monomer, such as butene-1, 4-methylpentene-1, hexene-1, heptene-1, octene-1, styrene, $\alpha$-methyl styrene, p-methyl styrene and norbornene; copolymers of ethylene, butene-1 and at least one other olefin monomer, such as 4-methylpentene-1, hexene-1, heptene-1, octene-1, styrene, $\alpha$-methyl styrene, p-methyl styrene and norbornene; copolymers of propylene, butene-1 and at least one other olefin monomer, such as 4-methylpentene-1, hexene-1, heptene-1, octene-1, styrene, $\alpha$-methyl styrene, p-methyl styrene and norbornene; copolymers of ethylene and at least one diene, which can be conjugated or non-conjugated, such as butadiene, isoprene, chloroprene, 1,3-pentadiene, cyclopentadiene, 1,4-hexadiene and ethylidene norbornene; copolymers of propylene and at least one diene, which can be conjugated or non-conjugated, such as butadiene, isoprene, chloroprene, 1,3-pentadiene, cyclopentadiene, 1,4-hexadiene and ethylidene norbornene; copolymers of butene-1 and at least one diene, which can be conjugated or non-conjugated, such as butadiene, isoprene, chloroprene, 1,3-pentadiene, cyclopentadiene, 1,4-hexadiene and ethylidene norbornene; copolymers of ethylene, propylene and at least one diene, which can be conjugated or non-conjugated, such as butadiene, isoprene, chloroprene, 1,3-pentadiene, cyclopentadiene, 1,4-hexadiene and ethylidene norbornene; copolymers of ethylene, butene-1 and at least one diene, which can be conjugated or non-conjugated, such as butadiene, isoprene, chloroprene, 1,3-pentadiene, cyclopentadiene, 1,4-hexadiene and ethylidene norbornene; copolymers of propylene, butene-1 and at least one diene, which can be conjugated or non-conjugated, such as butadiene, isoprene, chloroprene, 1,3-pentadiene, cyclopentadiene, 1,4-hexadiene and ethylidene norbornene; copolymers of ethylene and at least one acetylenic monomer, such as acetylene, methyl acetylene and ethyl acetylene; copolymers of propylene and at least one acetylenic monomer, such as acetylene, methyl acetylene and ethyl acetylene; copolymers of butene-1 and at least one acetylenic monomer, such as acetylene, methyl acetylene and ethyl acetylene; copolymers of ethylene, propylene and at least one acetylenic monomer, such as acetylene, methyl acetylene and ethyl acetylene; copolymers of ethylene, butene-1 and at least one acetylenic monomer, such as acetylene, methyl acetylene and ethyl acetylene; copolymers of propylene, butene-1 and at least one acetylenic monomer, such as acetylene, methyl acetylene and ethyl acetylene; copolymers of ethylene and at least one polar vinyl monomer, such as vinyl acetate, vinyl acrylate, vinyl methacrylate, vinyl chloride, vinyl fluoride, methyl vinyl ether, methyl acrylate, methyl methacrylate, tetrafluoroethylene and acrylonitrile; copolymers of propylene and at least one polar vinyl monomer, such as vinyl acetate, vinyl acrylate, vinyl methacrylate, vinyl chloride, vinyl fluoride, methyl vinyl ether, methyl acrylate, methyl methacrylate, tetrafluoroethylene and acrylonitrile; copolymers of butene-1 and at least one polar vinyl monomer, such as vinyl acetate, vinyl acrylate, vinyl methacrylate, vinyl chloride, vinyl fluoride, methyl vinyl ether, methyl acrylate, methyl methacrylate, tetrafluoroethylene and acrylonitrile; copolymers of ethylene, propylene and at least one polar vinyl monomer, such as vinyl acetate, vinyl acrylate, vinyl methacrylate, vinyl chloride, vinyl fluoride, methyl vinyl ether, methyl acrylate, methyl methacrylate, tetrafluoroethylene and acrylonitrile; copolymers of ethylene, butene-1 and at least one polar vinyl monomer, such as vinyl acetate, vinyl acrylate, vinyl methacrylate, vinyl chloride, vinyl fluoride, methyl vinyl ether, methyl acrylate, methyl methacrylate, tetrafluoroethylene and acrylonitrile; copolymers of propylene, butene-1 and at least one polar vinyl monomer, such as vinyl acetate, vinyl acrylate, vinyl methacrylate, vinyl chloride, vinyl fluoride, methyl vinyl ether, methyl acrylate, methyl methacrylate, tetrafluoroethylene and acrylonitrile; copolymers of ethylene and at least one aldehyde monomer, such as formaldehyde and acetaldehyde; copolymers of propylene and at least one aldehyde monomer, such as formaldehyde and acetaldehyde; copolymers of butene-1 and at least one aldehyde monomer, such as formaldehyde and acetaldehyde; copolymers of ethylene, propylene and at least one aldehyde monomer, such as formaldehyde and acetaldehyde; copolymers of ethylene, butene-1 and at least one aldehyde monomer, such as formaldehyde and acetaldehyde; and copolymers of propylene, butene-1 and at least one aldehyde monomer, such as formaldehyde and acetaldehyde.

In one embodiment, the copolymer product prepared using the method of this invention is poly(ethylene-co-propylene). In another embodiment, the copolymer product prepared using the method of this invention is poly(ethylene-co-butene-1). In another embodiment, the copolymer product prepared using the method of this invention is poly(ethylene-co-hexene-1). In another embodiment, the copolymer product prepared using the method of this invention is poly(ethylene-co-heptene-1). In another embodiment, the copolymer product prepared using the method of this invention is poly(ethylene-co-octene-1). In another embodiment, the copolymer product prepared using the method of this invention is poly(propylene-co-butene-1). In another embodiment, the copolymer product prepared using the method of this invention is poly(propylene-co-hexene-1). In another embodiment, the copolymer product prepared using the method of this invention is poly(propylene-co-heptene-1). In another embodiment, the copolymer product prepared using the method of this invention is poly(propylene-co-octene-1).

In one embodiment, the polymer or copolymer product of this invention, produced using a conventional Ziegler-Natta catalyst, has a melt index ("MI") of from about 0.1 g/10 min to about 150 g/10 min, preferably from about 0.3 g/10 min to about 75 g/10 min, more preferably from about 0.5 g/10 min to about 60 g/10 min, as measured by ASTM method D1238 Rev. B-90 entitled "Standard Test Method for Flow Rates of Thermoplastics by Extrusion Plastometer" at 190° C. using condition E and a 2.16 kg weight ("ASTM D1238").

In one embodiment, the polymer or copolymer product of this invention has a density of from about 0.900 g/cm$^3$ to about 1.100 g/cm$^3$, preferably from about 0.905 g/cm$^3$ to about 1.000 g/cm$^3$, more preferably from about 0.910 g/cm$^3$ to about 0.980 g/cm$^3$, as measured by ASTM method D4883-99 entitled "Standard Test Method for Density of Polyethylene by the Ultrasound Technique" using a TECRAD ultrasonic apparatus ("ASTM D4883").

In one embodiment, the polymer or copolymer product is selected from a resin with a MI by ASTM D1238 of from about 5.0 to about 10.0 g/10 min and a density by ASTM D4883 of from about 0.950 to about 0.975 g/cm$^3$.

In another embodiment, the polymer or copolymer product is selected from a resin with a MI by ASTM D1238 of from about 4.0 to about 9.0 g/10 min and a density by ASTM D4883 of from about 0.935 to about 0.965 g/cm$^3$.

In another embodiment, the polymer or copolymer product is selected from a resin with a MI by ASTM D1238 of from about 1.5 to about 5.0 g/10 min and a density by ASTM D4883 of from about 0.900 to about 0.935 g/cm$^3$.

In another embodiment, the polymer or copolymer product is selected from a resin with a MI by ASTM D1238 of from about 0.1 to about 1.5 g/10 min and a density by ASTM D4883 of from about 0.900 to about 0.935 g/cm$^3$.

In another embodiment, the polymer or copolymer product is selected from a resin with a MI by ASTM D1238 of from about 0.5 to about 2.0 g/10 min and a density by ASTM D4883 of from about 0.900 to about 0.935 g/cm$^3$.

In another embodiment, the polymer or copolymer product is selected from a resin with a MI by ASTM D1238 of from about 1.0 to about 3.5 g/10 min and a density by ASTM D4883 of from about 0.900 to about 0.935 g/cm$^3$.

In another embodiment, the polymer or copolymer product is selected from a resin with a MI by ASTM D1238 of from about 10.0 to about 35.0 g/10 min and a density by ASTM D4883 of from about 0.910 to about 0.945 g/cm$^3$.

In another embodiment, the polymer or copolymer product is selected from a resin with a MI by ASTM D1238 of from about 30.0 to about 70.0 g/10 min and a density by ASTM D4883 of from about 0.910 to about 0.945 g/cm$^3$.

In another embodiment, the polymer or copolymer product is selected from a resin with a MI by ASTM D1238 of from about 0.5 to about 2.0 g/10 min and a density by ASTM D4883 of from about 0.900 to about 0.935 g/cm$^3$.

In another embodiment, the polymer or copolymer product is selected from a so-called "film grade" resin with a MI by ASTM D1238 of from about 0.01 to about 5.0 g/10 min and a density by ASTM D4883 of from about 0.900 to about 0.930 g/cm$^3$, a so-called "molding-grade" resin with a MI of from about 0.1 to about 150 g/10 min and a density of from about 0.920 to about 0.939 g/cm$^3$, and a so-called "high-density" resin with a MI of from about 0.01 to about 70 g/10 min and a density of from about 0.940 to about 0.970 g/cm$^3$.

In another embodiment, the polymer or copolymer product is selected from a film grade resin with a MI by ASTM D1238 of from about 0.5 to about 5.0 g/10 min and a density by ASTM D4883 of from about 0.900 to about 0.930 g/cm$^3$, a molding-grade resin with a MI of from 4.0 to about 150 g/10 min and a density of from about 0.920 to about 0.939 g/cm$^3$, and a high-density resin with a MI of from about 2.0 to about 70 g/10 min and a density of from about 0.940 to about 0.970 g/cm$^3$.

Upon start-up, it is conventional to charge the reactor with existing polymer particles before the recycle stream begins flowing. These existing polymer particles are, advantageously, similar to the fresh particulate polymer product to be produced. However and especially if the existing polymer particles differ, they are withdrawn in combination with the first cut of freshly formed particulate polymer produced after catalyst is introduced and the recycle stream begins to flow. The combined particles are generally segregated from the fresh particulate polymer product so as not to contaminate the latter.

To increase the cooling capacity, and thereby increase the production rate of the polymerization reactor, it is desirable to raise the dew point temperature of the recycle mixture to permit a greater quantity of heat to be removed from the fluidized bed. The dew point of the recycle stream can be increased by increasing the percentage of condensable fluids and, concurrently, decreasing the percentage of noncondensable gases in the recycle mixture, e.g., in the manner disclosed by U.S. Pat. Nos. 4,543,399 and 4,588,790. It is conventional to do so by introducing a condensing agent into the recycle mixture, e.g., after compressor 26 and before condenser 28 through line 16 from source 44 in FIG. 1. Thus, the condensing agent is introduced to the fluidized bed through line 8 in FIG. 1. However, as known to those in the art, the condensing agent can be introduced into the reactor/recycle system by any convenient method and at any convenient location in the system. For example, U.S. Pat. No. 6,001,938 to Chinh et al. discloses first separating a portion of the liquid from the recycle gas and then introducing the liquid through a separate direct-feed stream, such shown in FIG. 1 as line 8A, into a particular location in the fluidized bed.

In one embodiment, the condensing agent can be substantially inert in relation to the catalyst(s), monomer(s) and the polymer product. In an alternate embodiment, the condensing agent can include monomer(s) and/or comonomer(s).

As used herein, the term "condensing agent" includes alkanes and alkenes. Useful condensing agents are selected from alkanes and alkenes containing from 3 to 8 carbon atoms. Alkanes useful for the condensing agent include propane, n-butane, isobutane, n-pentane, isopentane, neopentane, n-hexane, isohexane and other saturated $C_6$ hydrocarbons, n-heptane and other saturated $C_7$ hydrocarbons, n-octane and other saturated $C_8$ hydrocarbons, and mixtures of these alkanes. Alkenes useful for the condensing agent include butene-2, pentene-2, pentene-3 and other unsaturated $C_5$ hydrocarbons, hexene-2, hexene-3 and other unsaturated $C_6$ hydrocarbons, heptene-2, heptene-3, heptene-4 and other unsaturated $C_7$ hydrocarbons, octene-2, octene-3, octene-4 and other unsaturated $C_8$ hydrocarbons, and mixtures of these alkenes. Mixtures comprising at least one alkane and at least one alkene are also useful for the condensing agent.

The condensing agent can include polymerizable alkene monomers such as olefins, particularly α-olefins, dienes, particularly those comprising at least one α-carbon-carbon double bond, and mixtures thereof, including some of the aforementioned monomers that can be partially or entirely incorporated into the polymer product. For example, propylene can be used as a condensing agent as well as a monomer when polypropylene is being manufactured. In another example, when poly(propylene-co-butene-1) is being manufactured, the butene-1 monomer can function as a condensing agent.

In one embodiment, the condensing agent comprises at least one $C_3$ alkane. In another embodiment, the condensing agent comprises at least one $C_4$ alkane. In another embodiment, the condensing agent comprises at least one $C_5$ alkane. In another embodiment, the condensing agent comprises at least one $C_6$ alkane. In another embodiment, the condensing agent comprises at least one $C_7$ alkane. In another embodiment, the condensing agent comprises at least one $C_8$ alkane. In another embodiment, the condensing agent comprises at least one $C_3$ alkane or alkene. In another embodiment, the condensing agent comprises at least one $C_4$ alkane or alkene. In another embodiment, the condensing agent comprises at least one $C_5$ alkane or alkene. In another embodiment, the condensing agent comprises at least one $C_6$ alkane or alkene. In another embodiment, the condensing agent comprises at least one $C_7$ alkane or alkene. In another embodiment, the condensing agent comprises at least one $C_8$ alkane or alkene.

In one embodiment, the condensing agent comprises at least one alkane or alkene with a molecular weight of from about 42 g/mol to about 114 g/mole. In another embodiment, the condensing agent comprises at least one alkane or alkene with a molecular weight of from about 42 g/mol to about 100 g/mole. In another embodiment, the condensing agent comprises at least one alkane or alkene with a molecular weight of from about 42 g/mol to about 86 g/mole.

As is known in the art, a plurality of condensing agents can be used. For example, isopentane can be present in an amount such that it does not cause substantial particulate polymer product stickiness and propane can also be present to increase the amount of condensing achievable as well as to increase the recycle mixture's heat capacity.

In another embodiment, the condensing agent comprises a mixture of at least one $C_3$ alkane and at least one $C_4$ alkane. In another embodiment, the condensing agent comprises a mixture of at least one $C_4$ alkane and at least one $C_5$ alkane. In another embodiment, the condensing agent comprises a mixture of at least one $C_5$ alkane and at least one $C_6$ alkane. In another embodiment, the condensing agent comprises a mixture of at least one $C_4$ alkane, at least one $C_5$ alkane and at least one $C_6$ alkane. In another embodiment, the condensing agent comprises a mixture of at least one $C_6$ alkane and at least one $C_7$ alkane. In another embodiment, the condensing agent comprises a mixture of at least one $C_7$ alkane and at least one $C_8$ alkane. In another embodiment, the condensing agent comprises a mixture of at least one $C_3$ alkane and at least one $C_5$ alkane.

In another embodiment, the condensing agent comprises a mixture of at least one $C_4$ alkane and at least about 96 mol % of at least one $C_5$ alkane. In another embodiment, the condensing agent comprises a mixture of at least about 96 mol % of at least one $C_5$ alkane and at least one $C_6$ alkane. In another embodiment, the condensing agent comprises a mixture of at least one $C_4$ alkane, at least about 96 mol % of at least one $C_5$ alkane and at least one $C_6$ alkane. In another embodiment, the condensing agent comprises a mixture of at least one $C_4$ alkane and at least about 99 mol % of at least one $C_5$ alkane. In another embodiment, the condensing agent comprises a mixture of at least about 99 mol % of at least one $C_5$ alkane and at least one $C_6$ alkane. In another embodiment, the condensing agent comprises a mixture of at least one $C_4$ alkane, at least about 99 mol % of at least one $C_5$ alkane and at least one $C_6$ alkane. In another embodiment, the condensing agent comprises a mixture of at least one $C_4$ alkane and at least about 99.7 mol % of at least one $C_5$ alkane. In another embodiment, the condensing agent comprises a mixture of at least about 99.7 mol % of at least one $C_5$ alkane and at least one $C_6$ alkane. In another embodiment, the condensing agent comprises a mixture of at least one $C_4$ alkane, at least about 99.7 mol % of at least one $C_5$ alkane and at least one $C_6$ alkane.

In another embodiment, the condensing agent comprises a mixture of at least one $C_4$ alkane and at least about 99 mol % of isopentane, neopentane, n-pentane and mixtures thereof. In another embodiment, the condensing agent comprises a mixture of at least one $C_6$ alkane and at least about 99 mol % of isopentane, neopentane, n-pentane and mixtures thereof. In another embodiment, the condensing agent comprises a mixture of at least one $C_4$ alkane, at least one $C_6$ alkane and at least about 99 mol % of isopentane, neopentane, n-pentane and mixtures thereof.

In another embodiment, the condensing agent comprises a mixture of at least one $C_4$ alkane and at least about 99.7 mol % of isopentane, neopentane, n-pentane and mixtures thereof. In another embodiment, the condensing agent comprises a mixture of at least one $C_6$ alkane and at least about 99.7 mol % of isopentane, neopentane, n-pentane and mixtures thereof. In another embodiment, the condensing agent comprises a mixture of at least one $C_4$ alkane, at least one $C_6$ alkane and at least about 99.7 mol % of isopentane, neopentane, n-pentane and mixtures thereof.

In another embodiment, when the monomer comprises ethylene, the condensing agent is selected from the group consisting of n-butane, isobutane, n-pentane, isopentane, n-hexane, n-heptane and mixtures thereof. In another embodiment, when the monomer comprises propylene, the condensing agent is propane.

Conventionally, the dew point or dew point temperature of a gas is the temperature at which that gas is saturated with respect to a condensable component. Thus, as a gas is cooled, the dew point temperature of that gas is that temperature at which liquid condensate begins to form in the gaseous portion. Likewise, the dew point temperature of the cooled recycle stream, e.g., cooled using condenser 28 in FIG. 1, entering the fluidized bed reactor 2 of FIG. 1 through line 8 is that temperature at which liquid condensate begins to form in the gaseous portion of the recycle stream.

It is well known that the recycle stream temperature, i.e., the reactor inlet temperature of the recycle mixture, can be decreased below the dew point temperature of the mixture. For example, it has been demonstrated, e.g., as disclosed by Jenkins et al. in U.S. Pat. Nos. 4,543,399 and 4,588,790, that a recycle stream can be cooled to a temperature below the dew point temperature in a fluidized bed polymerization process to yield a condensed portion of the recycle stream. The resulting stream, containing the liquid condensate, can then be returned to the reactor without ill effects on the fluidized bed, e.g., caused by particulate polymer product stickiness and/or polymer particle agglomeration by sticking. The process of purposefully introducing a liquid condensing agent into the recycle mixture entering the reactor is known to those in the art as a "condensed mode" operation of a gas phase fluidized bed polymerization process.

In one embodiment, the difference between the controlled reactor bed temperature and the recycle stream dew point temperature of the mixture is greater than or equal to about 5° C. In another embodiment, the difference between the controlled reactor bed temperature and the recycle stream dew point temperature of the mixture is greater than or equal to about 10° C. In another embodiment, the difference between the controlled reactor bed temperature and the recycle stream dew point temperature of the mixture is greater than or equal to about 15° C.

The condensing agent, or agents, is present at a level to facilitate condensing and to form a liquid-containing recycle mixture which is then introduced into the reaction zone of the reactor. Thus, the fluidized bed reactor polymerization method of the present invention can operate in the "condensed mode."

Depending upon the selected combination of the particular polymer product and the condensing agent(s), there can be an upper limit on the amount of liquid in the liquid-containing recycle mixture. For example, when the polymer product is less crystalline, such as poly(propylene-co-butene-1), lower levels of a $C_5$ alkane and/or alkene condensing agent must be used compared to a $C_4$ alkane and/or alkene condensing agent, and lower levels of the $C_4$ alkane and/or alkene condensing agent must be used compared to a $C_3$ alkane and/or alkene condensing agent. Thus, isopentane, for example, tends to become dissolved in a less crystalline polymer product and soften it, therefore, less isopentane condensing agent must be used. On the other hand, propane, even if present at a relatively high level, is not particularly soluble in poly(propylene-co-butene-1). Therefore, as propane does not significantly soften that copolymer, it is a condensing agent which can be used at high concentrations in the liquid-containing recycle mixture introduced into the fluidized bed reactor used for making poly(propylene-co-butene-1).

In one embodiment, the liquid-containing mixture that is introduced or recycled into the reaction zone comprises from about 17.5% to about 70% liquid by weight based on the total weight of the recycle stream. In another embodiment, the liquid-containing mixture that is introduced or recycled into the reaction zone comprises from about 20% to about 70% liquid by weight based on the total weight of the recycle stream. In another embodiment, the liquid-containing mixture that is introduced or recycled into the reaction zone comprises from about 21.8% to about 70% liquid by weight based on the total weight of the recycle stream.

In one embodiment for making polyethylene from ethylene, the liquid-containing mixture that is introduced or recycled into the reaction zone comprises at least about 21.8% liquid by weight based on the total weight of the recycle stream. In another embodiment for making polyethylene from ethylene, the liquid-containing mixture that is introduced or recycled into the reaction zone comprises from about 30% to about 70% liquid by weight based on the total weight of the recycle stream.

In one embodiment for making poly(ethylene-co-butene-1) from ethylene and butene-1, the liquid-containing mixture that is introduced or recycled into the reaction zone comprises from about 17.5% to about 40% liquid by weight based on the total weight of the recycle stream.

In one embodiment for making poly(ethylene-co-hexene-1) from ethylene and hexene-1, the liquid-containing mixture that is introduced or recycled into the reaction zone comprises at least about 17.5% liquid by weight based on the total weight of the recycle stream. In another embodiment for making poly(ethylene-co-hexene-1) from ethylene and hexene-1, the liquid-containing mixture that is introduced or recycled into the reaction zone comprises at least about 20% liquid by weight based on the total weight of the recycle stream.

The reactor inlet temperature, i.e., the temperature of the stream that is introduced or recycled into the reaction zone, is conventionally measured in a plenum chamber in the bottom of the reactor column, e.g., below the distributor plate 32 as illustrated in FIG. 2a. The reactor inlet temperature can be measured using any conventional means, e.g., by using at least one thermometer, thermocouple, thermistor or platinum resistance thermometer.

In one embodiment, the reactor inlet temperature of the stream that is introduced or recycled into the reaction zone is from about 10° C. to about 60° C. In another embodiment, the reactor inlet temperature of the stream that is introduced or recycled into the reaction zone is from about 20° C. to about 55° C. In another embodiment, the reactor inlet temperature of the stream that is introduced or recycled into the reaction zone is from about 25° C. to about 50° C. In another embodiment, the reactor inlet temperature of the liquid-containing mixture that is introduced or recycled into the reaction zone is from about 10° C. to about 60° C. In another embodiment, the reactor inlet temperature of the liquid-containing mixture that is introduced or recycled into the reaction zone is from about 20° C. to about 55° C. In another embodiment, the reactor inlet temperature of the liquid-containing mixture that is introduced or recycled into the reaction zone is from about 25° C. to about 50° C.

Even under stable operating state polymerization conditions in the gas fluidized bed reactor, there will be a "temperature gradient region" near the bottom of the fluidized bed in a region or layer extending upward from the distributor plate, e.g., from the surface of the distributor plate facing the fluidized bed, into the bed a distance of from about 102 mm to about 203 mm above that surface, as a result of the temperature differential between the inlet temperature of the mixture being introduced or recycled into the reactor, i.e., the reactor inlet temperature, and the controlled reactor bed temperature. In the remainder of the fluidized bed above this lower non-isothermal region, the temperature of the fluidized bed is essentially constant at the controlled reactor bed temperature.

The present invention employs a plurality of temperature measurement devices, i.e., "measuring site$_n$" devices, located in the above-described temperature gradient region of the reaction zone 2 of the reactor. For example, FIG. 2 illustrates four such measuring site$_n$ devices, each located inside the reactor at about 0.0091Q (about 152 mm for Q=16,640 mm) above the surface of the distributor plate facing the fluidized bed, i.e., at measuring site$_1$, measuring site$_2$, measuring site$_3$ and measuring site$_4$.

To provide for uniformity in the location of each temperature measurement and the "disturbance" of flow in the fluidized bed in the vicinity of each site$_n$ device, if any, each measuring site$_n$ device is located substantially the same distance above the surface of the distributor plate facing the fluidized bed and projects substantially the same dimension into the reactor. In one embodiment, each measuring site$_n$ device is located at greater than or equal to about 0.0066Q and less than or equal to about 0.022Q above the surface of the distributor plate facing the fluidized bed within the reaction zone 2 of the reactor column. In another embodiment, each measuring site$_n$ device is located at greater than or equal to about 0.0075Q and less than or equal to about 0.015Q above the surface of the distributor plate facing the fluidized bed within the reaction zone 2 of the reactor column. In another embodiment, each measuring site$_n$ device is located at greater than or equal to about 0.0088Q and less than or equal to about 0.013Q above the surface of the distributor plate facing the fluidized bed within the reaction zone 2 of the reactor column. In one embodiment, Q is about 13.6 m. In another embodiment, Q is about 16.64 m. In another embodiment, Q is about 21.0 m.

In another embodiment, each measuring site$_n$ device is located about 152 mm above the surface of the distributor plate facing the fluidized bed within the reaction zone 2 of a reactor about 13.6 m in length. In another embodiment, each measuring site$_n$ device is located about 152 mm above the surface of the distributor plate facing the fluidized bed within the reaction zone 2 of a reactor about 16.64 m in length. In another embodiment, each measuring site$_n$ device is located about 152 mm above the surface of the distributor plate facing the fluidized bed within the reaction zone 2 of a reactor about 21.0 m in length. In another embodiment, each measuring site$_n$ device is located about 102 mm above the surface of the distributor plate facing the fluidized bed within the reaction zone 2 of a reactor about 13.6 m in length. In another embodiment, each measuring site$_n$ device is located about 102 mm above the surface of the distributor plate facing the fluidized bed within the reaction zone 2 of a reactor about 16.64 m in length. In another embodiment, each measuring site$_n$ device is located about 102 mm above the surface of the distributor plate facing the fluidized bed within the reaction zone 2 of a reactor about 21.0 m in length. In another embodiment, as indicated in FIG. 2a, when Q is about 16.64 m, each measuring site$_n$ device is located at, and each measuring site$_n$ temperature is measured at, a height of about 152 mm above the surface of the distributor plate 32 facing the fluidized bed.

In one embodiment, each measuring site$_n$ device projects from about 0.048D to about 0.18D into the reactor from the reactor's inner wall, where D is the smallest dimension from one wall to an opposite wall, measured perpendicular to each wall, for the smallest inner cross-sectional area of the reaction zone 2 existing from the surface of the distributor plate facing the fluidized bed into the bed a distance of up to about 203 mm above that surface. In another embodiment, each measuring site$_n$ device projects from about 0.062D to about 0.14D into that reactor from the reactor's inner wall. In another embodiment, each measuring site$_n$ device projects from about 0.070D to about 0.10D into that reactor from the reactor's inner wall.

In one embodiment, for a cylindrical reaction zone, i.e., one with a circular cross-sectional area, each measuring site$_n$ device projects from about 0.048ID to about 0.18ID into the reactor from the reactor's inner wall, where ID is the inner reactor diameter. In another embodiment, each measuring site$_n$ device projects from about 0.062ID to about 0.14ID into that reactor from the reactor's inner wall. In another embodiment, each measuring site$_n$ device projects from about 0.070ID to about 0.10ID into that reactor from the reactor's inner wall.

In one embodiment, each measuring site$_n$ device projects about 300 mm into the reactor, with an ID of about 4.42 m, from the reactor's inner wall. In another embodiment, each measuring site$_n$ device projects about 350 mm into the reactor, with an ID of about 4.42 m, from the reactor's inner wall. In another embodiment, each measuring site$_n$ device projects about 300 mm into the reactor, with an ID of about 5.5 m, from the reactor's inner wall. In another embodiment, each measuring site$_n$ device projects about 350 mm into the reactor, with an ID of about 5.5 m, from the reactor's inner wall. In another embodiment, each measuring site$_n$ device projects about 400 mm into the reactor, with an ID of about 5.5 m, from the reactor's inner wall.

Any number of measuring site$_n$ devices can be present, provided, of course, that a plurality of measuring site$_n$ devices are present. In one embodiment, there are four measuring site$_n$ devices. In another embodiment, there are eight measuring site$_n$ devices. In another embodiment, there are twelve measuring site$_n$ devices. In another embodiment, there are sixteen measuring site$_n$ devices.

In the embodiment illustrated in FIG. 2b, four measuring site$_n$ devices are spaced substantially equally radially about the circumference of the reactor, i.e., there are about 90° of arc between measuring site$_1$ and measuring site$_2$, between measuring site$_2$ and measuring site$_3$, between measuring site$_3$ and measuring site$_4$, and between measuring site$_4$ and measuring site$_1$. In another embodiment, eight measuring site$_n$ devices are spaced substantially equally radially about the circumference of the reactor. In another embodiment, twelve measuring site$_n$ devices are spaced substantially equally radially about the circumference of the reactor. In another embodiment, sixteen measuring site$_n$ devices are spaced substantially equally radially about the circumference of the reactor. The temperature at each measuring site$_n$, i.e., the measuring site$_n$ temperature, can be measured using any conventional means, e.g., by using a thermometer, thermocouple, thermistor or platinum resistance thermometer.

For the purposes of this application, the quantity $A_n$ is defined, in terms of the controlled reactor bed temperature, reactor inlet temperature and each measuring site$_n$ temperature, by the following equation (1):

$$A_n = \frac{\text{(controlled reactor bed temperature)} - \text{(measuring site}_n \text{ temperature)}}{\text{(controlled reactor bed temperature)} - \text{(reactor inlet temperature)}} \quad (1)$$

where each temperature is expressed in the same unit of temperature measurement, e.g., in ° C. Thus, $A_n$, being a ratio of two temperature differences, is a dimensionless parameter. Each $A_n$ relates to the temperature at particular measuring site$_n$. For example, the temperature determined at measuring site$_1$ is used to calculate $A_1$, the temperature determined at measuring site$_2$ is used to calculate $A_2$, and so on. Thus, in an embodiment where there are sixteen measuring site$_n$ temperatures, i.e., a measuring site$_1$ temperature through measuring site$_{16}$ temperature, there are sixteen $A_n$ values, i.e., $A_1$ through $A_{16}$, respectively.

It has now surprisingly been discovered that certain ranges of values for $A_n$ can be used to find and define desirable operating states for the gas fluidized bed reactor polymerization method, as discussed below. Inevitably, as there can be fluctuations in each of the temperatures involved in determining $A_n$, it is particularly important to discern trends in $A_n$. This can be done by observing multiple $A_n$ values, e.g., at least about 18, over a relatively short period of time, e.g., about 3 minutes, to determine whether a noteworthy $A_n$ value is a momentary fluctuation or an indicator of a changing operating state. Momentary fluctuations in $A_n$ will not be sustained over even this relatively short time period; $A_n$ values indicating a changing operating state will be sustained over this relatively short time period.

The fluidized bed density ("FBD") in a gas fluidized bed polymerization reactor is conventionally defined as the pressure drop measured upwardly, i.e., in the direction of gas flow, across a portion of the reactor divided by the distance over which the pressure drop is measured. As such, those in the art recognize that the FBD is an average value.

Conventionally, typical fluidized bed polymerization reactors have pressure measurement points or taps at three heights within the reaction zone. Therefore, the fluidized bed within the reactor has been divided into two zones or sections known as the lower fluidized bed and the upper fluidized bed. The bottom or start of the lower fluidized bed begins at or near to the surface of the distributor plate, e.g., 32 in FIG. 1, facing the fluidized bed and extends upward, i.e., in the direction of gas flow, its top or uppermost extent ending at the bottom or start of the upper fluidized bed. The bottom of the upper fluidized bed begins at the top surface of the lower fluidized bed and extends upward, i.e., in the direction of gas flow, its top ending at or near to the top of the fluidized bed.

In one embodiment, the lower fluidized bed pressure drop is measured between a first location, at from about 0.005Q to about 0.028Q in height above the surface of the distributor plate facing the fluidized bed, and a second location at from about 0.15Q to about 0.49Q in height above the surface of the distributor plate facing the fluidized bed. In another embodiment, the lower fluidized bed pressure drop is measured between a first location, at from about 0.006Q to about 0.021Q, and a second location at from about 0.18Q to about 0.45Q. In another embodiment, the lower fluidized bed pressure drop is measured between a first location, at from about 0.008Q to about 0.014Q, and a second location at from about 0.19Q to about 0.42Q.

In one embodiment, the upper fluidized bed pressure drop is measured between a third location, at from about 0.15Q to about 0.49Q in height above the surface of the distributor plate facing the fluidized bed, and a fourth location at from about 0.55Q to about 0.80Q in height above the surface of the distributor plate facing the fluidized bed. In another embodiment, the upper fluidized bed pressure drop is measured between a third location, at from about 0.18Q to about 0.45Q, and a fourth location at from about 0.60Q to about 0.78Q. In another embodiment, the upper fluidized bed pressure drop is measured between a third location, at from about 0.19Q to about 0.42Q, and a fourth location at from about 0.615Q to about 0.75Q.

In one embodiment, the second location is the same, relative to Q, as the third location. In another embodiment, the second location is different, relative to Q, from the third location.

The fluidized bed density is observed using a pressure difference measurement between the lower region of the bed and the upper region of the bed. For example, as shown in FIG. 2a, the lower fluidized bed density ("LBD") can be determined from the pressure difference between pressure tap P1, 0.0091Q above the surface of the distributor plate facing the fluidized bed (e.g., about 151 mm for Q=16,640 mm), and pressure tap P2, 0.37Q above the distributor plate (e.g., about 6,150 mm for Q=16,640 mm), divided by the distance separating P1 and P2, i.e., about 0.36Q (e.g., about 6,000 mm for Q=16,640 mm). The upper fluidized bed density ("UBD") can be determined from the pressure difference between pressure tap P2, 0.37Q above the surface of the distributor plate facing the fluidized bed (e.g., about 6,150 mm for Q=16,640 mm), and pressure tap P3, 0.73Q above the distributor plate (e.g., about 12,150 mm for Q=16,640 mm), divided by the distance separating P2 and P3, i.e., about 0.36Q (e.g., about 6,000 mm for Q=16,640 mm).

The UBD can be from about 190 to about 400 kg/m$^3$. In another embodiment, the UBD is from about 200 to about 370 kg/m$^3$. In another embodiment, the UBD is from about 210 to about 340 kg/m$^3$. In another embodiment, the UBD is from about 220 to about 350 kg/m$^3$. In another embodiment, the UBD is from about 220 to about 300 kg/m$^3$.

It is conventional that the weight of the fluidized bed or bed weight is approximately equal to the pressure drop through the bed times the internal cross-sectional area of the reactor. The height of the fluidized bed or bed height is usually kept above the location where P3 is measured, e.g., above 0.73Q for the reactor column in FIG. 2a. As known to those in the art, the calculation of its specific value can be determined from the pressure readings at P3, P5 and the UBD and will depend upon the configuration of each specific reactor column. The quantity known in the art as the "neck ΔP" gives an indication of the extent, if any, that the fluidized bed reaches into the expansion zone, e.g., 4 in FIG. 1. For example, for Q=16,640 mm and a reactor column configured as shown in FIG. 2a, neck ΔP can be determined from the pressure difference between pressure tap P4, 16,967 mm above the surface of the distributor plate facing the fluidized bed, and pressure tap P5, 26,310 mm above the distributor plate.

The pressure can be measured using any conventional means, e.g., by using a manometer, pressure gauge or pressure transmitter. The pressure difference or pressure drop can be measured using any conventional means, e.g., by using a differential manometer, differential pressure gauge or electronically comparing the signals from two pressure transmitters.

For the purposes of this application, the quantity $\Delta\rho$ is defined, in terms of the LBD and UBD, by the following equation (2):

$$\Delta\rho = LBD - UBD \qquad (2)$$

where each density is, of course, expressed in the same unit of density measurement, e.g., in kg/m$^3$. Inevitably, as there can be fluctuations in each of the pressures involved in determining $\Delta\rho$, it is particularly important to discern trends in $\Delta\rho$. This can be done by observing multiple $\Delta\rho$ values, e.g., at least about 18, over a relatively short period of time, e.g., about 3 minutes, to determine whether a noteworthy $\Delta\rho$ value is a momentary fluctuation or an indicator of a changing operating state. Momentary fluctuations in $\Delta\rho$ will not be sustained over even this relatively short time period; $\Delta\rho$ values indicating a changing operating state will be sustained over this relatively short time period.

It has now surprisingly been discovered that $\Delta\rho$ and $A_n$ are useful for monitoring changes in the condition of the fluidized bed in the reaction zone and that certain ranges of $\Delta\rho$, in some cases combined with certain ranges of values for $A_n$, can be used to find and define desirable pure operating states for the gas fluidized bed reactor polymerization method, as discussed below.

For the purposes of this application, the following seven "pure" continuity states are defined herein: the "steady state," the "alert state," the "corrective action state," the "continuity impairment state," the "loss of continuity state 1," the "$\Delta\rho$ alarm state," and the "loss of continuity state 2." Certain ranges of $\Delta\rho$, in some cases combined with certain ranges of values for $A_n$, can be used to find and define desirable operating states, i.e., the "steady state," "alert state," "corrective action state," "continuity impairment state" and/or "$\Delta\rho$ alarm state" for the gas fluidized bed reactor polymerization method, as discussed below. Table 1 below summarizes the attributes of the seven "pure" continuity states defined herein.

TABLE 1

Pure Continuity States

| | |
|---|---|
| Loss of Continuity State 1 | 70 kg/m$^3$ ≦ $\Delta\rho$ |
| | 0.8 ≦ $A_n$ < 1.0 |
| Continuity Impairment State | 50 kg/m$^3$ ≦ $\Delta\rho$ < 70 kg/m$^3$ |
| | 0.7 ≦ $A_n$ < 0.8 |
| Corrective Action State | 40 kg/m$^3$ ≦ $\Delta\rho$ < 50 kg/m$^3$ |
| | 0.6 ≦ $A_n$ < 0.7 |
| Alert State | 30 kg/m$^3$ ≦ $\Delta\rho$ < 40 kg/m$^3$ |
| | 0.55 ≦ $A_n$ < 0.6 |
| Steady State | 10 kg/m$^3$ ≦ $\Delta\rho$ < 30 kg/m$^3$ |
| | 0.25 ≦ $A_n$ < 0.55 |
| $\Delta\rho$ Alarm State | 0 kg/m$^3$ ≦ $\Delta\rho$ < 10 kg/m$^3$ |
| Loss of Continuity State 2 | "$\Delta\rho$" < 0 kg/m$^3$ |

As used herein, the "critical number" of $A_n$ values that satisfy the condition of a state is not constant but depends upon the number of temperature measuring site$_n$ devices present. In one embodiment, when there are four temperature measuring site$_n$ devices present, i.e., as shown in FIG. 2b, the critical number of $A_n$ values is two. In another embodiment, when there are sixteen temperature measuring site$_n$ devices present, the critical number of $A_n$ values is three. In another embodiment, when there are n temperature measuring site$_n$ devices present, the critical number of $A_n$ values is $(n)^{1/3}$ taken to the nearest integer if $(n)^{1/3}$ is not an integer. For example, if n is 2, the critical number is 1; if n is 3, the critical number is 1; if n is 4, the critical number is 2; if n is 8, the critical number is 2; if n is 12, the critical number is 2; if n is 15, the critical number is 2; if n is 16, the critical number is 3; and so on.

It has been discovered that in fluidized bed polymerizations conducted over a wide range of conditions, e.g., from dry mode methods up to methods featuring relatively high condensation levels, an identifiable point can be reached at and beyond which there is danger of failure of the method, e.g., a loss of continuity, if $\Delta\rho$ and/or the critical number of $A_n$ values further increase. This point can be identified by monitoring the LBD, UBD and, in some cases, the controlled reactor bed temperature, measuring site$_n$ temperatures and reactor inlet temperature; it is applicable to a wide range of conditions, from dry mode methods up to methods featuring relatively high condensation levels. Monitoring can be accomplished by conventional means, for example, by a computer-controlled system which periodically samples and displays these parameters, computes $\Delta\rho$ or $A_n$, and compares $\Delta\rho$ or $A_n$ with limits and values, respectively.

In the desirable operating state termed the "steady state," at least the critical number of $A_n$ satisfy the condition $0.25 \leq A_n < 0.55$ and $\Delta\rho$ satisfies the condition $10$ kg/m$^3 \leq \Delta\rho < 30$ kg/m$^3$. In the "steady state," the lower value to which $A_n$ is compared is 0.25, the upper value to which $A_n$ is compared is 0.55, and there are two limits to which $\Delta\rho$ is compared, 10 kg/m$^3$ and 30 kg/m$^3$. No particular action is necessary in order to decrease $A_n$ and/or $\Delta\rho$ while each remains within their "steady state" operating range. However, even in the "steady state," it is recommended that the $A_n$ values, LBD, and UBD be closely monitored, especially when the condensation level is relatively high, e.g., at 17.5 wt. % and above. The continuous gas fluidized bed method for making a polymer of the invention can continue to operate in the "steady state."

The "alert state" is reached if at least the critical number of $A_n$ satisfy the condition $0.55 \leq A_n < 0.6$ and $\Delta\rho$ satisfies the condition $30$ kg/m$^3 \leq \Delta\rho < 40$ kg/m$^3$. In the "alert state," the lower value to which $A_n$ is compared is 0.55, the upper value to which $A_n$ is compared is 0.6, and there are two limits to which $\Delta\rho$ is compared, 30 kg/m$^3$ and 40 kg/m$^3$. It is necessary to be alert to any further increase in $A_n$ and/or $\Delta\rho$ values as such further increase or increases can indicate that the "corrective action state" is being approached or has been reached. While no particular action is necessary in order to decrease $A_n$ and/or $\Delta\rho$, or at least reduce the possibility that $A_n$ and/or $\Delta\rho$ will further increase, it is recommended that the following actions be taken:

Monitor the bed height, bed weight, LBD, UBD and the mass flow rate of the stream passing through the fluidized bed.

Keep the bed weight at a substantially constant level.

Determine that there is no full or partial blockage of the PDS system and, if there is any, remedy that condition.

Determine that there is no full or partial blockage of the pressure measurement taps and, if there is any, remedy that condition.

Reduce the catalyst feed by 50%.

The continuous gas fluidized bed method for making a polymer of the invention can continue to operate in the "alert state." Of course, the polymer-making efficiency of the method can decrease during the time that the catalyst feed is reduced.

The "corrective action state" is reached if at least the critical number of $A_n$ satisfy the condition $0.6 \leq A_n < 0.7$ and $\Delta\rho$ satisfies the condition $40 \text{ kg/m}^3 \leq \Delta\rho < 50 \text{ kg/m}^3$. In the "corrective action state," the lower value to which $A_n$ is compared is 0.6, the upper value to which $A_n$ is compared is 0.7, and there are two limits to which $\Delta\rho$ is compared, 40 $\text{kg/m}^3$ and 50 $\text{kg/m}^3$. In order to decrease $A_n$ and/or $\Delta\rho$, or at least reduce the possibility that $A_n$ and/or $\Delta\rho$ will further increase, it is recommended that the following actions be taken:

Stop the catalyst feed.

Monitor the bed height, bed weight, LBD, UBD and the mass flow rate of the stream passing through the fluidized bed.

Keep the bed weight at a substantially constant level; the fluidized bed weight set-point should not be changed in an attempt to change the bed height.

Keep the recycle gas circulating by keeping the compressor operating.

Check the pressure measurement taps nearest the distributor plate to confirm that the bed is fluidized and, if not, remedy that condition.

Taking these actions is believed to reduce or even eliminate the possibility that the "continuity impairment state," described in the following paragraph, will be reached. However, even in the absence of any recommended action, the continuous gas fluidized bed method for making a polymer of the invention can continue to operate in the "corrective action state." Of course, the polymer-making efficiency of the method can decrease during the time that the catalyst feed is stopped.

The "continuity impairment state" is reached if at least the critical number of $A_n$ satisfy the condition $0.7 \leq A_n < 0.8$ and $\Delta\rho$ satisfies the condition $50 \text{ kg/m}^3 \leq \Delta\rho < 70 \text{ kg/m}^3$. In the "continuity impairment state," the lower value to which $A_n$ is compared is 0.7, the upper value to which $A_n$ is compared is 0.8, and there are two limits to which $\Delta\rho$ is compared, 50 $\text{kg/m}^3$ and 70 $\text{kg/m}^3$. In order to decrease $A_n$ and/or $\Delta\rho$, or at least reduce the possibility that $A_n$ and/or $\Delta\rho$ will further increase, it is recommended that the following actions be taken:

Stop the catalyst feed, if it has not been already stopped, and perform a so-called "type I kill" of the catalyst.

Keep the bed weight at a substantially constant level; the fluidized bed weight set-point should not be changed in an attempt to change the bed height.

Keep the recycle gas circulating by keeping the compressor operating.

It is well known in the art that a "type I kill" involves adding an effective amount of a catalyst poison, typically carbon monoxide, to the reactor while the compressor is operating, thereby circulating the carbon monoxide and deactivating the catalyst inventory inside the reactor. Also, it is well known in the art that a type I kill can be reversed by adding additional catalyst after purging the catalyst poison from the system.

Additionally, as there is a possibility that polymer chunks could have formed within the reactor in the "continuity impairment state," it is desirable to examine the taps in proximity to the distributor plate, e.g., the taps for the pressure and/or measuring site$_n$ temperature measurement device access, to ensure no polymer chunk has contributed toward full or partial blockage of those taps. If full or partial blockage is noted, the affected tap(s) should be cleared, e.g., by drilling out. Moreover, if polymer chunks form within the reactor, it can be necessary for the method to be interrupted while the chunks are removed, typically a period of about 1–3 days. Of course, the polymer-making efficiency of the method is decreased during this period. However, as an interruption during the "continuity impairment state" is typically of shorter duration than an interruption during the "loss of continuity state 1," the former state is advantageous when compared to the latter.

The "loss of continuity state 1" is reached if at least the critical number of $A_n$ satisfy the condition $0.8 \leq A_n < 1.0$ and $\Delta\rho$ satisfies the condition $70 \text{ kg/m}^3 \leq \Delta\rho$. In the "loss of continuity state 1," the lower value to which $A_n$ is compared is 0.8, the upper value to which $A_n$ is compared is 1.0, and there is one limit to which $\Delta\rho$ is compared, 70 $\text{kg/m}^3$. As polymer chunks can form within the reactor in the "loss of continuity state 1", partially or fully blocking it, it can be necessary for the method to be interrupted while such chunks are removed, typically a period of about 7–15 days.

It has also been discovered that in fluidized bed polymerizations conducted over a wide range of conditions, e.g., from dry mode methods up to methods featuring relatively high condensation levels, an identifiable point can be reached at and beyond which there is danger of failure of the method, e.g., a loss of continuity, if $\Delta\rho$ decreases below a certain level. The "$\Delta\rho$ alarm state" is reached if $\Delta\rho$ falls below the $\Delta\rho$ range for the "steady state," satisfying the condition $0 \text{ kg/m}^3 \leq \Delta\rho < 10 \text{ kg/m}^3$. In the "$\Delta\rho$ alarm state," there are two limits to which $\Delta\rho$ is compared, 0 $\text{kg/m}^3$ and 10 $\text{kg/m}^3$. In order to increase $\Delta\rho$, or at least reduce the possibility that $\Delta\rho$ will further decrease, it is recommended that the following actions be taken:

Monitor the bed height, bed weight, LBD, UBD and the mass flow rate of the stream passing through the fluidized bed.

Keep the bed weight at a substantially constant level; the fluidized bed weight set-point should not be changed in an attempt to change the bed height.

Keep the recycle gas circulating by keeping the compressor operating.

Check the pressure measurement taps nearest the distributor plate to confirm that the bed is fluidized and, if not, remedy that condition.

Additionally, if $\Delta\rho$ continues to indicate the "$\Delta\rho$ alarm state" over an extended time period, e.g., for at least 10 to 15 minutes, the following actions must be taken:

Transition from the catalyst batch then in use to a new batch of catalyst.

Reduce the new catalyst feed by 50% when compared to the feed level of the previous batch.

Taking such actions is believed to reduce or even eliminate the possibility that the "loss of continuity state 2," described in the following paragraph, will be reached. However, the continuous gas fluidized bed method for making a polymer of the invention can continue to operate in the "$\Delta\rho$ alarm state." Of course, the polymer-making efficiency of the method can decrease during the time that the catalyst feed is reduced.

The "loss of continuity state 2" is reached if "$\Delta\rho$" satisfies the condition "$\Delta\rho$"$< 0 \text{ kg/m}^3$. In the "loss of continuity state 2," there is one limit to which "$\Delta\rho$" is compared, 0 $\text{kg/m}^3$. As discussed above, since there can be fluctuations in each of the pressures involved in determining $\Delta\rho$, it is important to discern trends in $\Delta\rho$ particularly in relation to "loss of continuity state 2." This can be done by observing multiple Δρ values, e.g., at least about 18, over a relatively short period of time, e.g., about 3 minutes, to determine whether a noteworthy Δρ value is a momentary fluctuation or an indicator of a changing operating state. Therefore, Δρ, in relation to the "loss of continuity state 2," is denoted as "Δρ" to signify that a momentary fluctuation in Δρ is not sufficient to trigger an indication of the "loss of continuity state 2." Rather, a sustained change in (LBD−UBD), i.e., "Δρ," is required to indicate the "loss of continuity state 2."

In order to increase "Δρ," or at least reduce the possibility that "Δρ" will further decrease, it is recommended that the following actions be taken:

Stop the catalyst feed, if it has not been already stopped, and perform a so-called "type I kill" of the catalyst.

Keep the recycle gas circulating by keeping the compressor operating.

Stop the feed of monomer(s) and comonomer(s).

As polymer chunks can form within the reactor in the "loss of continuity state 2," partially or fully blocking it, it can be necessary for the method to be interrupted while the chunks are removed, typically a period of about 7–15 days.

During the course of the present continuous gas fluidized bed method for making a polymer, "transitional" continuity states could be encountered in addition to the seven "pure" continuity states discussed in detail above. As used herein, a "transitional" continuity state exists when the Δρ value is within the range for Δρ specified for one pure continuity state other than a loss of continuity state, but the critical number of $A_n$ values is within the range for $A_n$ specified for a different pure continuity state other than a loss of continuity state. For example, a transitional continuity state exists when Δρ is 35 kg/m³, i.e., within the Δρ range of the "alert state," while three of a total of four $A_n$ values satisfy the condition $0.25 \leq A_n < 0.55$, i.e., within the $A_n$ range of the "steady state." As another example, a transitional continuity state exists when Δρ is 5 kg/m³, i.e., within the Δρ range of the "Δρ alarm state," while two of a total of four $A_n$ values satisfy the condition $0.55 \leq A_n < 0.6$, i.e., within the $A_n$ range of the "alert state."

Should a transitional continuity state be encountered during operation, it is desirable to consider proceeding with the recommended actions provided above for the constituent pure continuity state that is furthest removed from the "steady state," and for the "Δρ alarm state" if Δρ is <10 kg/m³. For example, for the transitional state above where Δρ indicates the "alert state" while three of four $A_n$ values indicate the "steady state," it is desirable to consider proceeding with the recommended actions provided above for the "alert state." As another example, for the transitional state above where Δρ indicates the "Δρ alarm state" while two of four $A_n$ values indicate the "alert state," it is desirable to consider proceeding with the recommended actions provided above for the "alert state" and/or for the "Δρ alarm state."

In one embodiment, the continuous gas fluidized bed method for making a polymer of the invention operates in the steady state.

In another embodiment, the continuous gas fluidized bed method for making a polymer of the invention operates in the alert state.

In another embodiment, the continuous gas fluidized bed method for making a polymer of the invention operates in the corrective action state.

In another embodiment, the continuous gas fluidized bed method for making a polymer of the invention operates in the continuity impairment state.

In another embodiment, the continuous gas fluidized bed method for making a polymer of the invention operates in the Δρ alarm state.

In another embodiment, the continuous gas fluidized bed method for making a polymer of the invention operates in the steady state and the alert state.

In another embodiment, the continuous gas fluidized bed method for making a polymer of the invention operates in the steady state and the Δρ alarm state.

In another embodiment, the continuous gas fluidized bed method for making a polymer of the invention operates in the alert state and the corrective action state.

In another embodiment, the continuous gas fluidized bed method for making a polymer of the invention operates in the corrective action state and the continuity impairment state.

In another embodiment, the continuous gas fluidized bed method for making a polymer of the invention operates in the Δρ alarm state, the steady state and the alert state.

In another embodiment, the continuous gas fluidized bed method for making a polymer of the invention operates in the steady state, the alert state and the corrective action state.

In another embodiment, the continuous gas fluidized bed method for making a polymer of the invention operates in the alert state, the corrective action state and the continuity impairment state.

In another embodiment, the continuous gas fluidized bed method for making a polymer of the invention operates in the Δρ alarm state, the steady state, the alert state and the corrective action state.

In another embodiment, the continuous gas fluidized bed method for making a polymer of the invention operates in the steady state, the alert state, the corrective action state and the continuity impairment state.

In another embodiment, the continuous gas fluidized bed method for making a polymer of the invention operates in the Δρ alarm state, the steady state, the alert state, the corrective action state and the continuity impairment state.

In another embodiment, the continuous gas fluidized bed method for making a polymer of the invention operates in the steady state or the alert state.

In another embodiment, the continuous gas fluidized bed method for making a polymer of the invention operates in the steady state or the Δρ alarm state.

In another embodiment, the continuous gas fluidized bed method for making a polymer of the invention operates in the alert state or the corrective action state.

In another embodiment, the continuous gas fluidized bed method for making a polymer of the invention operates in the corrective action state or the continuity impairment state.

In another embodiment, the continuous gas fluidized bed method for making a polymer of the invention operates in the Δρ alarm state, the steady state or the alert state.

In another embodiment, the continuous gas fluidized bed method for making a polymer of the invention operates in the steady state, the alert state or the corrective action state.

In another embodiment, the continuous gas fluidized bed method for making a polymer of the invention operates in the alert state, the corrective action state or the continuity impairment state.

In another embodiment, the continuous gas fluidized bed method for making a polymer of the invention operates in the Δρ alarm state, the steady state, the alert state or the corrective action state.

In another embodiment, the continuous gas fluidized bed method for making a polymer of the invention operates in the steady state, the alert state, the corrective action state or the continuity impairment state.

In another embodiment, the continuous gas fluidized bed method for making a polymer of the invention operates in the Δρ alarm state, the steady state, the alert state, the corrective action state or the continuity impairment state.

In another embodiment, the continuous gas fluidized bed method for making a polymer of the invention operates such that, simultaneously, Δρ satisfies the condition 10 kg/m³≦Δρ<30 kg/m³ and at least a critical number of $A_n$ satisfy the condition 0.25≦$A_n$<0.55.

In another embodiment, the continuous gas fluidized bed method for making a polymer of the invention operates such that, simultaneously, Δρ satisfies the condition 30 kg/m³≦Δρ<40 kg/m³ and at least a critical number of $A_n$ satisfy the condition 0.55≦$A_n$<0.6.

In another embodiment, the continuous gas fluidized bed method for making a polymer of the invention operates such that, simultaneously, Δρ satisfies the condition 40 kg/m³≦Δρ<50 kg/m³ and at least a critical number of $A_n$ satisfy the condition 0.6≦$A_n$<0.7.

In another embodiment, the continuous gas fluidized bed method for making a polymer of the invention operates such that, simultaneously, Δρ satisfies the condition 50 kg/m³≦Δρ<70 kg/m³ and at least a critical number of $A_n$ satisfy the condition 0.7≦$A_n$<0.8.

In another embodiment, the continuous gas fluidized bed method for making a polymer of the invention operates such that Δρ satisfies the condition 0 kg/m³≦Δρ<10 kg/m³.

In another embodiment, the continuous gas fluidized bed method for making a polymer of the invention operates such that, simultaneously, Δρ satisfies the condition 10 kg/m³≦Δρ<40 kg/m³ and at least a critical number of $A_n$ satisfy the condition 0.25≦$A_n$<0.6.

In another embodiment, the continuous gas fluidized bed method for making a polymer of the invention operates such that, simultaneously, Δρ satisfies the condition 10 kg/m³≦Δρ<50 kg/m³ and at least a critical number of $A_n$ satisfy the condition 0.25≦$A_n$<0.7.

In another embodiment, the continuous gas fluidized bed method for making a polymer of the invention operates such that, simultaneously, Δρ satisfies the condition 10 kg/m³≦Δρ<70 kg/m³ and at least a critical number of $A_n$ satisfy the condition 0.25≦$A_n$<0.8.

In another embodiment, the continuous gas fluidized bed method for making a polymer of the invention operates such that, simultaneously, Δρ satisfies the condition 30 kg/m³≦Δρ<50 kg/m³ and at least a critical number of $A_n$ satisfy the condition 0.55≦$A_n$<0.7.

In another embodiment, the continuous gas fluidized bed method for making a polymer of the invention operates such that, simultaneously, Δρ satisfies the condition 30 kg/m³≦Δρ<70 kg/m³ and at least a critical number of $A_n$ satisfy the condition 0.55≦$A_n$<0.8.

In another embodiment, the continuous gas fluidized bed method for making a polymer of the invention operates such that, simultaneously, Δρ satisfies the condition 40 kg/m³≦Δρ<70 kg/m³ and at least a critical number of $A_n$ satisfy the condition 0.6≦$A_n$<0.8.

In another embodiment, the continuous gas fluidized bed method for making a polymer of the invention operates such that Δρ satisfies the condition 0 kg/m³≦Δρ<30 kg/m³ and, when Δρ≧10 kg/m³, simultaneously, at least a critical number of $A_n$ satisfy the condition 0.25≦$A_n$<0.55.

In another embodiment, the continuous gas fluidized bed method for making a polymer of the invention operates such that Δρ satisfies the condition 0 kg/m³≦Δρ<40 kg/m³ and, when Δρ≧10 kg/m³, simultaneously, at least a critical number of $A_n$ satisfy the condition 0.25≦$A_n$<0.6.

In another embodiment, the continuous gas fluidized bed method for making a polymer of the invention operates such that Δρ satisfies the condition 0 kg/m³≦Δρ<50 kg/m³ and, when Δρ≧10 kg/m³, simultaneously, at least a critical number of $A_n$ satisfy the condition 0.25≦$A_n$<0.7.

In another embodiment, the continuous gas fluidized bed method for making a polymer of the invention operates such that Δρ satisfies the condition 0 kg/m³≦Δρ<70 kg/m³ and, when Δρ≧10 kg/m³, simultaneously, at least a critical number of $A_n$ satisfy the condition 0.25≦$A_n$<0.8.

Additionally, the present invention involves a method for monitoring and providing continuity in a gas fluidized bed method for making a polymer featuring a condensing agent in a recycle stream comprising:

monitoring the fluidized bed reaction zone, where the reaction zone has a controlled reactor bed temperature, a lower fluidized bed density, an upper fluidized bed density and a plurality of measuring $site_n$ temperatures;

monitoring the recycle stream into the reaction zone where the stream has a reactor inlet temperature;

determining Δρ and comparing Δρ to at least one limit; and when Δρ≧10 kg/m³, determining a plurality of $A_n$ and comparing each $A_n$ to a lower value and an upper value, where each of $A_n$ and Δρ are as previously defined.

In one embodiment, there are 4 measuring $site_n$ temperatures. In another embodiment, there are 16 measuring $site_n$ temperatures.

In another embodiment, the present invention involves a method for monitoring and providing continuity in a gas fluidized bed method for making a polymer featuring a condensing agent in a recycle stream comprising:

monitoring the fluidized bed reaction zone, where the reaction zone has a controlled reactor bed temperature, a lower fluidized bed density, an upper fluidized bed density and a plurality of measuring $site_n$ temperatures;

monitoring the recycle stream into the reaction zone where the stream has a reactor inlet temperature;

determining Δρ and comparing Δρ to at least one limit; and determining a plurality of $A_n$ and comparing each $A_n$ to a lower value and an upper value, where each of $A_n$ and Δρ are as previously defined.

In another embodiment, the present invention involves a method for monitoring and providing continuity in a gas fluidized bed method for making a polymer featuring a condensing agent in a recycle stream comprising:

monitoring the fluidized bed reaction zone, where the reaction zone has a lower fluidized bed density and an upper fluidized bed density; and determining Δρ and comparing Δρ to at least one limit, where Δρ is as previously defined.

EXAMPLES

As noted above, the continuous gas fluidized bed methods featuring a condensing agent in a recycle stream, and methods for monitoring and providing continuity in a gas fluidized bed method featuring a condensing agent in a recycle stream, yield superior performance in making a polymer. The following examples further illustrate certain embodiments of the present invention. These examples are provided solely for illustrative purposes and in no way limit the scope of the present invention.

Run Indicating Loss of Continuity State 1

This example shows that the Δρ and $A_n$ parameters indicate changes in the fluidized bed and its disruption, ultimately leading to the "loss of continuity state 1" requiring reactor shut-down.

Certain factors caused production to be shut down and process continuity to be lost during the gas fluidized bed production of a copolymer from a mixture containing about 44.2 mol % ethylene monomer, about 17.6 mol % butene-1 monomer, about 8.0 mol % hydrogen, about 10.5 mol % of the condensing agent known as IC5, and about 19.7 mol % inert gases (i.e., about 14.8 mol % nitrogen and about 4.9 mol % ethane). IC5 comprises about 97–98 wt. % isopentane and about 2–3 wt. % of a mixture of neopentane and n-pentane, and is thought to further comprise below about 10 ppm by weight of alkanes with 4-carbon atoms and below about 10 ppm by weight of alkanes with 6-carbon atoms. The liquid-containing mixture that was introduced into the reaction zone contained from about 12 wt. % to about 13 wt. % of liquid based on the total weight of the recycle stream. The catalyst used was a Ziegler-Natta type catalyst comprising titanium trichloride and aluminum alkyl.

The fluidized bed reactor apparatus used had a reactor column with an approximately cylindrical reaction zone and an expansion zone with an approximately conical bottom half and an approximately hemispherical top half, as illustrated in FIG. 2a. In this apparatus, Q was about 16.64 m. The reactor column was equipped with pressure taps and four measuring site$_n$ thermocouple devices, located as shown in FIGS. 2a and 2b. The approximate controlled reactor bed temperature set-point was 86° C. which resulted in an average controlled reactor bed temperature of about 87.2° C. for the 15 hour period ending at about 15:00 hours, i.e., preceding the events beginning at 16:00 hours, as discussed below. During that 15 hour period, other method parameters had the following averages and ranges:

| | |
|---|---|
| Reactor pressure: | average of about 21.3 kg/cm² (from about 20.9 kg/cm² to about 21.6 kg/cm²); |
| Reactor inlet temperature: | average of about 55.2° C. (from about 53.0° C. to about 59.3° C.); |
| Dew point temperature: | average of about 64.2° C. (from about 63.2° C. to about 65.5° C.); |
| Recycle gas density: | average of about 28.7 kg/m³ (from about 28.2 kg/m³ to about 29.3 kg/m³). |

The recycle gas density was calculated based on the recycle gas composition which, in turn, was measured at the outlet of the compressor. Table 2 below gives other important production parameters over time for the period prior to and during the shut-down.

TABLE 2

Data Summary for Example 6.1 Indicating Loss of Continuity State

| Time hr:min | Rx. Bed Temp. ° C. | Distributor Plate ΔP mm H₂O | Bed Height m | Bed Weight Ton | SGV m/s | UBD kg/m³ | LBD kg/m³ | Δρ kg/m³ | A₃ | A₄ |
|---|---|---|---|---|---|---|---|---|---|---|
| 8:09 | 86.6 | 8506 | 15.4 | 56.3 | 0.82 | 243 | 290 | 47 | 0.54 | 0.47 |
| 8:33 | 86.8 | 8939 | 15.3 | 55.6 | 0.80 | 241 | 249 | 8 | 0.61 | 0.48 |
| 8:52 | 87.3 | 8887 | 15.4 | 56.0 | 0.81 | 239 | 247 | 8 | 0.64 | 0.43 |
| 9:11 | 87.6 | 8864 | 15.3 | 55.5 | 0.80 | 241 | 244 | 3 | 0.63 | 0.43 |
| 9:30 | 87.4 | 8802 | 15.0 | 55.3 | 0.80 | 246 | 245 | −1 | 0.66 | 0.43 |
| 9:50 | 87.0 | 8788 | 15.3 | 56.6 | 0.80 | 239 | 250 | 10 | 0.62 | 0.43 |
| 10:09 | 86.6 | 8800 | 15.2 | 56.9 | 0.80 | 243 | 252 | 9 | 0.49 | 0.38 |
| 10:28 | 87.0 | 9020 | 15.6 | 57.7 | 0.80 | 244 | 250 | 6 | 0.51 | 0.33 |
| 10:47 | 87.0 | 8868 | 15.4 | 57.8 | 0.81 | 247 | 248 | 0 | 0.43 | 0.31 |
| 11:06 | 87.0 | 8686 | 15.2 | 57.9 | 0.79 | 252 | 252 | 0 | 0.57 | 0.36 |
| 11:26 | 86.9 | 8978 | 15.4 | 58.1 | 0.79 | 249 | 249 | 0 | 0.55 | 0.35 |
| 11:45 | 87.4 | 8941 | 15.4 | 57.7 | 0.79 | 251 | 246 | −5 | 0.55 | 0.41 |
| 12:04 | 87.9 | 8819 | 15.5 | 58.0 | 0.79 | 244 | 249 | 5 | 0.59 | 0.41 |
| 12:23 | 87.9 | 8691 | 15.3 | 57.1 | 0.79 | 246 | 250 | 4 | 0.77 | 0.51 |
| 12:42 | 87.3 | 8588 | 15.7 | 58.2 | 0.80 | 239 | 254 | 15 | 0.72 | 0.46 |
| 13:02 | 87.6 | 8745 | 15.3 | 58.2 | 0.78 | 251 | 251 | 0 | 0.72 | 0.53 |
| 13:21 | 87.2 | 8721 | 15.3 | 57.2 | 0.80 | 248 | 250 | 2 | 0.81 | 0.56 |
| 13:40 | 86.9 | 8916 | 15.6 | 57.8 | 0.79 | 242 | 248 | 6 | 0.68 | 0.52 |
| 13:59 | 86.7 | 9028 | 15.4 | 57.0 | 0.81 | 247 | 243 | −4 | 0.73 | 0.49 |
| 14:18 | 86.9 | — | 15.4 | 57.3 | 0.81 | 244 | 249 | 4 | 0.58 | 0.51 |
| 14:38 | 86.5 | — | 15.2 | 56.9 | 0.81 | 245 | 250 | 5 | 0.70 | 0.48 |
| 14:57 | 86.8 | 8853 | 15.3 | 58.0 | 0.81 | 251 | 250 | −2 | 0.71 | 0.50 |
| 15:16 | 86.7 | 9062 | 15.3 | 57.5 | 0.80 | 247 | 252 | 5 | 0.57 | 0.47 |
| 15:33 | 86.7 | 8855 | 15.5 | 57.0 | 0.81 | 237 | 248 | 11 | 0.62 | 0.45 |
| 15:35 | 87.1 | 9056 | 15.4 | 57.0 | 0.82 | 237 | 251 | 14 | 0.62 | 0.46 |
| 15:38 | 87.3 | 8913 | 15.4 | 56.5 | 0.81 | 239 | 248 | 9 | 0.68 | 0.44 |
| 15:40 | 87.2 | 8925 | 15.5 | 56.2 | 0.81 | 236 | 248 | 12 | 0.62 | 0.46 |
| 15:42 | 86.8 | 9155 | 15.3 | 55.6 | 0.80 | 237 | 249 | 12 | 0.61 | 0.47 |
| 15:45 | 86.3 | 9269 | 15.5 | 55.6 | 0.81 | 228 | 251 | 23 | 0.66 | 0.43 |
| 15:47 | 87.0 | 9272 | 15.5 | 54.9 | 0.81 | 229 | 246 | 16 | 0.60 | 0.44 |
| 15:50 | 87.2 | 9127 | 15.4 | 54.5 | 0.81 | 228 | 244 | 16 | 0.65 | 0.48 |
| 15:52 | 86.8 | 8981 | 15.7 | 55.6 | 0.80 | 231 | 240 | 9 | 0.66 | 0.45 |
| 15:54 | 87.1 | 9229 | 15.3 | 54.6 | 0.80 | 232 | 242 | 11 | 0.65 | 0.44 |
| 15:57 | 86.8 | 9140 | 15.7 | 54.2 | 0 81 | 221 | 244 | 23 | 0.58 | 0.44 |
| 15:59 | 86.8 | 9023 | 15.8 | 55.3 | 0.81 | 225 | 246 | 21 | 0.60 | 0.41 |
| 16:02 | 87.8 | 9072 | 15.6 | 54.9 | 0.79 | 229 | 242 | 13 | 0.52 | 0.49 |
| 16:04 | 87.2 | 8821 | 15.6 | 55.0 | 0.80 | 227 | 248 | 20 | 0.61 | 0.49 |
| 16:06 | 86.8 | 9136 | 15.6 | 55.0 | 0.80 | 228 | 249 | 21 | 0.60 | 0.46 |
| 16:09 | 86.8 | 9018 | 16.0 | 54.8 | 0.81 | 221 | 237 | 16 | 0.53 | 0.47 |
| 16:11 | 87.5 | 9150 | 15.7 | 55.1 | 0.81 | 226 | 243 | 17 | 0.62 | 0.44 |
| 16:14 | 87.4 | 9084 | 15.6 | 54.2 | 0.79 | 222 | 244 | 22 | 0.61 | 0.48 |
| 16:16 | 86.6 | 8985 | 15.9 | 54.3 | 0.80 | 221 | 237 | 16 | 0.60 | 0.52 |

TABLE 2-continued

Data Summary for Example 6.1 Indicating Loss of Continuity State

| Time hr:min | Rx. Bed Temp. °C. | Distributor Plate ΔP mm H$_2$O | Bed Height m | Bed Weight Ton | SGV m/s | UBD kg/m$^3$ | LBD kg/m$^3$ | Δρ kg/m$^3$ | A$_3$ | A$_4$ |
|---|---|---|---|---|---|---|---|---|---|---|
| 16:18 | 86.8 | 9152 | 16.1 | 55.6 | 0.79 | 224 | 240 | 16 | 0.55 | 0.46 |
| 16:21 | 87.6 | 9068 | 15.7 | 54.6 | 0.79 | 223 | 244 | 22 | 0.57 | 0.47 |
| 16:23 | 87.1 | 9049 | 16.0 | 54.3 | 0.79 | 217 | 241 | 24 | 0.60 | 0.48 |
| 16:26 | 86.7 | 9021 | 15.9 | 80.5 | 0.79 | 221 | 256 | 35 | 0.54 | 0.47 |
| 16:28 | 86.9 | 9200 | 16.4 | 54.1 | 0.79 | 220 | 235 | 15 | 0.56 | 0.39 |
| 16:30 | 87.4 | 8858 | 14.9 | 54.7 | 0.80 | 219 | 236 | 17 | 0.59 | 0.45 |
| 16:33 | 87.4 | 9037 | 16.2 | 55.0 | 0.79 | 221 | 240 | 19 | 0.55 | 0.48 |
| 16:35 | 87.0 | 8842 | 16.2 | 54.7 | 0.79 | 220 | 237 | 17 | 0.58 | 0.45 |
| 16:38 | 86.7 | 9192 | 16.1 | 54.8 | 0.79 | 225 | 233 | 8 | 0.58 | 0.45 |
| 16:40 | 87.3 | 8929 | 16.3 | 54.7 | 0.79 | 213 | 241 | 29 | 0.59 | 0.46 |
| 16:42 | 87.5 | 8841 | 16.2 | 55.7 | 0.79 | 223 | 241 | 17 | 0.56 | 0.45 |
| 16:45 | 87.3 | 9014 | 16.1 | 54.7 | 0.78 | 223 | 235 | 12 | 0.56 | 0.46 |
| 16:47 | 86.6 | 8986 | 16.3 | 54.0 | 0.79 | 214 | 235 | 22 | 0.60 | 0.49 |
| 16:50 | 86.8 | 9215 | 16.3 | 53.8 | 0.80 | 214 | 233 | 20 | 0.60 | 0.44 |
| 16:52 | 87.2 | 9223 | 16.2 | 52.8 | 0.80 | 210 | 230 | 20 | 0.52 | 0.44 |
| 16:54 | 86.9 | 8892 | 16.2 | 52.3 | 0.79 | 202 | 238 | 36 | 0.58 | 0.46 |
| 16:57 | 86.8 | 9185 | 16.5 | 52.2 | 0.78 | 203 | 227 | 24 | 0.60 | 0.48 |
| 16:59 | 86.6 | 9368 | 16.7 | 51.0 | 0.79 | 195 | 222 | 28 | 0.60 | 0.45 |
| 17:02 | 87.4 | 9011 | 16.5 | 51.9 | 0.79 | 201 | 226 | 25 | 0.51 | 0.40 |
| 17:04 | 87.8 | 9003 | 16.3 | 51.5 | 0.77 | 200 | 230 | 29 | 0.59 | 0.45 |
| 17:06 | 86.6 | 9076 | 16.4 | 50.8 | 0.77 | 197 | 225 | 28 | 0.60 | 0.45 |
| 17:09 | 85.7 | 9398 | 16.5 | 49.6 | 0.79 | 187 | 226 | 40 | 0.54 | 0.40 |
| 17:11 | 87.0 | 9096 | 16.8 | 49.2 | 0.80 | 185 | 214 | 29 | 0.51 | 0.36 |
| 17:14 | 87.9 | 8842 | 16.6 | 50.8 | 0.77 | 193 | 222 | 29 | 0.63 | 0.44 |
| 17:16 | 86.8 | 9072 | 16.4 | 49.9 | 0.77 | 189 | 228 | 39 | 0.55 | 0.45 |
| 17:18 | 85.3 | 9353 | 16.7 | 48.9 | 0.78 | 185 | 212 | 28 | 0.49 | 0.44 |
| 17:21 | 86.7 | 9222 | 16.7 | 47.8 | 0.79 | 178 | 212 | 33 | 0.47 | 0.40 |
| 17:23 | 87.3 | 9085 | 16.5 | 46.8 | 0.77 | 177 | 215 | 38 | 0.57 | 0.43 |
| 17:26 | 85.4 | 9285 | 16.6 | 46.5 | 0.77 | 175 | 208 | 33 | 0.53 | 0.39 |
| 17:28 | 86.2 | 9427 | 16.8 | 45.1 | 0.79 | 168 | 201 | 33 | 0.45 | 0.41 |
| 17:30 | 87.5 | 8937 | 16.7 | 44.7 | 0.78 | 167 | 199 | 32 | 0.57 | 0.45 |
| 17:33 | 86.3 | 9301 | 16.5 | 45.2 | 0.78 | 172 | 202 | 30 | 0.49 | 0.46 |
| 17:35 | 86.1 | 9466 | 17.0 | 44.3 | 0.78 | 165 | 191 | 26 | 0.44 | 0.40 |
| 17:38 | 87.3 | 9115 | 16.8 | 44.3 | 0.79 | 163 | 199 | 36 | 0.51 | 0.40 |
| 17:40 | 87.3 | 9025 | 16.7 | 45.4 | 0.78 | 164 | 210 | 46 | 0.96 | 0.46 |
| 17:42 | 85.9 | 9440 | 16.5 | 44.4 | 0.78 | 158 | 222 | 64 | 0.71 | 0.45 |
| 17:45 | 86.2 | 9303 | 16.4 | 43.9 | 0.79 | 146 | 241 | 95 | 0.68 | 0.57 |
| 17:47 | 87.3 | 9211 | 15.9 | 43.2 | 0.78 | 136 | 261 | 125 | 0.52 | 0.73 |
| 17:50 | 85.1 | 9433 | 15.5 | 47.3 | 0.78 | 145 | 300 | 155 | 0.87 | 0.48 |
| 17:52 | 85.7 | 9560 | 15.9 | 47.9 | 0.78 | 124 | 327 | 202 | 0.81 | 0.82 |
| 17:54 | 86.0 | 9437 | 14.5 | 47.9 | 0.80 | 125 | 367 | 242 | 0.81 | 0.82 |
| 17:57 | 87.0 | 9237 | 14.5 | 48.2 | 0.79 | 121 | 368 | 247 | 0.90 | 0.89 |
| 17:59 | 86.1 | 9277 | 14.0 | 51.0 | 0.80 | 128 | 391 | 264 | 0.85 | 0.86 |
| 18:02 | 85.3 | 9332 | 14.3 | 49.9 | 0.79 | 128 | 384 | 256 | 0.86 | 0.87 |
| 18:04 | 85.4 | 9341 | 14.2 | 51.0 | 0.80 | 124 | 403 | 278 | 0.83 | 0.84 |
| 18:06 | 86.0 | 9287 | 14.1 | 51.6 | 0.80 | 124 | 411 | 287 | 0.86 | 0.86 |
| 18:09 | 85.1 | 9335 | 14.1 | 52.6 | 0.80 | 123 | 425 | 302 | 0.81 | 0.81 |
| 18:11 | 85.3 | 9354 | 13.8 | 53.8 | 0.80 | 133 | 430 | 297 | 0.77 | 0.77 |
| 18:14 | 86.1 | 9296 | 14.0 | 53.7 | 0.79 | 120 | 436 | 316 | 0.79 | 0.80 |

A retrospective analysis of the data indicated that several conditions existed before an adjustment in operating parameters was made at about 16:00 hours. Specifically, analysis revealed that frequent plugging of the catalyst feed tube occurred. Additionally, the SBD, i.e., the mass of an assemblage of the particulate product divided by he volume the particles occupy, was low. Also, the pressure drop across the distributor plate ("Distributor Plate ΔP") was high. Furthermore, low values of Δρ were noted. In particular, as non-negative Δρ values of less than 10 kg/m$^3$ are shown in Table 2 at various times from about 8:33 hours until about 15:16 hours, sometimes for several consecutive readings, the "Δρ alarm state" was indicated at various times from about 8:33 hours until about 15:16 hours. However, the continuous gas fluidized bed method for making the copolymer of this example continued to operate even when in the "Δρ alarm state."

Figure 3:
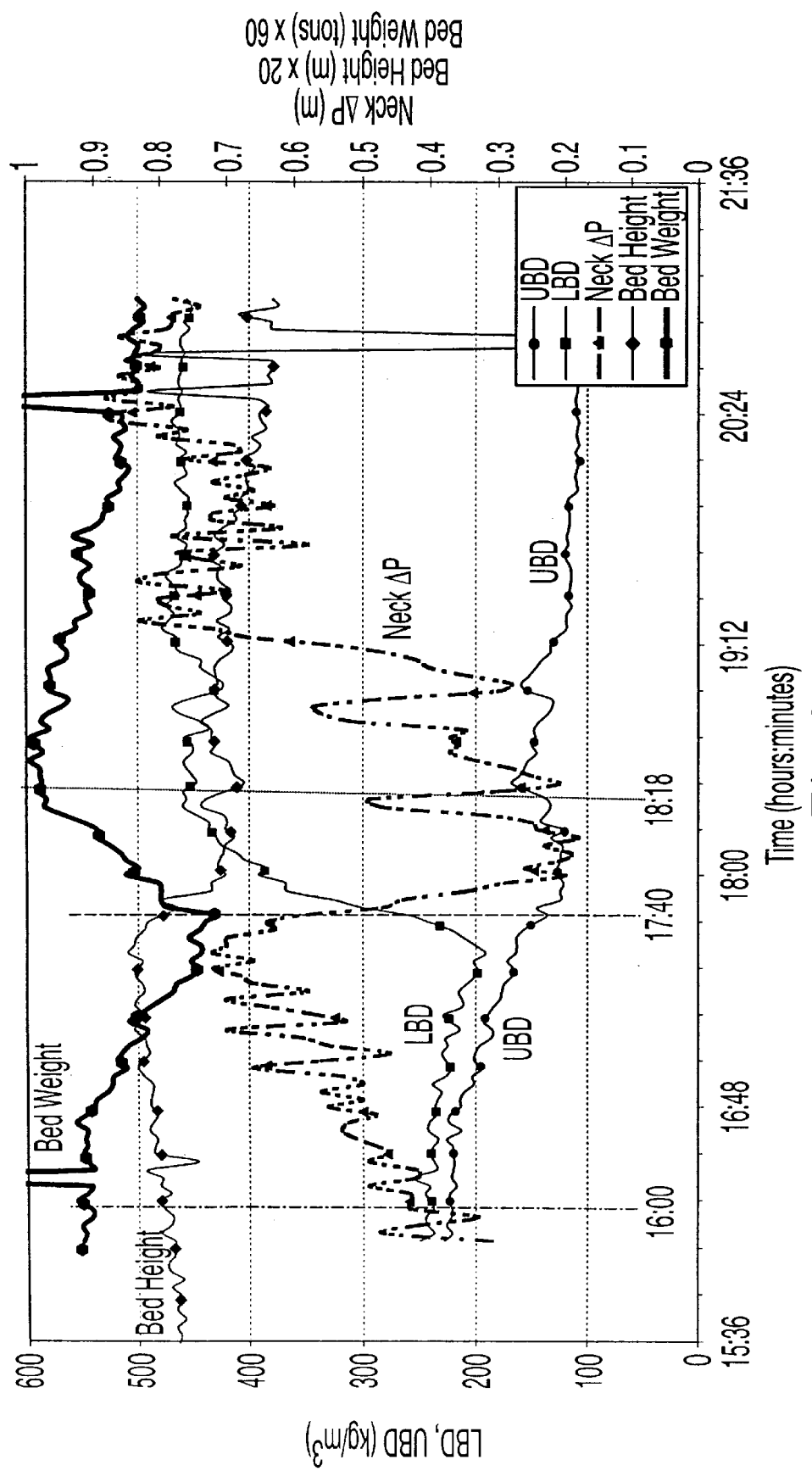
FIG. 3 shows a plot of LBD, UBD, fluidized bed height, fluidized bed weight, and neck $\Delta\rho$ over a period from several hours before to several hours after 18:02 hours for Example 6.1.

At about 16:00 hours, an adjustment was made to reduce the fluidized bed weight from about 55 metric tons to about 40 metric tons in order to decrease the bed height, which was noted to be too high. Thereafter, the bed height continued to increase from about 15.6 m to, at 17:35 hours, about 17.0 m. FIG. 3 shows a plot of LBD, UBD, bed height, bed weight, and neck Δρ over a period of from several hours before to several hours after 18:02.

Figure 4:
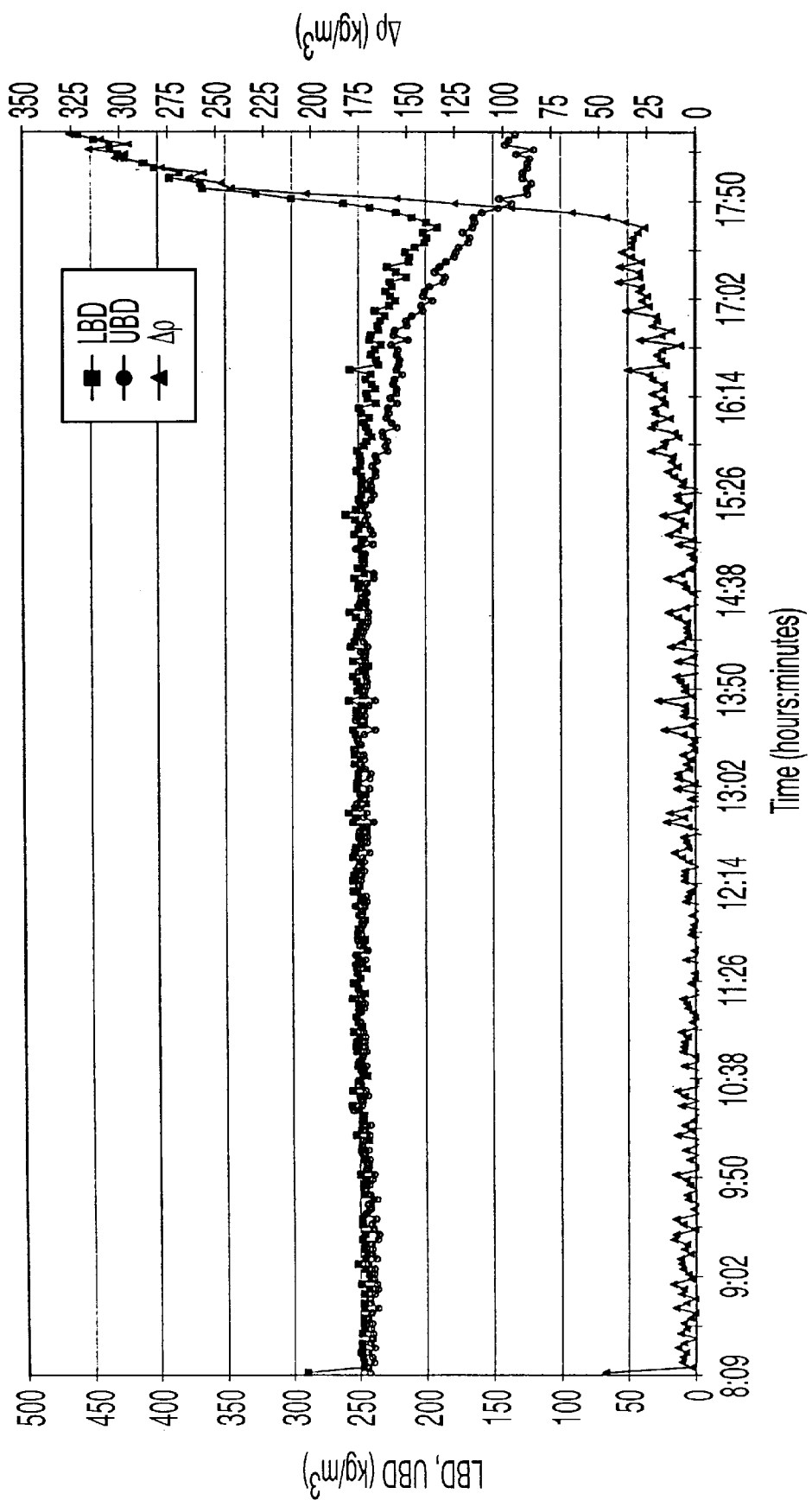
FIG. 4 shows a plot of LBD, UBD and $\Delta\rho$ versus time from about 8:09 hours to about 18:21 hours for Example 6.1.
Figure 5:
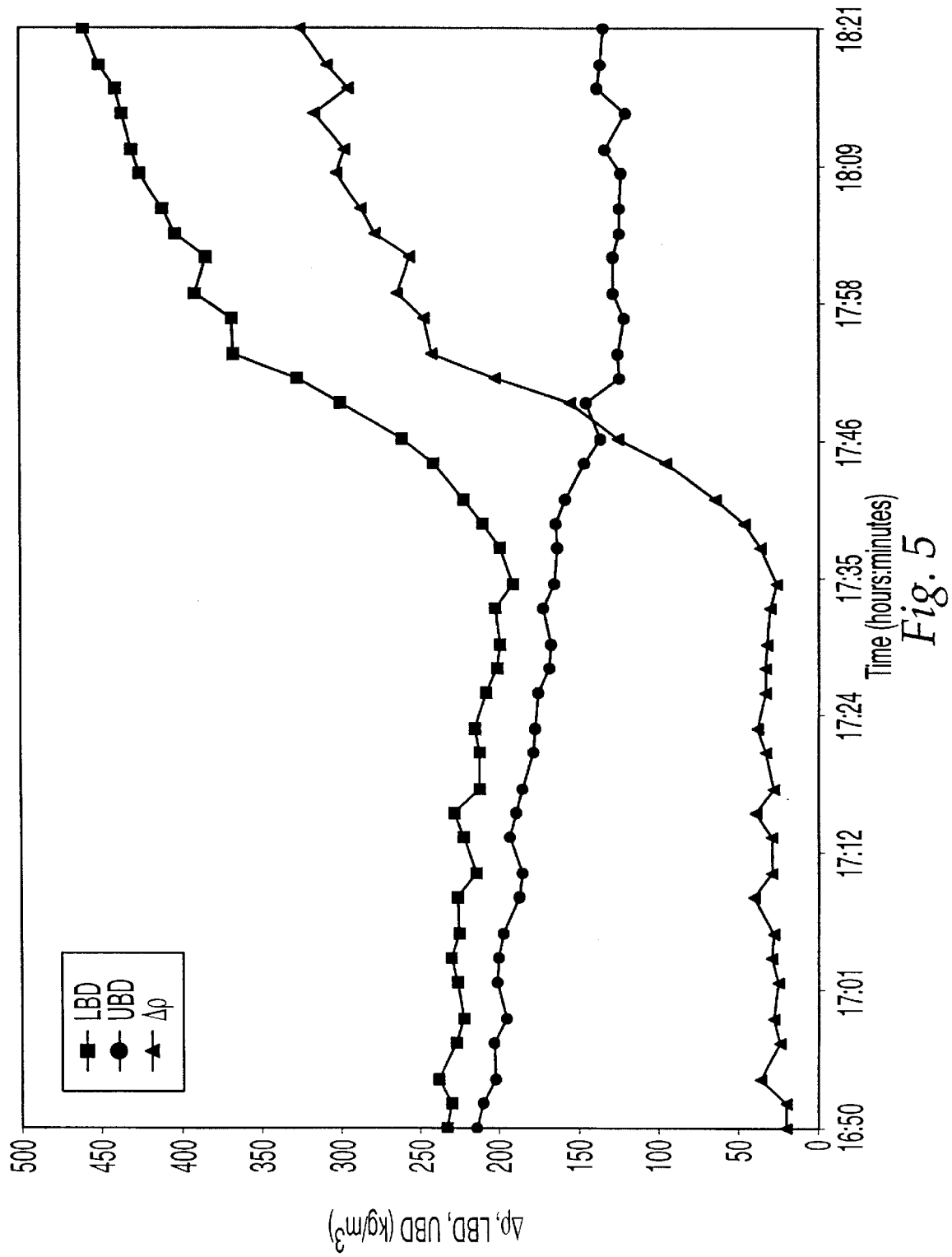
FIG. 5 shows a plot of LBD, UBD and $\Delta\rho$ versus time from about 16:50 hours to about 18:21 hours for Example 6.1.

Holding the mass flow rate of the gas stream passing through the fluidized bed substantially unchanged while decreasing the bed weight led to a divergence in the lower and upper fluidized bed properties. The LBD began to increase, eventually rising to more than about 400 kg/m$^3$, e.g., at 18:04 hours, while the UBD began to decrease, eventually falling to lower than about 125 kg/m$^3$, e.g., at 18:04 hours. These changes in LBD and UBD can be seen from the data in Table 2 and in FIG. 4, which is a plot of LBD and UBD on the left vertical axis and Δρ on the right vertical axis, versus time from about 8:09 hours to about 18:21 hours. For example, FIG. 4 shows that, e.g., from about 8:09 hours to about 15:45 hours, $\Delta\rho$ remained, on average, consistently below about 30 kg/m$^3$. FIG. 5 is a replotted version of FIG. 4, showing LBD, UBD and $\Delta\rho$ from about 16:50 hours to about 18:21 hours. From FIG. 5 it can be noted, e.g., that $\Delta\rho$ reached a value of about 46 kg/m$^3$ at about 17:40 hours and a value of about 95 kg/m$^3$ at about 17:45 hours.

Figure 6:
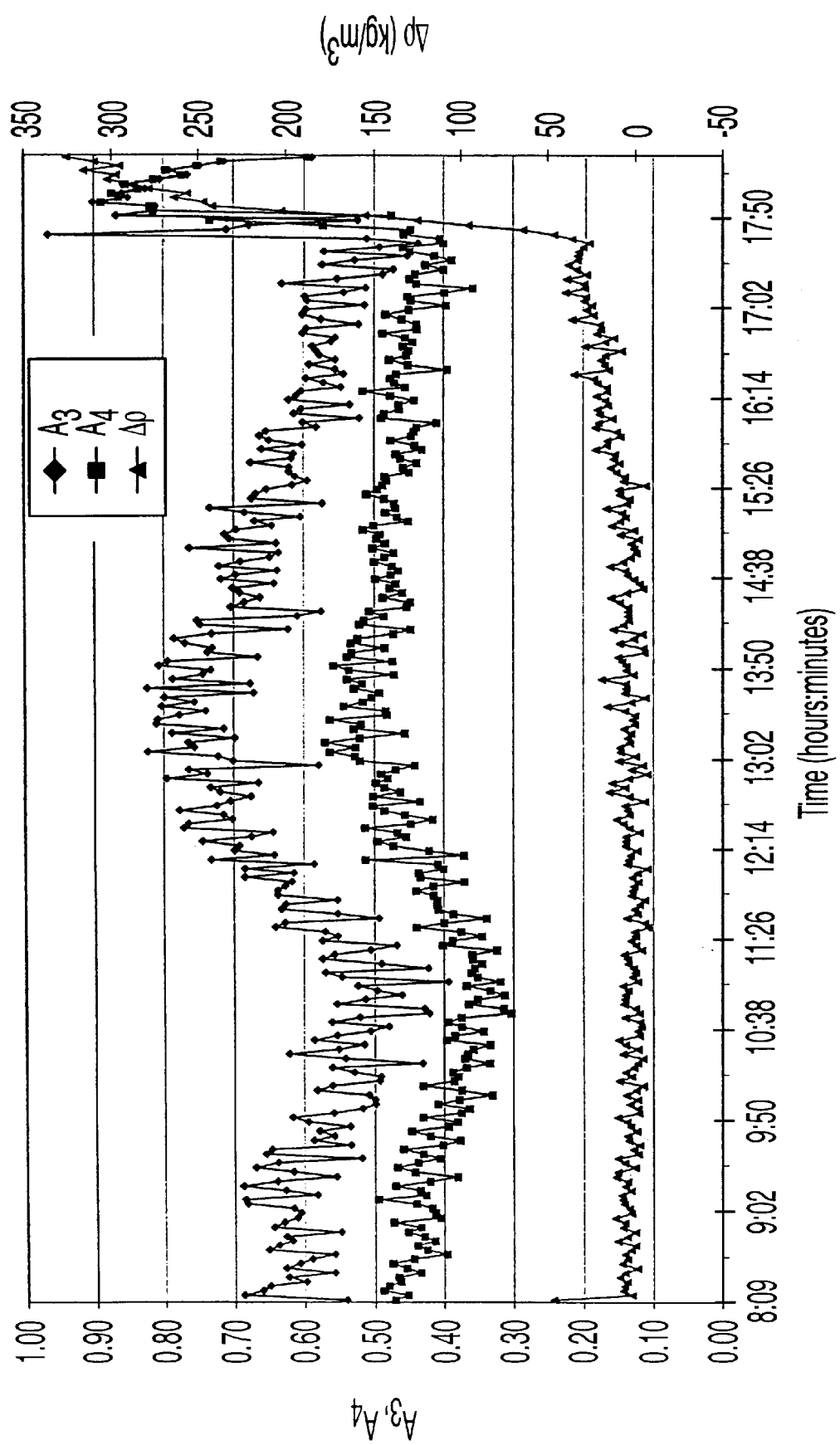
FIG. 6 shows a plot of $A_3$, $A_4$ and $\Delta\rho$ versus time from about 8:09 hours to about 18:21 hours for Example 6.1.

FIG. 6 shows a plot of $A_3$ and $A_4$ on the left vertical axis and $\Delta\rho$ on the right vertical axis, versus time from about 8:09 hours to about 18:21 hours. No corresponding values for $A_1$ and $A_2$ were available for retrospective analysis. FIG. 6 shows, e.g., that from about 8:09 hours to about 17:42 hours, $A_4$ remained, on average, consistently below about 0.55.

A transitional state was indicated, for example, from about 17:21 to about 17:33 hours. During this time period, $\Delta\rho$ values indicated the "alert state" while the $A_n$ values indicated the "steady state;" each $A_4$ value and most $A_3$ values being 0.55 or less. Of course, even in this transitional state, the continuous gas fluidized bed method of this example continued to operate.

Figure 7:
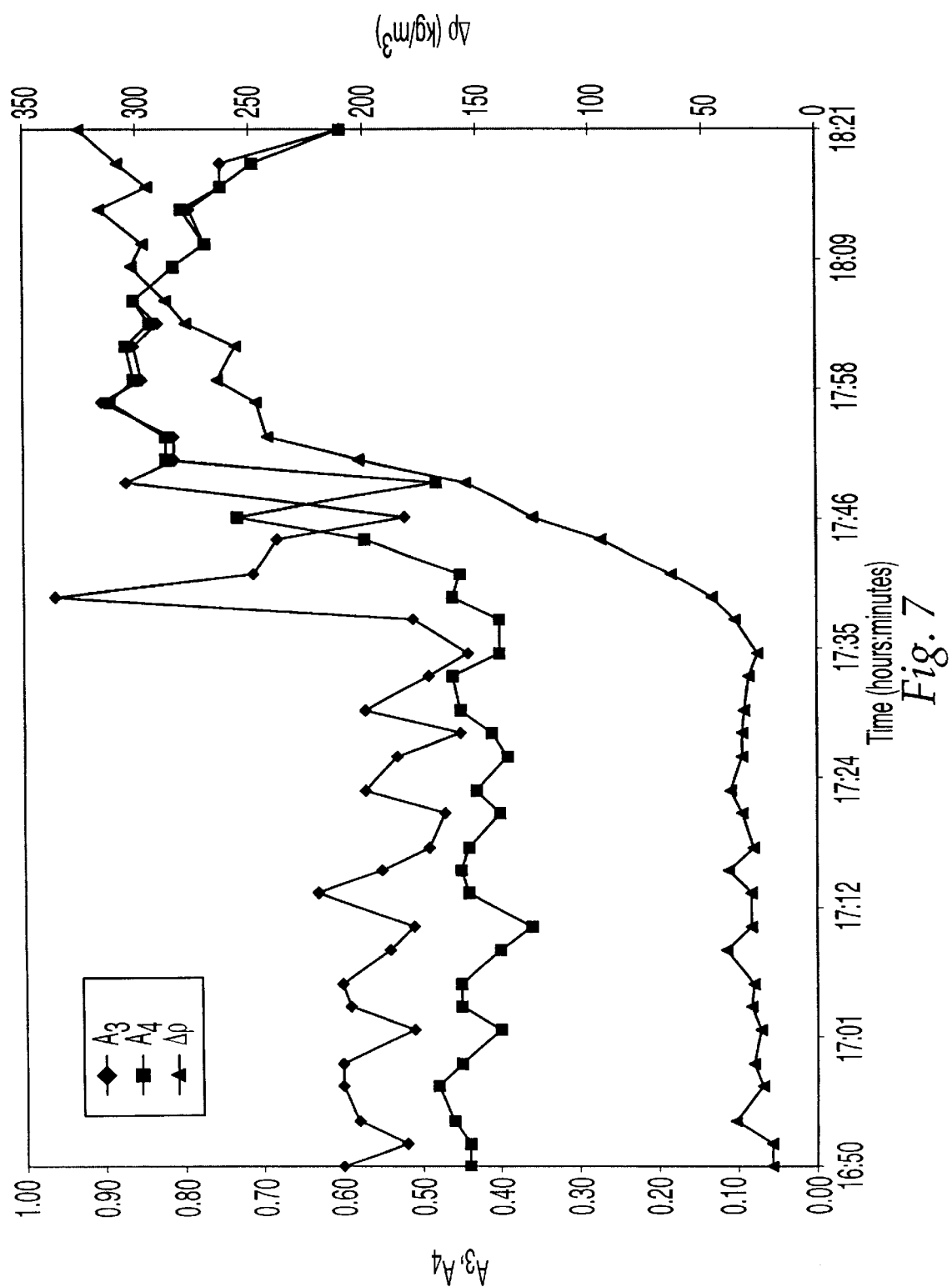
FIG. 7 shows a plot of $A_3$, $A_4$ and $\Delta\rho$ versus time from about 16:50 hours to about 18:21 hours for Example 6.1.

FIG. 7 is a replotted version of FIG. 6, showing $A_3$, $A_4$ and $\Delta\rho$ from about 16:50 hours to about 18:21 hours. From FIG. 7 it can be noted, e.g., that $A_3$ reached a value of about 0.87 at about 17:50 hours and remained above 0.8 at least until about 18:09 hours. From FIG. 7 it can also be noted, e.g., that $A_4$ reached a value of about 0.82 at about 17:52 hours and remained at or above about 0.8 at least until about 18:09 hours.

Thus, at about 17:52 hours and thereafter until at least until at least about 18:09 hours, each of $A_3$ and $A_4$ had a value of at least 0.8 and $\Delta\rho$ had a value of at least 70 kg/m$^3$, i.e., the "loss of continuity state 1" was indicated from about 17:52 hours and thereafter until at least about 18:09 hours. At this point, the disruption of the fluidized bed was irreversible.

Attaining the "loss of continuity state 1" indicated that excessive polymer chunk formation occurred within the reactor, clogging it, and that production had to be stopped. At 18:18 hours a "type I kill" for the catalyst was administered and, thereafter, the reactor was shut down and disassembled. A substantial quantity of polymer product was lost as a result of the shut-down.

Run Illustrating, e.g., Steady State Operations

This example shows how the $\Delta\rho$ and $A_n$ parameters indicate "steady state" operations of the fluidized bed over a three-day "window" within a longer period of continuous production.

A copolymer made from the monomers ethylene and butene-1 was produced continuously in the gas fluidized bed reactor apparatus of Example 6.1 as described therein. IC5 was used as the condensing agent. The use of IC5 raised the dew point temperature of the recycle mixture and permitted a greater quantity of heat to be removed from the fluidized bed; however, the difference between the controlled reactor bed temperature and the recycle stream dew point temperature of the mixture was kept at greater than or equal to about 15° C. throughout this example. The approximate controlled reactor bed temperature was from about 87.2° C. to about 89.0° C. throughout the three day period. Tables 3 through 5 provide hourly average values of $\Delta\rho$, $A_1$, $A_2$, $A_3$, $A_4$ and other important production parameters during the continuous three day operating period. Table 3 provides data for the first day, Table 4 provides data for the second day, and Table 5 provides data for the third day.

TABLE 3

Data Summary for First Day of Continuous Operations for Example 6.2

| Time hr:min | Prod'tn Rate Ton/hr | MI g/10 min | Resin Density g/cc | Rx Pressure kg/cm$^3$ | Rx Bed Temp. C. | Rx Inlet Temp. C. | Dew Point Temp. C. | Condensate wt % | Dist. Plate $\Delta$P mm H$_2$O | UBD kg/m$^3$ | LBD kg/m$^3$ | Recycle Gas Density kg/m$^3$ | Bed Height m | Bed Weight Ton |
|---|---|---|---|---|---|---|---|---|---|---|---|---|---|---|
| 1:00 | 48.5 | 0.84 | 0.918 | 21.00 | 88.5 | 39.0 | 57.0 | 19.5 | 2058 | 224 | 247 | 27.1 | 15.53 | 55.80 |
| 2:00 | 48.4 | 0.84 | 0.918 | 20.99 | 88.1 | 38.7 | 56.9 | 19.6 | 2051 | 226 | 249 | 27.0 | 15.57 | 56.38 |
| 3:00 | 48.1 | 0.84 | 0.919 | 20.99 | 87.7 | 39.0 | 57.1 | 19.7 | 2065 | 225 | 249 | 27.1 | 15.57 | 56.15 |
| 4:00 | 48.9 | 0.84 | 0.919 | 21.02 | 88.0 | 39.1 | 57.5 | 20.0 | 2111 | 226 | 249 | 27.2 | 15.60 | 56.24 |
| 5:00 | 48.4 | 0.84 | 0.919 | 20.98 | 87.8 | 39.3 | 57.6 | 19.9 | 2089 | 225 | 244 | 27.1 | 15.61 | 55.90 |
| 6:00 | 48.5 | 0.84 | 0.919 | 21.01 | 87.9 | 39.5 | 57.5 | 19.8 | 2085 | 224 | 245 | 27.2 | 15.53 | 55.59 |
| 7:00 | 48.2 | 0.84 | 0.918 | 21.00 | 88.0 | 39.6 | 57.4 | 19.5 | 2075 | 225 | 247 | 27.1 | 15.56 | 56.00 |
| 8:00 | 47.5 | 0.84 | 0.918 | 21.01 | 87.7 | 39.8 | 57.3 | 19.2 | 2075 | 224 | 246 | 27.1 | 15.52 | 55.67 |
| 9:00 | 47.3 | 0.84 | 0.918 | 20.99 | 88.0 | 39.9 | 57.5 | 19.4 | 2066 | 224 | 247 | 27.2 | 15.54 | 55.83 |
| 10:00 | 51.4 | 0.84 | 0.918 | 21.00 | 87.9 | 40.1 | 61.6 | 23.8 | 2074 | 225 | 249 | 28.0 | 15.52 | 55.93 |
| 11:00 | 47.1 | 0.84 | 0.918 | 21.02 | 87.4 | 41.2 | 61.4 | 22.5 | 2079 | 226 | 253 | 28.0 | 15.51 | 56.35 |
| 12:00 | 44.6 | 0.88 | 0.918 | 20.98 | 88.1 | 41.7 | 61.3 | 21.9 | 2062 | 226 | 254 | 27.9 | 15.50 | 56.60 |
| 13:00 | 44.5 | 0.94 | 0.918 | 21.02 | 88.5 | 40.5 | 60.5 | 22.1 | 2030 | 228 | 257 | 27.7 | 15.49 | 57.06 |
| 14:00 | 42.1 | 1.06 | 0.918 | 20.98 | 87.8 | 40.8 | 59.6 | 21.0 | 1980 | 229 | 261 | 27.2 | 15.49 | 57.56 |
| 15:00 | 43.9 | 1.27 | 0.918 | 21.00 | 89.0 | 39.6 | 59.2 | 21.6 | 1969 | 224 | 260 | 27.0 | 15.51 | 56.58 |
| 16:00 | 43.8 | 1.46 | 0.919 | 20.99 | 88.5 | 39.0 | 58.5 | 21.5 | 1963 | 222 | 253 | 26.9 | 15.55 | 55.97 |
| 17:00 | 44.2 | 1.85 | 0.920 | 21.01 | 88.2 | 38.9 | 58.5 | 21.7 | 2024 | 220 | 243 | 27.0 | 15.71 | 55.29 |
| 18:00 | 44.0 | 1.90 | 0.919 | 20.99 | 87.7 | 39.0 | 58.7 | 21.8 | 1997 | 218 | 238 | 27.0 | 15.59 | 54.39 |
| 19:00 | 44.6 | 1.96 | 0.919 | 20.99 | 87.9 | 39.0 | 58.9 | 22.0 | 1993 | 218 | 240 | 27.1 | 15.59 | 54.52 |
| 20:00 | 44.3 | 1.82 | 0.919 | 21.00 | 87.8 | 39.1 | 58.8 | 21.8 | 2000 | 218 | 241 | 27.1 | 15.57 | 54.68 |
| 21:00 | 44.1 | 1.82 | 0.919 | 20.99 | 88.1 | 39.1 | 58.6 | 21.6 | 1991 | 217 | 241 | 27.0 | 15.51 | 54.36 |
| 22:00 | 44.4 | 1.91 | 0.919 | 20.98 | 88.3 | 38.8 | 58.4 | 21.8 | 1982 | 218 | 241 | 26.9 | 15.58 | 54.70 |
| 23:00 | 45.1 | 1.93 | 0.919 | 20.99 | 88.5 | 38.6 | 58.5 | 22.0 | 1987 | 217 | 240 | 26.9 | 15.57 | 54.37 |
| 23:59 | 45.3 | 1.93 | 0.919 | 20.99 | 88.0 | 38.6 | 58.8 | 22.4 | 1997 | 215 | 239 | 27.0 | 15.61 | 54.25 |
| Min. | 42.1 | — | 0.918 | 20.98 | 87.4 | 38.6 | 56.9 | 19.2 | 1963 | 215 | 238 | 26.9 | 15.49 | 54.25 |
| Max. | 51.4 | — | 0.920 | 21.02 | 89.0 | 41.7 | 61.6 | 23.8 | 2111 | 229 | 261 | 28.0 | 15.71 | 57.56 |
| Avg. | 46.1 | — | 0.919 | 21.00 | 88.1 | 39.5 | 58.6 | 21.1 | 2033 | 223 | 247 | 27.2 | 15.56 | 55.67 |

TABLE 3-continued

Data Summary for First Day of Continuous Operations for Example 6.2

| Time hr:min | SGV m/s | (Rx Bed T · Dew Pt. T) C. | Ethylene mol % | Ethane mol % | Hydrogen mol % | t-Butene mol % | Nitrogen mol % | IC5 mol % | Total Inert mol % | Catalyst Productivity g polymer/ g catalyst | $A_1$ | $A_2$ | $A_3$ |
|---|---|---|---|---|---|---|---|---|---|---|---|---|---|
| 1:00 | 0.75 | 31.5 | 32.4 | 3.39 | 4.20 | 12.4 | 36.1 | 8.83 | 1.38 | 5414 | 0.51 | 0.50 | 0.45 |
| 2:00 | 0.75 | 31.2 | 32.5 | 3.39 | 4.34 | 12.4 | 35.9 | 8.79 | 1.38 | 5345 | 0.49 | 0.52 | 0.45 |
| 3:00 | 0.75 | 30.6 | 32.4 | 3.40 | 4.52 | 12.4 | 35.7 | 8.89 | 1.38 | 5210 | 0.50 | 0.50 | 0.45 |
| 4:00 | 0.75 | 30.4 | 32.7 | 3.40 | 4.35 | 12.4 | 35.4 | 9.02 | 1.38 | 5297 | 0.50 | 0.53 | 0.45 |
| 5:00 | 0.75 | 30.3 | 32.7 | 3.41 | 4.45 | 12.4 | 35.3 | 9.06 | 1.38 | 5249 | 0.50 | 0.50 | 0.45 |
| 6:00 | 0.75 | 30.3 | 32.7 | 3.42 | 4.37 | 12.4 | 35.3 | 9.03 | 1.38 | 5258 | 0.50 | 0.49 | 0.45 |
| 7:00 | 0.76 | 30.5 | 32.6 | 3.43 | 4.39 | 12.4 | 35.5 | 9.00 | 1.38 | 5228 | 0.50 | 0.48 | 0.45 |
| 8:00 | 0.75 | 30.5 | 32.5 | 3.44 | 4.40 | 12.4 | 35.7 | 8.93 | 1.38 | 5142 | 0.48 | 0.48 | 0.45 |
| 9:00 | 0.75 | 30.4 | 32.2 | 3.45 | 4.36 | 12.5 | 36.1 | 9.14 | 1.51 | 5129 | 0.45 | 0.47 | 0.45 |
| 10:00 | 0.74 | 26.3 | 32.2 | 3.45 | 4.32 | 12.4 | 36.3 | 10.67 | 2.43 | 5916 | 0.46 | 0.50 | 0.45 |
| 11:00 | 0.74 | 26.0 | 32.0 | 3.45 | 4.35 | 12.4 | 36.5 | 10.61 | 2.43 | 5659 | 0.50 | 0.46 | 0.45 |
| 12:00 | 0.74 | 26.8 | 31.5 | 3.47 | 4.29 | 12.4 | 37.0 | 10.59 | 2.43 | 5118 | 0.50 | 0.48 | 0.45 |
| 13:00 | 0.74 | 28.0 | 31.7 | 3.48 | 4.36 | 12.4 | 37.2 | 10.26 | 2.43 | 5015 | 0.41 | 0.46 | 0.45 |
| 14:00 | 0.74 | 28.2 | 31.1 | 3.48 | 5.75 | 12.3 | 36.8 | 9.98 | 2.43 | 4258 | 0.41 | 0.45 | 0.45 |
| 15:00 | 0.74 | 29.8 | 31.9 | 3.50 | 6.13 | 12.4 | 35.7 | 9.75 | 2.43 | 4643 | 0.41 | 0.44 | 0.45 |
| 16:00 | 0.74 | 30.0 | 32.3 | 3.51 | 6.23 | 12.5 | 35.4 | 9.42 | 2.43 | 4661 | 0.41 | 0.46 | 0.45 |
| 17:00 | 0.74 | 29.7 | 32.3 | 3.49 | 6.22 | 12.7 | 35.1 | 9.35 | 2.37 | 4697 | 0.41 | 0.44 | 0.45 |
| 18:00 | 0.74 | 29.0 | 32.3 | 3.49 | 6.38 | 12.7 | 35.0 | 9.45 | 2.26 | 4681 | 0.44 | 0.45 | 0.45 |
| 19:00 | 0.74 | 29.1 | 32.3 | 3.48 | 6.23 | 12.8 | 35.1 | 9.46 | 2.26 | 4744 | 0.41 | 0.44 | 0.45 |
| 20:00 | 0.74 | 28.9 | 32.3 | 3.48 | 6.30 | 12.8 | 35.1 | 9.44 | 2.26 | 4695 | 0.41 | 0.47 | 0.45 |
| 21:00 | 0.73 | 29.4 | 32.2 | 3.49 | 6.31 | 12.9 | 35.3 | 9.34 | 2.26 | 4457 | 0.41 | 0.45 | 0.45 |
| 22:00 | 0.74 | 30.0 | 32.1 | 3.50 | 6.46 | 12.9 | 35.2 | 9.29 | 2.26 | 4411 | 0.43 | 0.48 | 0.45 |
| 23:00 | 0.74 | 30.1 | 32.5 | 3.49 | 6.46 | 12.9 | 34.8 | 9.33 | 2.26 | 4485 | 0.42 | 0.48 | 0.45 |
| 23:59 | 0.73 | 29.2 | 32.5 | 3.48 | 6.54 | 12.9 | 34.6 | 9.40 | 2.26 | 4503 | 0.45 | 0.47 | 0.45 |
| Min. | 0.73 | 26.0 | 31.1 | 3.39 | 4.20 | 12.3 | 34.6 | 8.79 | 1.38 | 4258 | 0.41 | 0.44 | 0.45 |
| Max. | 0.76 | 31.5 | 32.7 | 3.51 | 6.54 | 12.9 | 37.2 | 10.67 | 2.43 | 5916 | 0.51 | 0.53 | 0.45 |
| Avg. | 0.74 | 29.4 | 32.2 | 3.46 | 5.24 | 12.5 | 35.7 | 9.46 | 1.99 | 4967 | 0.46 | 0.48 | 0.45 |

| Time hr:min | $A_4$ | Δρ kg/m³ | Gas Viscosity cPoise | Settled Bulk Dens. g/cc | Avg Part. Size mm | X | Y | Z | Limit B | Ratio |
|---|---|---|---|---|---|---|---|---|---|---|
| 1:00 | 0.45 | 23 | — | — | — | — | — | — | — | — |
| 2:00 | 0.45 | 23 | 0.0139 | 0.35 | 1.25 | 3.261 | 5.960 | 0.581 | 0.517 | 0.64 |
| 3:00 | 0.45 | 24 | — | — | — | — | — | — | — | — |
| 4:00 | 0.45 | 23 | 0.0138 | 0.34 | 1.27 | 3.271 | 5.974 | 0.600 | 0.516 | 0.66 |
| 5:00 | 0.45 | 18 | — | — | — | — | — | — | — | — |
| 6:00 | 0.45 | 21 | 0.0138 | 0.35 | 1.24 | 3.262 | 5.957 | 0.584 | 0.517 | 0.64 |
| 7:00 | 0.45 | 22 | — | — | — | — | — | — | — | — |
| 8:00 | 0.45 | 22 | 0.0139 | 0.36 | 1.24 | 3.265 | 5.963 | 0.567 | 0.514 | 0.63 |
| 9:00 | 0.45 | 23 | — | — | — | — | — | — | — | — |
| 10:00 | 0.45 | 25 | 0.0137 | 0.36 | 1.20 | 3.252 | 5.933 | 0.564 | 0.516 | 0.62 |
| 11:00 | 0.45 | 27 | — | — | — | — | — | — | — | — |
| 12:00 | 0.45 | 29 | 0.0138 | 0.37 | 1.23 | 3.266 | 5.983 | 0.551 | 0.518 | 0.61 |
| 13:00 | 0.45 | 29 | — | — | — | — | — | — | — | — |
| 14:00 | 0.45 | 32 | 0.0138 | 0.37 | 1.24 | 3.266 | 5.990 | 0.558 | 0.520 | 0.62 |
| 15:00 | 0.45 | 37 | — | — | — | — | — | — | — | — |
| 16:00 | 0.44 | 31 | 0.0137 | 0.38 | 1.04 | 3.181 | 5.768 | 0.533 | 0.512 | 0.59 |
| 17:00 | 0.41 | 23 | — | — | — | — | — | — | — | — |
| 18:00 | 0.45 | 20 | 0.0137 | 0.38 | 1.04 | 3.181 | 5.768 | 0.522 | 0.512 | 0.58 |
| 19:00 | 0.45 | 22 | — | — | — | — | — | — | — | — |
| 20:00 | 0.45 | 23 | 0.0137 | 0.40 | 1.11 | 3.210 | 5.876 | 0.491 | 0.521 | 0.54 |
| 21:00 | 0.45 | 24 | — | — | — | — | — | — | — | — |
| 22:00 | 0.45 | 24 | 0.0137 | 0.38 | 1.06 | 3.183 | 5.792 | 0.516 | 0.515 | 0.57 |
| 23:00 | 0.45 | 24 | — | — | — | — | — | — | — | — |
| 23:59 | 0.45 | 24 | 0.0137 | 0.33 | 1.20 | 3.242 | 5.892 | 0.592 | 0.512 | 0.66 |
| Min. | 0.41 | 18 | 0.0137 | 0.33 | 1.04 | 3.181 | 5.768 | 0.491 | 0.512 | 0.54 |
| Max. | 0.45 | 37 | 0.0139 | 0.40 | 1.27 | 3.271 | 5.990 | 0.600 | 0.521 | 0.66 |
| Avg. | 0.45 | 25 | 0.0138 | 0.36 | 1.18 | — | — | — | — | — |

TABLE 4

Data Summary for Second Day of Continuous Operations for Example 6.2

| Time hr:min | Prod'tn Rate Ton/hr | MI g/10 min | Resin Density g/cc | Rx Pressure kg/cm³ | Rx Bed Temp. C. | Rx Inlet Temp. C. | Dew Point Temp. C. | Condensate wt % | Dist. Plate ΔP mm H₂O | UBD kg/m³ | LBD kg/m³ | Recycle Gas Density kg/m³ | Bed Height m | Bed Weight Ton |
|---|---|---|---|---|---|---|---|---|---|---|---|---|---|---|
| 1:00 | 45.5 | 1.93 | 0.919 | 21.01 | 87.7 | 38.6 | 58.9 | 22.5 | 2050 | 215 | 233 | 27.1 | 15.87 | 54.40 |
| 2:00 | 45.0 | 1.93 | 0.919 | 21.00 | 87.5 | 39.0 | 58.9 | 22.2 | 2010 | 215 | 235 | 27.1 | 15.77 | 54.14 |
| 3:00 | 44.9 | 1.93 | 0.919 | 21.00 | 87.8 | 39.2 | 58.7 | 21.8 | 1996 | 215 | 237 | 27.0 | 15.68 | 54.11 |
| 4:00 | 44.8 | 1.93 | 0.919 | 21.00 | 88.1 | 38.9 | 58.2 | 21.5 | 1978 | 214 | 240 | 26.9 | 15.60 | 54.07 |
| 5:00 | 44.3 | 1.93 | 0.919 | 20.99 | 88.2 | 38.4 | 57.5 | 21.2 | 1964 | 214 | 240 | 26.7 | 15.65 | 54.16 |
| 6:00 | 44.9 | 1.93 | 0.919 | 21.00 | 88.7 | 37.9 | 57.0 | 21.1 | 1944 | 215 | 242 | 26.6 | 15.63 | 54.15 |
| 7:00 | 45.4 | 1.93 | 0.918 | 20.99 | 88.4 | 37.7 | 56.6 | 20.8 | 1948 | 215 | 242 | 26.6 | 15.61 | 54.17 |
| 8:00 | 45.4 | 1.93 | 0.918 | 20.98 | 88.1 | 37.8 | 57.2 | 21.4 | 1964 | 214 | 241 | 26.7 | 15.66 | 54.16 |
| 9:00 | 45.5 | 1.86 | 0.918 | 21.00 | 87.7 | 38.0 | 58.0 | 21.9 | 2032 | 215 | 238 | 26.9 | 15.73 | 54.10 |
| 10:00 | 45.2 | 1.76 | 0.918 | 21.01 | 87.4 | 38.5 | 58.5 | 22.0 | 2000 | 215 | 233 | 27.0 | 15.75 | 53.89 |
| 11:00 | 44.7 | 1.85 | 0.918 | 21.00 | 88.0 | 38.7 | 58.1 | 21.5 | 1980 | 215 | 237 | 26.8 | 15.65 | 54.01 |
| 12:00 | 44.7 | 1.85 | 0.918 | 20.99 | 88.2 | 38.8 | 58.1 | 21.5 | 1982 | 215 | 238 | 26.8 | 15.63 | 54.12 |
| 13:00 | 45.2 | 1.92 | 0.918 | 21.02 | 88.5 | 38.8 | 58.4 | 21.9 | 2035 | 215 | 235 | 26.8 | 15.75 | 54.31 |
| 14:00 | 45.0 | 1.95 | 0.918 | 20.99 | 88.2 | 38.9 | 58.5 | 21.9 | 2001 | 215 | 236 | 26.8 | 15.62 | 53.98 |
| 15:00 | 44.9 | 1.95 | 0.918 | 20.99 | 88.2 | 39.1 | 59.0 | 22.2 | 2007 | 213 | 236 | 26.9 | 15.67 | 53.83 |
| 16:00 | 45.6 | 1.95 | 0.918 | 20.99 | 87.8 | 39.3 | 59.3 | 22.5 | 2018 | 213 | 236 | 27.0 | 15.72 | 54.08 |
| 17:00 | 46.4 | 1.95 | 0.918 | 21.02 | 87.5 | 39.5 | 59.6 | 22.7 | 2072 | 213 | 235 | 27.2 | 15.69 | 53.90 |
| 18:00 | 44.8 | 2.02 | 0.918 | 21.01 | 87.2 | 40.1 | 59.3 | 21.7 | 2020 | 213 | 235 | 27.1 | 15.69 | 53.88 |
| 19:00 | 43.3 | 2.06 | 0.918 | 21.00 | 87.7 | 40.8 | 58.9 | 20.8 | 2016 | 212 | 237 | 27.0 | 15.58 | 53.62 |
| 20:00 | 44.0 | 2.06 | 0.918 | 20.98 | 88.4 | 40.3 | 58.8 | 21.1 | 2006 | 214 | 238 | 26.9 | 15.56 | 53.70 |
| 21:00 | 44.9 | 2.06 | 0.918 | 21.01 | 88.3 | 39.7 | 58.8 | 21.6 | 2050 | 214 | 234 | 26.9 | 15.77 | 53.88 |
| 22:00 | 45.1 | 2.06 | 0.918 | 20.98 | 88.2 | 39.4 | 58.6 | 21.7 | 2013 | 212 | 235 | 26.9 | 15.59 | 53.05 |
| 23:00 | 45.8 | 2.06 | 0.918 | 20.99 | 88.1 | 39.4 | 59.1 | 22.3 | 2018 | 211 | 235 | 27.0 | 15.69 | 53.34 |
| 23:59 | 45.9 | 2.06 | 0.918 | 20.99 | 87.8 | 39.4 | 59.3 | 22.4 | 2020 | 212 | 234 | 27.1 | 15.74 | 53.67 |
| Min. | 43.3 | 1.76 | 0.918 | 20.98 | 87.2 | 37.7 | 56.6 | 20.8 | 1944 | 211 | 233 | 26.6 | 15.56 | 53.05 |
| Max. | 46.4 | 2.06 | 0.919 | 21.02 | 88.7 | 40.8 | 59.6 | 22.7 | 2072 | 215 | 242 | 27.2 | 15.87 | 54.40 |
| Avg. | 45.1 | 1.95 | 0.918 | 21.00 | 88.0 | 39.0 | 58.5 | 21.8 | 2005 | 214 | 237 | 26.9 | 15.68 | 53.95 |

| Time hr:min | SGV m/s | (Rx Bed T · Dew Pt. T) C. | Ethylene mol % | Ethane mol % | Hydrogen mol % | t-Butene mol % | Nitrogen mol % | IC5 mol % | Total Inert mol % | Catalyst Productivity g polymer/ g catalyst | $A_1$ | $A_2$ | $A_3$ |
|---|---|---|---|---|---|---|---|---|---|---|---|---|---|
| 1:00 | 0.73 | 28.8 | 32.5 | 3.46 | 6.57 | 12.9 | 34.5 | 9.42 | 2.26 | 4731 | 0.43 | 0.49 | 0.45 |
| 2:00 | 0.74 | 28.6 | 32.5 | 3.45 | 6.59 | 12.9 | 34.4 | 9.43 | 2.26 | 4690 | 0.43 | 0.48 | 0.45 |
| 3:00 | 0.74 | 29.1 | 32.5 | 3.45 | 6.57 | 13.0 | 34.4 | 9.34 | 2.26 | 4685 | 0.43 | 0.48 | 0.45 |
| 4:00 | 0.74 | 29.9 | 32.6 | 3.47 | 6.60 | 13.0 | 34.5 | 9.09 | 2.26 | 4676 | 0.43 | 0.47 | 0.45 |
| 5:00 | 0.75 | 30.8 | 32.6 | 3.47 | 6.67 | 13.1 | 34.7 | 8.82 | 2.26 | 4591 | 0.43 | 0.46 | 0.45 |
| 6:00 | 0.75 | 31.7 | 32.7 | 3.47 | 6.66 | 13.1 | 34.8 | 8.61 | 2.26 | 4593 | 0.43 | 0.46 | 0.45 |
| 7:00 | 0.78 | 31.8 | 32.8 | 3.46 | 6.70 | 13.2 | 34.8 | 8.49 | 2.26 | 4650 | 0.43 | 0.46 | 0.45 |
| 8:00 | 0.78 | 30.8 | 32.4 | 3.46 | 6.64 | 13.1 | 35.0 | 8.77 | 2.26 | 4649 | 0.43 | 0.47 | 0.45 |
| 9:00 | 0.78 | 29.8 | 32.4 | 3.44 | 6.57 | 13.0 | 34.9 | 9.05 | 2.26 | 4657 | 0.43 | 0.48 | 0.45 |
| 10:00 | 0.78 | 29.0 | 32.4 | 3.43 | 6.76 | 12.9 | 34.6 | 9.26 | 2.26 | 4642 | 0.43 | 0.48 | 0.45 |
| 11:00 | 0.78 | 30.0 | 32.6 | 3.44 | 6.78 | 13.0 | 34.5 | 9.09 | 2.26 | 4574 | 0.43 | 0.48 | 0.45 |
| 12:00 | 0.78 | 30.2 | 32.7 | 3.45 | 6.81 | 13.0 | 34.2 | 9.07 | 2.26 | 4451 | 0.43 | 0.46 | 0.45 |
| 13:00 | 0.79 | 30.2 | 32.9 | 3.44 | 6.94 | 13.0 | 33.8 | 9.16 | 2.26 | 4464 | 0.43 | 0.46 | 0.45 |
| 14:00 | 0.78 | 29.8 | 33.1 | 3.42 | 7.05 | 13.0 | 33.4 | 9.21 | 2.26 | 4445 | 0.43 | 0.46 | 0.45 |
| 15:00 | 0.77 | 29.2 | 33.1 | 3.40 | 7.00 | 13.0 | 33.3 | 9.37 | 2.26 | 4462 | 0.43 | 0.48 | 0.45 |
| 16:00 | 0.78 | 28.5 | 33.0 | 3.38 | 6.99 | 13.0 | 33.1 | 9.49 | 2.26 | 4584 | 0.44 | 0.48 | 0.45 |
| 17:00 | 0.78 | 27.9 | 32.8 | 3.37 | 7.02 | 13.0 | 33.2 | 9.61 | 2.27 | 4714 | 0.44 | 0.49 | 0.45 |
| 18:00 | 0.79 | 27.9 | 32.6 | 3.36 | 7.23 | 13.1 | 33.4 | 9.47 | 2.30 | 4741 | 0.46 | 0.49 | 0.45 |
| 19:00 | 0.79 | 28.8 | 32.4 | 3.37 | 7.05 | 13.2 | 33.8 | 9.31 | 2.30 | 4427 | 0.43 | 0.48 | 0.45 |
| 20:00 | 0.79 | 29.6 | 32.5 | 3.37 | 6.82 | 13.2 | 34.0 | 9.22 | 2.30 | 4293 | 0.43 | 0.49 | 0.45 |
| 21:00 | 0.79 | 29.6 | 32.6 | 3.37 | 6.87 | 13.2 | 34.0 | 9.23 | 2.30 | 4310 | 0.45 | 0.50 | 0.45 |
| 22:00 | 0.79 | 29.6 | 32.6 | 3.35 | 6.92 | 13.2 | 33.8 | 9.22 | 2.30 | 4275 | 0.46 | 0.51 | 0.45 |
| 23:00 | 0.79 | 28.9 | 32.7 | 3.33 | 6.90 | 13.2 | 33.5 | 9.35 | 2.30 | 4438 | 0.49 | 0.53 | 0.45 |
| 23:59 | 0.79 | 28.5 | 32.9 | 3.31 | 6.97 | 13.3 | 33.3 | 9.42 | 2.30 | 4559 | 0.49 | 0.48 | 0.45 |
| Min. | 0.73 | 27.9 | 32.4 | 3.31 | 6.57 | 12.9 | 33.1 | 8.49 | 2.26 | 4275 | 0.43 | 0.46 | 0.45 |
| Max. | 0.79 | 31.8 | 33.1 | 3.47 | 7.23 | 13.3 | 35.0 | 9.61 | 2.30 | 4741 | 0.49 | 0.53 | 0.45 |
| Avg. | 0.77 | 29.5 | 32.7 | 3.41 | 6.82 | 13.1 | 34.1 | 9.19 | 2.27 | 4454 | 0.44 | 0.48 | 0.45 |

| Time hr:min | $A_4$ | Δρ kg/m³ | Gas Viscosity cPoise | Settled Bulk Dens. g/cc | Avg Part. Size mm | X | Y | Z | Limit B | Ratio |
|---|---|---|---|---|---|---|---|---|---|---|
| 1:00 | 0.45 | 18 | — | — | — | — | — | — | — | — |
| 2:00 | 0.45 | 20 | 0.0136 | 0.35 | 1.08 | 3.196 | 5.789 | 0.554 | 0.508 | 0.62 |
| 3:00 | 0.45 | 23 | — | — | — | — | — | — | — | — |
| 4:00 | 0.45 | 26 | — | — | — | — | — | — | — | — |
| 5:00 | 0.45 | 26 | 0.0137 | 0.34 | 1.20 | 3.241 | 5.904 | 0.567 | 0.514 | 0.63 |
| 6:00 | 0.45 | 27 | — | — | — | — | — | — | — | — |

TABLE 4-continued

Data Summary for Second Day of Continuous Operations for Example 6.2

| | | | | | | | | | | |
|---|---|---|---|---|---|---|---|---|---|---|
| 7:00 | 0.45 | 27 | 0.0137 | 0.35 | 1.17 | 3.232 | 5.879 | 0.553 | 0.514 | 0.61 |
| 8:00 | 0.45 | 26 | — | — | — | — | — | — | — | — |
| 9:00 | 0.45 | 23 | 0.0137 | 0.36 | 1.23 | 3.272 | 5.958 | 0.537 | 0.514 | 0.60 |
| 10:00 | 0.45 | 19 | — | — | — | — | — | — | — | — |
| 11:00 | 0.45 | 21 | 0.0137 | 0.36 | 1.16 | 3.251 | 5.886 | 0.537 | 0.509 | 0.60 |
| 12:00 | 0.45 | 23 | — | — | — | — | — | — | — | — |
| 13:00 | 0.45 | 20 | 0.0136 | 0.37 | 1.24 | 3.280 | 5.988 | 0.524 | 0.516 | 0.58 |
| 14:00 | 0.45 | 22 | — | — | — | — | — | — | — | — |
| 15:00 | 0.45 | 23 | — | — | — | — | — | — | — | — |
| 16:00 | 0.45 | 23 | — | — | — | — | — | — | — | — |
| 17:00 | 0.45 | 22 | — | — | — | — | — | — | — | — |
| 18:00 | 0.45 | 22 | — | — | — | — | — | — | — | — |
| 19:00 | 0.45 | 25 | — | — | — | — | — | — | — | — |
| 20:00 | 0.45 | 24 | — | — | — | — | — | — | — | — |
| 21:00 | 0.45 | 20 | — | — | — | — | — | — | — | — |
| 22:00 | 0.45 | 22 | — | — | — | — | — | — | — | — |
| 23:00 | 0.45 | 24 | — | — | — | — | — | — | — | — |
| 23:59 | 0.45 | 21 | — | — | — | — | — | — | — | — |
| Min. | 0.45 | 18 | 0.0136 | 0.34 | 1.08 | 3.196 | 5.789 | 0.524 | 0.516 | 0.58 |
| Max. | 0.45 | 27 | 0.0137 | 0.37 | 1.24 | 3.280 | 5.988 | 0.567 | 0.508 | 0.63 |
| Avg. | 0.45 | 23 | 0.0137 | 0.36 | 1.18 | — | — | — | — | — |

TABLE 5

Data Summary of Third Day of Continuous Operations for Example 6.2

| Time hr:min | Prod'tn Rate Ton/hr | MI g/10 min | Resin Density g/cc | Rx Pressure kg/cm$^3$ | Rx Bed Temp. C. | Rx Inlet Temp. C. | Dew Point Temp. C. | Con- densate wt % | Dist. Plate ΔP mm H$_2$O | UBD kg/m$^3$ | LBD kg/m$^3$ | Recycle Gas Density kg/m$^3$ | Bed Height m | Bed Weight Ton |
|---|---|---|---|---|---|---|---|---|---|---|---|---|---|---|
| 1:00 | 45.5 | 2.06 | 0.918 | 21.02 | 87.7 | 39.7 | 59.2 | 22.1 | 2073 | 212 | 230 | 27.1 | 15.82 | 53.46 |
| 2:00 | 45.0 | 2.06 | 0.918 | 20.99 | 88.0 | 39.8 | 58.8 | 21.6 | 2011 | 212 | 232 | 27.0 | 15.69 | 53.08 |
| 3:00 | 44.7 | 2.06 | 0.918 | 20.99 | 87.9 | 39.6 | 58.2 | 21.3 | 2002 | 211 | 234 | 26.9 | 15.67 | 53.13 |
| 4:00 | 44.5 | 2.06 | 0.918 | 20.99 | 88.0 | 39.7 | 58.1 | 21.2 | 2000 | 211 | 234 | 26.8 | 15.66 | 53.06 |
| 5:00 | 45.1 | 2.06 | 0.918 | 21.00 | 88.0 | 39.7 | 58.3 | 21.5 | 2006 | 212 | 232 | 26.9 | 15.72 | 53.17 |
| 6:00 | 45.6 | 2.06 | 0.918 | 20.98 | 88.1 | 39.5 | 58.4 | 21.7 | 2001 | 212 | 233 | 26.9 | 15.78 | 53.44 |
| 7:00 | 46.0 | 2.06 | 0.918 | 20.99 | 88.2 | 39.2 | 58.5 | 21.9 | 2007 | 211 | 234 | 26.9 | 15.77 | 53.27 |
| 8:00 | 45.6 | 2.06 | 0.918 | 21.00 | 87.9 | 39.3 | 58.4 | 21.8 | 2008 | 211 | 233 | 26.9 | 15.80 | 53.30 |
| 9:00 | 46.1 | 2.11 | 0.919 | 21.02 | 88.1 | 39.1 | 58.5 | 22.2 | 2050 | 212 | 229 | 27.0 | 16.05 | 53.71 |
| 10:00 | 45.0 | 2.20 | 0.919 | 20.99 | 87.6 | 39.6 | 58.5 | 21.8 | 2018 | 212 | 231 | 27.0 | 15.88 | 53.04 |
| 11:00 | 45.2 | 2.20 | 0.919 | 20.99 | 88.1 | 39.8 | 58.6 | 21.7 | 2010 | 211 | 234 | 27.0 | 15.66 | 52.64 |
| 12:00 | 44.8 | 2.20 | 0.918 | 20.99 | 88.1 | 39.6 | 58.2 | 21.4 | 1997 | 212 | 235 | 26.9 | 15.63 | 52.76 |
| 13:00 | 45.6 | 2.20 | 0.918 | 21.00 | 88.3 | 39.3 | 58.2 | 21.7 | 2050 | 211 | 232 | 26.9 | 15.60 | 52.92 |
| 14:00 | 45.5 | 2.20 | 0.918 | 20.99 | 88.0 | 39.5 | 58.5 | 21.9 | 2012 | 212 | 234 | 26.9 | 15.62 | 53.43 |
| 15:00 | 45.5 | 2.17 | 0.918 | 21.00 | 87.9 | 39.8 | 58.9 | 21.9 | 2019 | 210 | 235 | 27.0 | 15.62 | 53.28 |
| 16:00 | 45.0 | 2.09 | 0.918 | 20.99 | 87.9 | 40.0 | 58.7 | 21.6 | 2025 | 212 | 234 | 27.0 | 15.62 | 53.38 |
| 17:00 | 45.5 | 2.09 | 0.918 | 21.00 | 88.4 | 39.6 | 58.5 | 21.8 | 2061 | 213 | 231 | 26.9 | 15.78 | 53.53 |
| 18:00 | 46.0 | 2.09 | 0.918 | 20.99 | 88.4 | 39.1 | 58.3 | 22.0 | 2014 | 211 | 232 | 26.9 | 15.71 | 53.19 |
| 19:00 | 45.9 | 2.17 | 0.918 | 20.99 | 87.9 | 39.0 | 58.1 | 21.9 | 2017 | 211 | 231 | 26.9 | 15.71 | 53.07 |
| 20:00 | 45.9 | 2.24 | 0.918 | 20.99 | 87.9 | 39.0 | 58.2 | 21.9 | 2017 | 211 | 232 | 26.9 | 15.65 | 52.90 |
| 21:00 | 45.6 | 2.24 | 0.918 | 20.99 | 87.8 | 39.3 | 58.3 | 21.9 | 2019 | 210 | 232 | 27.0 | 15.67 | 53.00 |
| 22:00 | 46.0 | 2.24 | 0.918 | 20.99 | 88.0 | 39.3 | 58.5 | 22.0 | 2023 | 209 | 232 | 27.0 | 15.67 | 52.99 |
| 23:00 | 45.9 | 2.17 | 0.918 | 21.00 | 87.9 | 39.4 | 58.5 | 21.9 | 2023 | 209 | 231 | 27.0 | 15.62 | 52.70 |
| 23:59 | 46.0 | 2.13 | 0.918 | 20.98 | 88.1 | 39.3 | 58.4 | 21.9 | 2012 | 209 | 232 | 26.9 | 15.62 | 52.79 |
| Min. | 44.5 | 2.06 | 0.918 | 20.98 | 87.6 | 39.0 | 58.1 | 21.2 | 1997 | 209 | 229 | 26.8 | 15.60 | 52.64 |
| Max. | 46.1 | 2.24 | 0.919 | 21.02 | 88.4 | 40.0 | 59.2 | 22.2 | 2073 | 213 | 235 | 27.1 | 16.05 | 53.71 |
| Avg. | 45.5 | 2.13 | 0.918 | 20.99 | 88.0 | 39.5 | 58.5 | 21.8 | 2020 | 211 | 233 | 26.9 | 15.71 | 53.14 |

| Time hr:min | SGV m/s | (Rx Bed T · Dew Pt. T) C. | Ethylene mol % | Ethane mol % | Hydrogen mol % | t-Butene mol % | Nitrogen mol % | IC5 mol % | Total Inert mol % | Catalyst Productivity g polymer/ g catalyst | $A_1$ | $A_2$ | $A_3$ |
|---|---|---|---|---|---|---|---|---|---|---|---|---|---|
| 1:00 | 0.79 | 28.5 | 33.0 | 3.30 | 6.98 | 13.3 | 33.2 | 9.33 | 2.30 | 4662 | 0.49 | 0.47 | 0.45 |
| 2:00 | 0.80 | 29.1 | 33.2 | 3.30 | 7.04 | 13.4 | 33.1 | 9.12 | 2.30 | 4604 | 0.46 | 0.48 | 0.45 |
| 3:00 | 0.80 | 29.7 | 33.6 | 3.29 | 7.10 | 13.5 | 32.8 | 8.88 | 2.30 | 4721 | 0.43 | 0.48 | 0.45 |
| 4:00 | 0.80 | 29.9 | 33.9 | 3.28 | 7.15 | 13.6 | 32.4 | 8.86 | 2.30 | 4732 | 0.47 | 0.50 | 0.45 |
| 5:00 | 0.80 | 29.6 | 34.2 | 3.29 | 7.25 | 13.7 | 31.9 | 8.88 | 2.30 | 4747 | 0.45 | 0.50 | 0.45 |
| 6:00 | 0.81 | 29.7 | 34.1 | 3.28 | 7.27 | 13.7 | 31.8 | 8.88 | 2.30 | 4754 | 0.44 | 0.51 | 0.45 |
| 7:00 | 0.81 | 29.7 | 34.3 | 3.27 | 7.23 | 13.7 | 31.8 | 8.90 | 2.30 | 4801 | 0.45 | 0.52 | 0.45 |
| 8:00 | 0.81 | 29.5 | 34.2 | 3.26 | 7.28 | 13.7 | 31.8 | 8.92 | 2.30 | 4750 | 0.46 | 0.52 | 0.47 |
| 9:00 | 0.80 | 29.6 | 34.4 | 3.24 | 7.23 | 13.7 | 31.7 | 8.92 | 2.30 | 4837 | 0.47 | 0.52 | 0.47 |
| 10:00 | 0.81 | 29.1 | 34.1 | 3.22 | 7.34 | 13.8 | 31.8 | 8.93 | 2.30 | 4786 | 0.45 | 0.50 | 0.46 |

TABLE 5-continued

Data Summary of Third Day of Continuous Operations for Example 6.2

| 11:00 | 0.81 | 29.6 | 34.3 | 3.20 | 7.20 | 13.9 | 31.8 | 8.98 | 2.30 | 4713 | 0.47 | 0.49 | 0.45 |
|---|---|---|---|---|---|---|---|---|---|---|---|---|---|
| 12:00 | 0.81 | 29.9 | 34.3 | 3.20 | 7.30 | 13.9 | 31.9 | 8.79 | 2.30 | 4633 | 0.43 | 0.47 | 0.45 |
| 13:00 | 0.82 | 30.1 | 34.4 | 3.18 | 7.28 | 13.9 | 31.8 | 8.82 | 2.30 | 4672 | 0.49 | 0.49 | 0.47 |
| 14:00 | 0.82 | 29.5 | 34.1 | 3.16 | 7.25 | 13.8 | 31.8 | 8.92 | 2.30 | 4663 | 0.52 | 0.50 | 0.48 |
| 15:00 | 0.82 | 29.0 | 34.1 | 3.14 | 7.20 | 13.9 | 31.9 | 8.99 | 2.30 | 4664 | 0.49 | 0.49 | 0.47 |
| 16:00 | 0.82 | 29.3 | 34.1 | 3.14 | 7.24 | 13.9 | 31.8 | 8.90 | 2.30 | 4605 | 0.47 | 0.50 | 0.46 |
| 17:00 | 0.82 | 29.9 | 34.1 | 3.12 | 7.23 | 13.9 | 31.8 | 8.83 | 2.30 | 4536 | 0.49 | 0.52 | 0.45 |
| 18:00 | 0.82 | 30.0 | 34.4 | 3.11 | 7.23 | 14.0 | 31.7 | 8.76 | 2.30 | 4602 | 0.50 | 0.51 | 0.45 |
| 19:00 | 0.82 | 29.8 | 34.4 | 3.09 | 7.30 | 14.0 | 31.7 | 8.69 | 2.30 | 4696 | 0.49 | 0.53 | 0.45 |
| 20:00 | 0.82 | 29.8 | 34.4 | 3.08 | 7.22 | 14.1 | 31.7 | 8.68 | 2.30 | 4703 | 0.53 | 0.50 | 0.48 |
| 21:00 | 0.82 | 29.4 | 34.2 | 3.07 | 7.16 | 14.1 | 31.9 | 8.73 | 2.30 | 4671 | 0.46 | 0.52 | 0.50 |
| 22:00 | 0.82 | 29.5 | 34.1 | 3.06 | 6.99 | 14.1 | 32.0 | 8.82 | 2.30 | 4709 | 0.47 | 0.53 | 0.47 |
| 23:00 | 0.82 | 29.4 | 34.3 | 3.05 | 7.18 | 14.0 | 31.9 | 8.81 | 2.30 | 4696 | 0.46 | 0.53 | 0.49 |
| 23:59 | 0.82 | 29.8 | 34.5 | 3.05 | 7.26 | 14.1 | 31.5 | 8.78 | 2.30 | 4709 | 0.49 | 0.53 | 0.52 |
| Min. | 0.79 | 28.5 | 33.0 | 3.05 | 6.98 | 13.3 | 31.5 | 8.68 | 2.30 | 4536 | 0.43 | 0.47 | 0.45 |
| Max. | 0.82 | 30.1 | 34.5 | 3.30 | 7.34 | 14.1 | 33.2 | 9.33 | 2.30 | 4837 | 0.53 | 0.53 | 0.52 |
| Avg. | 0.81 | 29.6 | 34.1 | 3.18 | 7.20 | 13.8 | 32.0 | 8.88 | 2.30 | 4694 | 0.47 | 0.50 | 0.46 |

| Time hr:min | $A_4$ | $\Delta\rho$ kg/m$^3$ | Gas Viscosity cPoise | Settled Bulk Dens. g/cc | Avg Part. Size mm | X | Y | Z | Limit B | Ratio |
|---|---|---|---|---|---|---|---|---|---|---|
| 1:00 | 0.45 | 18 | — | — | — | — | — | — | — | — |
| 2:00 | 0.45 | 20 | 0.0135 | 0.39 | 1.26 | 3.300 | 6.043 | 0.489 | 0.518 | 0.54 |
| 3:00 | 0.45 | 23 | — | — | — | — | — | — | — | — |
| 4:00 | 0.45 | 23 | 0.0135 | 0.40 | 1.32 | 3.322 | 6.111 | 0.475 | 0.524 | 0.53 |
| 5:00 | 0.45 | 21 | — | — | — | — | — | — | — | — |
| 6:00 | 0.45 | 22 | 0.0135 | 0.39 | 1.30 | 3.317 | 6.081 | 0.488 | 0.518 | 0.54 |
| 7:00 | 0.45 | 23 | — | — | — | — | — | — | — | — |
| 8:00 | 0.45 | 22 | 0.0134 | 0.40 | 1.24 | 3.305 | 6.037 | 0.473 | 0.514 | 0.53 |
| 9:00 | 0.45 | 17 | — | — | — | — | — | — | — | — |
| 10:00 | 0.45 | 19 | 0.0134 | 0.41 | 1.08 | 3.241 | 5.869 | 0.465 | 0.508 | 0.52 |
| 11:00 | 0.45 | 23 | — | — | — | — | — | — | — | — |
| 12:00 | 0.45 | 24 | 0.0135 | 0.42 | 1.14 | 3.266 | 5.943 | 0.452 | 0.509 | 0.50 |
| 13:00 | 0.45 | 21 | — | — | — | — | — | — | — | — |
| 14:00 | 0.45 | 23 | 0.0134 | 0.41 | 1.14 | 3.273 | 5.937 | 0.464 | 0.509 | 0.52 |
| 15:00 | 0.45 | 25 | — | — | — | — | — | — | — | — |
| 16:00 | 0.45 | 23 | 0.0134 | 0.40 | 1.07 | 3.248 | 5.846 | 0.472 | 0.501 | 0.53 |
| 17:00 | 0.45 | 18 | — | — | — | — | — | — | — | — |
| 18:00 | 0.45 | 21 | 0.0134 | 0.39 | 1.12 | 3.266 | 5.893 | 0.493 | 0.503 | 0.55 |
| 19:00 | 0.45 | 20 | — | — | — | — | — | — | — | — |
| 20:00 | 0.45 | 21 | 0.0134 | 0.39 | 1.12 | 3.265 | 5.893 | 0.486 | 0.503 | 0.54 |
| 21:00 | 0.45 | 22 | — | — | — | — | — | — | — | — |
| 22:00 | 0.46 | 22 | — | — | — | — | — | — | — | — |
| 23:00 | 0.45 | 23 | — | — | — | — | — | — | — | — |
| 23:59 | 0.49 | 23 | — | — | — | — | — | — | — | — |
| Min. | 0.45 | 17 | 0.0134 | 0.39 | 1.07 | 3.241 | 5.846 | 0.452 | 0.501 | 0.50 |
| Max. | 0.49 | 25 | 0.0135 | 0.42 | 1.32 | 3.322 | 6.111 | 0.493 | 0.524 | 0.55 |
| Avg. | 0.45 | 21 | 0.0134 | 0.40 | 1.18 | — | — | — | — | — |

It should be noted that continuous operation was in effect before the day the Table 3 data was compiled and continued after the day the Table 5 data was compiled. It also should be noted that the gas viscosity, a parameter that is not normally measured but that is used, e.g., by U.S. Pat. No. 5,436,304 in the calculation of its X and Y values, was determined retrospectively using the BRO II computer software program, which is well known for such purposes by those skilled in the art.

As demonstrated by Table 3, at no time did the values of each of $A_3$ and $A_4$ exceed 0.45 during the first day. Also, at no time during the first day did $A_1$ exceed 0.51 and at no time during the first day did $A_2$ exceed 0.55. Furthermore, at times during the first day when $\Delta\rho$ was 30 kg/m$^3$ or greater, i.e., 14:00, 15:00 and 16:00 hours, each of $A_1$ through $A_4$ did not exceed 0.45. Except for 14:00, 15:00 and 16:00 hours when operations were in a transitional state combining the "steady state" with the "alert state," operations were in the "steady state" at all other times on the first day.

As demonstrated by Tables 4 and 5, at no time did the values of each of $A_1$ through $A_4$ exceed 0.55 during the second and third days. Also, at no time during the second and third days did $\Delta\rho$ equal or exceed 30 kg/m$^3$, attaining a maximum of only 27 kg/m$^3$ at 6:00 and 7:00 hours of the second day (see Table 4). Therefore, operations were in the "steady state" at all times on each of the second and third day.

Thus, this example demonstrates the "steady state" operations of the fluidized bed throughout the second and third days of the three day period and over the majority of the first day of that period. Furthermore, during the three day period, continuous operation was provided even though the liquid-containing mixture introduced into the reaction zone contained relatively high levels of liquid by weight based on the total weight of the recycle stream. For example, the liquid level in the recycle stream remained above 20 wt. % throughout the period from 10:00 to 24:00 hours on the first day with a high value of 23.8 wt. % at 10:00 hours during that period (see Table 3). Moreover, the liquid level in the recycle stream remained at or above 20.8 wt. % throughout the entire second day with a high value of 22.7 wt. % at 17:00 hours. Thus, this example further demonstrates that "steady state" operations of the fluidized bed can be provided even when the liquid level in the recycle stream is relatively high, e.g., at least about 17.5 wt. %, at least about 20 wt. %, or at least about 21.8 wt. %.

Additionally, contrary to the teachings of, e.g., U.S. Pat. No. 5,352,749, this example demonstrates that the ratio of FBD to SBD ("Ratio") need not be maintained above 0.59 to ensure continuity in the fluidized bed polymerization process. For example, on the third day of continuous operations (see Table 5), the present fluidized bed polymerization method operated continuously, inter alia, from 2:00 through and including 20:00 hours; during that entire time of continuous "steady state" operation, the Ratio was below 0.59. In fact, during that 18 hour period, the Ratio never exceeded 0.55 (see 18:00 hours row in Table 5).

Furthermore, contrary to the teachings of, e.g., U.S. Pat. No. 5,436,304, this example demonstrates that Z, the so-called "bulk density function," need not be maintained at a value equal to or greater than the so-called "calculated limit of the bulk density function" ("Limit B," determined from the parameters "X" and "Y" using Table B of U.S. Pat. No. 5,436,304) to avoid destabilizing the fluidized bed. For example, on the third day of continuous operations (see Table 5), the present fluidized bed polymerization method operated continuously during that entire day and during that period of continuous "steady state" operation, inter alia, from 2:00 to 20:00 hours, Z was below the Limit B.

Run Indicating Loss of Continuity State 2

This example shows that the $\Delta\rho$ parameter indicates changes in the fluidized bed and its disruption, ultimately leading to the "loss of continuity state 2" requiring reactor shut-down.

Certain factors caused production to be shut down and process continuity to be lost during the gas fluidized bed production of a copolymer from a mixture containing about 39.5 mol % ethylene monomer, about 13.6 mol % butene-1monomer, about 5.8 mol % hydrogen, and about 41.1 mol % nitrogen. The mixture that was introduced into the reaction zone contained substantially no liquid based on the total weight of the recycle stream, i.e., the method was operating in the dry mode. The catalyst used was a Ziegler-Natta type catalyst comprising titanium trichloride and aluminum alkyl. The catalyst productivity was about 6,693 g polymer/g catalyst.

A fluidized bed reactor apparatus similar to the one described in Example 6.1 was used, with the following variations. In this example, Q was about 13.6 m. The reactor column was equipped with two measuring site$_n$ thermocouple devices opposite to each other; each was located approximately at 0.011 Q, i.e., at about 152 mm above the surface of the distributor plate facing the fluidized bed. The reactor column was also equipped with pressure taps $P_1$, $P_2$ and $P_3$ located approximately as follows: at 0.011Q (about 151 mm), 0.20Q (about 2,740 mm) and 0.627Q (about 8,530 mm), respectively, above the surface of the distributor plate facing the fluidized bed. The approximate controlled reactor bed temperature set-point was 88° C. which resulted in an average controlled reactor bed temperature of from about 87.0° C. to about 88.8° C., for the 12 hour period ending at about 20:13 hours, i.e., preceding the events beginning at 20:13 hours, as discussed below. During that 12 hour period, the polymer production rate was about 24.5 metric tons/hour.

A retrospective analysis of the data indicated that several conditions existed before an adjustment in operating parameters was made at about 20:15 hours. Specifically, analysis revealed that several changes in the copolymer MI were made during about a 24 hour period preceding 20:13 hours, i.e., from 2.0 to 1.0 to 2.0 and finally back to 1.0. Furthermore, there were indications that the hydrogen gas sensor readings were inaccurate.

Figure 8:
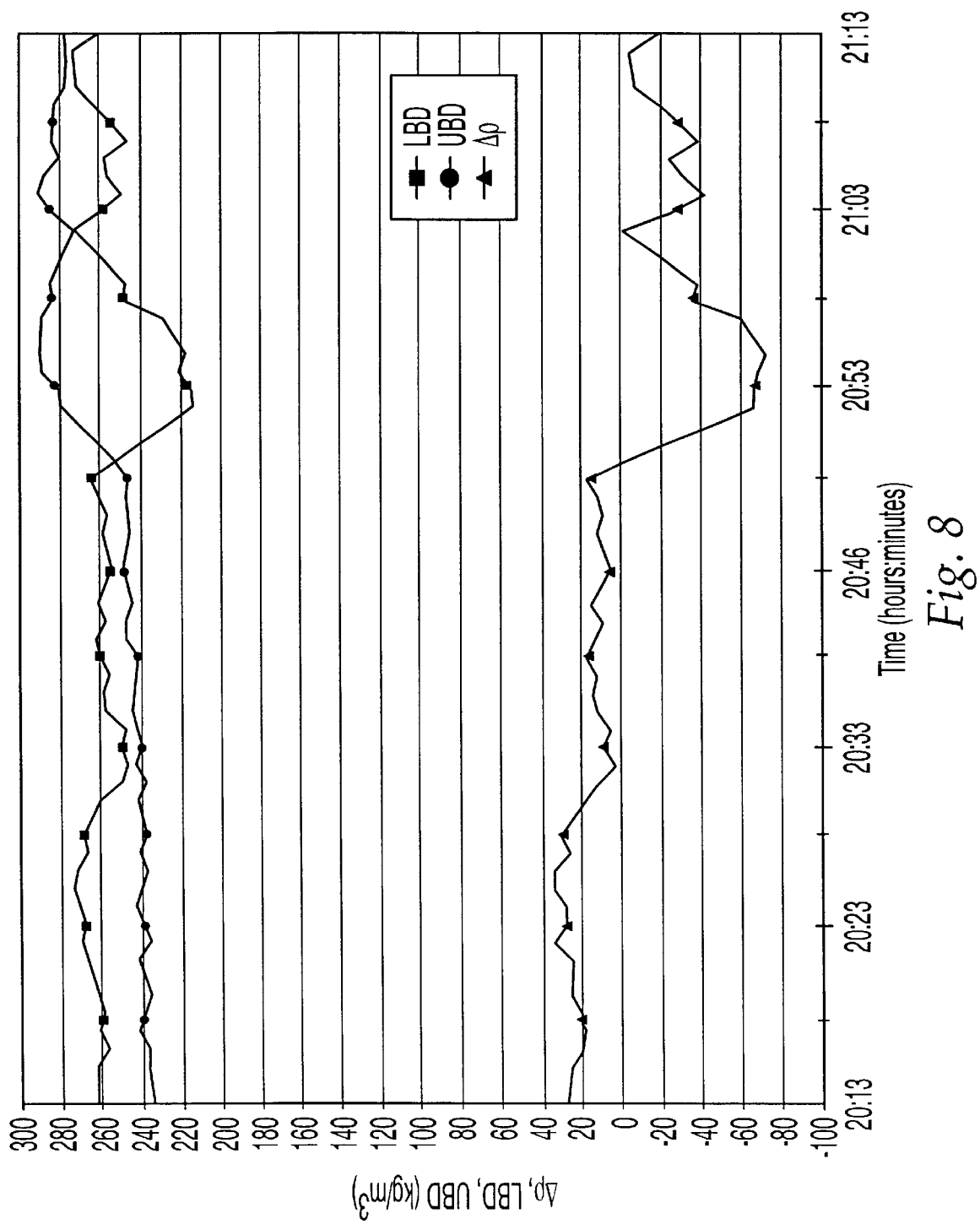
FIG. 8 shows a plot of LBD, UBD and $\Delta\rho$ versus time from about 20:13 hours to about 21:13 hours for Example 6.3.

At about 20:15 hours, as static charge built up in the reactor column, the static agent control system was activated to dissipate that charge. This system is conventional and, therefore, it is not shown in FIG. 1; however, its contents enter the reaction zone through a connection to line 8. The static agent control system may have inadvertently added water to the reactor. At about 20:30 hours, the LBD approached the UBD value. FIG. 8 shows a plot of LBD, UBD and $\Delta\rho$ over the period of from about 20:13 to about 21:13 hours. No corresponding values for $A_1$, $A_2$, $A_3$ and $A_4$ were available for retrospective analysis. Also from FIG. 8, it can be noted that $\Delta\rho$ values were non-negative and below about 10 kg/m$^3$ from about 20:31 to about 20:35 hours and from about 20:42 to about 20:44 hours. During, at least, the former interval, i.e., from about 20:31 to about 20:35 hours, $\Delta\rho$ values indicated the "$\Delta\rho$ alarm state." Additionally, from FIG. 8 it can be noted, e.g., that $\Delta\rho$ reached a value of about 0 kg/m$^3$ at about 20:49 hours and remained substantially below 0 kg/m$^3$ until at least about 21:13 hours, i.e., in the "loss of continuity state 2."

At 20:50 hours the polymerization reaction was shut down by administering a "type I kill" for the catalyst. Then, the reactor system was purged to remove the carbon monoxide catalyst poison, the flow of ethylene and butene-1 was restored, and catalyst was reintroduced. Subsequently, the SGV fell from about 0.71 to about 0.68 m/sec and the Distributor Plate $\Delta P$ increased from about 2,500 to about 3,100 mm water. A divergence in the lower and upper fluidized bed properties resulted. The LBD began to decrease, eventually falling to less than about 220 kg/m$^3$, e.g., at 20:53 hours, while the UBD began to increase, eventually rising to higher than about 280 kg/m$^3$, e.g., at 20:53 hours. These changes in LBD, UBD and $\Delta\rho$ can be seen from the data plotted in FIG. 8.

At about 21:02 hours, $\Delta\rho$ approached the "$\Delta\rho$ alarm state." However, this state was not attained because "$\Delta\rho$" remained negative until about 21:13 hours. Thus, at about 20:49 hours and thereafter until at least until at least about 21:13 hours, $\Delta\rho$ had a value of at less than 0 kg/m$^3$, i.e., the "loss of continuity state 2" was indicated from about 20:49 hours and thereafter until at least about 21:13 hours. At this point, the disruption of the fluidized bed was irreversible.

Attaining the "loss of continuity state 2" indicated that excessive polymer chunk formation occurred within the reactor, clogging it, and that production had to be stopped. The compressor was shut down at 23:53 hours and, thereafter, the reactor was shut down and disassembled. A substantial quantity of polymer product was lost as a result of the shut-down.

All publications and patent applications are herein incorporated by reference to the same extent as if each individual publication or patent application was specifically and individually indicated to be incorporated by reference.

All concentrations herein are by weight unless otherwise noted.

Although the invention has been described with reference to particular embodiments, it will be appreciated that various changes and modifications can be made without departing from the spirit or scope of the invention.

What is claimed is:

1. A continuous gas fluidized bed method for making a polymer featuring a condensing agent in a recycle stream comprising:

continuously passing a gaseous stream comprising monomer and the condensing agent through a fluidized bed in a reaction zone having a controlled reactor bed temperature, a lower fluidized bed density, an upper fluidized bed density and a plurality of measuring site$_n$ temperatures, in the presence of catalyst;

withdrawing from the reaction zone polymer product and a stream comprising unreacted gases;

recycling the stream into the reaction zone with sufficient additional monomer to replace monomer polymerized and withdrawn as polymer product;

cooling the recycle stream to condense a portion thereof and form a liquid-containing mixture having a recycle stream dew point temperature, a reactor inlet temperature and comprising from about 17.5% to about 70% liquid by weight based on the total weight of the cooled recycle stream wherein the difference between the controlled reactor bed temperature and the recycle stream dew point temperature of the mixture is greater than or equal to about 5° C.; and introducing the mixture into the reaction zone wherein the liquid in the mixture is vaporized;

wherein $\Delta\rho$ satisfies the condition $0 \text{ kg/m}^3 \leq \Delta\rho < 70 \text{ kg/m}^3$ and, when $\Delta\rho \geq 10 \text{ kg/m}^3$, simultaneously, at least a critical number of $A_n$ satisfy the condition $0.25 \leq A_n < 0.8$; and wherein $\Delta\rho$ is equal to the (lower fluidized bed density) minus the (upper fluidized bed density) and $$A_n = \frac{(\text{controlled reactor bed temperature}) - (\text{measuring site}_n \text{ temperature})}{(\text{controlled reactor bed temperature}) - (\text{reactor inlet temperature})}.$$

2. The continuous gas fluidized bed method of claim 1, wherein the polymer is a polyolefin.

3. The continuous gas fluidized bed method of claim 2, wherein the liquid-containing mixture comprises at least about 20% liquid by weight based on the total weight of the cooled recycle stream.

4. The continuous gas fluidized bed method of claim 2, wherein the liquid-containing mixture comprises at least about 21.8% liquid by weight based on the total weight of the cooled recycle stream.

5. The continuous gas fluidized bed method of claim 2, wherein the monomer is ethylene, the controlled reactor bed temperature is from about 100° C. to about 115° C., and the liquid-containing mixture comprises at least about 21.8% liquid by weight based on the total weight of the cooled recycle stream.

6. The continuous gas fluidized bed method of claim 5, wherein the controlled reactor bed temperature is from about 105° C. to about 110° C.

7. The continuous gas fluidized bed method of claim 2, wherein the monomers are ethylene and butene-1, the controlled reactor bed temperature is from about 80° C. to about 95° C., and the liquid-containing mixture comprises from about 17.5% to about 40% liquid by weight based on the total weight of the cooled recycle stream.

8. The continuous gas fluidized bed method of claim 7, wherein the controlled reactor bed temperature is from about 80° C. to about 90° C.

9. The continuous gas fluidized bed method of claim 2, wherein the monomers are ethylene and hexene-1, the controlled reactor bed temperature is from about 78° C. to about 90° C., and the liquid-containing mixture comprises at least about 17.5% liquid by weight based on the total weight of the cooled recycle stream.

10. The continuous gas fluidized bed method of claim 2, wherein the monomers are ethylene and hexene-1, the controlled reactor bed temperature is from about 100° C. to about 110° C., and the liquid-containing mixture comprises at least about 20% liquid by weight based on the total weight of the cooled recycle stream.

11. The continuous gas fluidized bed method of claim 2, wherein the monomer is propylene.

12. The continuous gas fluidized bed method of claim 2, wherein the monomers are propylene and butene-1.

13. The continuous gas fluidized bed method of claim 2, wherein the difference between the controlled reactor bed temperature and the recycle stream dew point temperature of the mixture is greater than or equal to about 10° C.

14. The continuous gas fluidized bed method of claim 13, wherein the liquid-containing mixture comprises at least about 20% liquid by weight based on the total weight of the cooled recycle stream.

15. The continuous gas fluidized bed method of claim 13, wherein the liquid-containing mixture comprises at least about 21.8% liquid by weight based on the total weight of the cooled recycle stream.

16. The continuous gas fluidized bed method of claim 13, wherein the monomer is ethylene, the controlled reactor bed temperature is from about 100° C. to about 115° C., and the liquid-containing mixture comprises at least about 21.8% liquid by weight based on the total weight of the cooled recycle stream.

17. The continuous gas fluidized bed method of claim 16, wherein the controlled reactor bed temperature is from about 105° C. to about 110° C.

18. The continuous gas fluidized bed method of claim 13, wherein the monomers are ethylene and butene-1, the controlled reactor bed temperature is from about 80° C. to about 95° C., and the liquid-containing mixture comprises from about 17.5% to about 40% liquid by weight based on the total weight of the cooled recycle stream.

19. The continuous gas fluidized bed method of claim 18, wherein the controlled reactor bed temperature is from about 80° C. to about 90° C.

20. The continuous gas fluidized bed method of claim 13, wherein the monomers are ethylene and hexene-1, the controlled reactor bed temperature is from about 78° C. to about 90° C., and the liquid-containing mixture comprises at least about 17.5% liquid by weight based on the total weight of the cooled recycle stream.

21. The continuous gas fluidized bed method of claim 13, wherein the monomers are ethylene and hexene-1, the controlled reactor bed temperature is from about 100° C. to about 110° C., and the liquid-containing mixture comprises at least about 20% liquid by weight based on the total weight of the cooled recycle stream.

22. The continuous gas fluidized bed method of claim 13, wherein the monomer is propylene.

23. The continuous gas fluidized bed method of claim 13, wherein the monomers are propylene and butene-1.

24. The continuous gas fluidized bed method of claim 2, wherein the difference between the controlled reactor bed temperature and the recycle stream dew point temperature of the mixture is greater than or equal to about 15° C.

25. The continuous gas fluidized bed method of claim 24, wherein the liquid-containing mixture comprises at least about 20% liquid by weight based on the total weight of the cooled recycle stream.

26. The continuous gas fluidized bed method of claim 24, wherein the liquid-containing mixture comprises at least about 21.8% liquid by weight based on the total weight of the cooled recycle stream.

27. The continuous gas fluidized bed method of claim 24, wherein the monomer is ethylene, the controlled reactor bed temperature is from about 100° C. to about 115° C., and the liquid-containing mixture comprises at least about 21.8% liquid by weight based on the total weight of the cooled recycle stream.

28. The continuous gas fluidized bed method of claim 27, wherein the controlled reactor bed temperature is from about 105° C. to about 110° C.

29. The continuous gas fluidized bed method of claim 24, wherein the monomers are ethylene and butene-1, the controlled reactor bed temperature is from about 80° C. to about 95° C., and the liquid-containing mixture comprises from about 17.5% to about 40% liquid by weight based on the total weight of the cooled recycle stream.

30. The continuous gas fluidized bed method of claim 29, wherein the controlled reactor bed temperature is from about 80° C. to about 90° C.

31. The continuous gas fluidized bed method of claim 24, wherein the monomers are ethylene and hexene-1, the controlled reactor bed temperature is from about 78° C. to about 90° C., and the liquid-containing mixture comprises at least about 17.5% liquid by weight based on the total weight of the cooled recycle stream.

32. The continuous gas fluidized bed method of claim 24, wherein the monomers are ethylene and hexene-1, the controlled reactor bed temperature is from about 100° C. to about 110° C., and the liquid-containing mixture comprises at least about 20% liquid by weight based on the total weight of the cooled recycle stream.

33. The continuous gas fluidized bed method of claim 24, wherein the monomer is propylene.

34. The continuous gas fluidized bed method of claim 24, wherein the monomers are propylene and butene-1.

35. A continuous gas fluidized bed method for making a polymer featuring a condensing agent in a recycle stream comprising:

continuously passing a gaseous stream comprising monomer and the condensing agent through a fluidized bed in a reaction zone having a controlled reactor bed temperature, a lower fluidized bed density, an upper fluidized bed density and a plurality of measuring site$_n$ temperatures, in the presence of catalyst;

withdrawing from the reaction zone polymer product and a stream comprising unreacted gases;

recycling the stream into the reaction zone with sufficient additional monomer to replace monomer polymerized and withdrawn as polymer product;

cooling the recycle stream to condense a portion thereof and form a liquid-containing mixture having a recycle stream dew point temperature, a reactor inlet temperature and comprising from about 17.5% to about 70% liquid by weight based on the total weight of the cooled recycle stream wherein the difference between the controlled reactor bed temperature and the recycle stream dew point temperature of the mixture is greater than or equal to about 5° C.; and introducing the mixture into the reaction zone wherein the liquid in the mixture is vaporized;

wherein, simultaneously, $\Delta\rho$ satisfies the condition 10 kg/m$^3$ $\leq \Delta\rho <$ 30 kg/m$^3$ and at least a critical number of A$_n$ satisfy the condition 0.25 $\leq$ A$_n$ < 0.55; and wherein $\Delta\rho$ is equal to the (lower fluidized bed density) minus the (upper fluidized bed density) and $$A_n = \frac{\text{(controlled reactor bed temperature)} - \text{(measuring site}_n \text{ temperature)}}{\text{(controlled reactor bed temperature)} - \text{(reactor inlet temperature)}}.$$

36. The continuous gas fluidized bed method of claim 35, wherein the polymer is a polyolefin.

37. The continuous gas fluidized bed method of claim 36, wherein the liquid-containing mixture comprises at least about 20% liquid by weight based on the total weight of the cooled recycle stream.

38. The continuous gas fluidized bed method of claim 36, wherein the liquid-containing mixture comprises at least about 21.8% liquid by weight based on the total weight of the cooled recycle stream.

39. The continuous gas fluidized bed method of claim 36, wherein the monomer is ethylene, the controlled reactor bed temperature is from about 100° C. to about 115° C., and the liquid-containing mixture comprises at least about 21.8% liquid by weight based on the total weight of the cooled recycle stream.

40. The continuous gas fluidized bed method of claim 36, wherein the monomers are ethylene and butene-1, the controlled reactor bed temperature is from about 80° C. to about 95° C., and the liquid-containing mixture comprises from about 17.5% to about 40% liquid by weight based on the total weight of the cooled recycle stream.

41. The continuous gas fluidized bed method of claim 36, wherein the monomers are ethylene and hexene-1, the controlled reactor bed temperature is from about 78° C. to about 90° C., and the liquid-containing mixture comprises at least about 17.5% liquid by weight based on the total weight of the cooled recycle stream.

42. The continuous gas fluidized bed method of claim 36, wherein the monomers are ethylene and hexene-1, the controlled reactor bed temperature is from about 100° C. to about 110° C., and the liquid-containing mixture comprises at least about 20% liquid by weight based on the total weight of the cooled recycle stream.

43. The continuous gas fluidized bed method of claim 36, wherein the monomer is propylene.

44. The continuous gas fluidized bed method of claim 36, wherein the monomers are propylene and butene-1.

45. The continuous gas fluidized bed method of claim 36, wherein the difference between the controlled reactor bed temperature and the recycle stream dew point temperature of the mixture is greater than or equal to about 10° C.

46. The continuous gas fluidized bed method of claim 45, wherein the liquid-containing mixture comprises at least about 20% liquid by weight based on the total weight of the cooled recycle stream.

47. The continuous gas fluidized bed method of claim 45, wherein the liquid-containing mixture comprises at least about 21.8% liquid by weight based on the total weight of the cooled recycle stream.

48. The continuous gas fluidized bed method of claim 45, wherein the monomer is ethylene, the controlled reactor bed temperature is from about 100° C. to about 115° C., and the liquid-containing mixture comprises at least about 21.8% liquid by weight based on the total weight of the cooled recycle stream.

49. The continuous gas fluidized bed method of claim 45, wherein the monomers are ethylene and butene-1, the controlled reactor bed temperature is from about 80° C. to about 95° C., and the liquid-containing mixture comprises from about 17.5% to about 40% liquid by weight based on the total weight of the cooled recycle stream.

50. The continuous gas fluidized bed method of claim 45, wherein the monomers are ethylene and hexene-1, the controlled reactor bed temperature is from about 78° C. to about 90° C., and the liquid-containing mixture comprises at least about 17.5% liquid by weight based on the total weight of the cooled recycle stream.

51. The continuous gas fluidized bed method of claim 45, wherein the monomers are ethylene and hexene-1, the controlled reactor bed temperature is from about 100° C. to about 110° C., and the liquid-containing mixture comprises at least about 20% liquid by weight based on the total weight of the cooled recycle stream.

52. The continuous gas fluidized bed method of claim 45, wherein the monomer is propylene.

53. The continuous gas fluidized bed method of claim 45, wherein the monomers are propylene and butene-1.

54. The continuous gas fluidized bed method of claim 36, wherein the difference between the controlled reactor bed temperature and the recycle stream dew point temperature of the mixture is greater than or equal to about 15° C.

55. The continuous gas fluidized bed method of claim 54, wherein the liquid-containing mixture comprises at least about 20% liquid by weight based on the total weight of the cooled recycle stream.

56. The continuous gas fluidized bed method of claim 54, wherein the liquid-containing mixture comprises at least about 21.8% liquid by weight based on the total weight of the cooled recycle stream.

57. The continuous gas fluidized bed method of claim 54, wherein the monomer is ethylene, the controlled reactor bed temperature is from about 100° C. to about 115° C., and the liquid-containing mixture comprises at least about 21.8% liquid by weight based on the total weight of the cooled recycle stream.

58. The continuous gas fluidized bed method of claim 54, wherein the monomers are ethylene and butene-1, the controlled reactor bed temperature is from about 80° C. to about 95° C., and the liquid-containing mixture comprises from about 17.5% to about 40% liquid by weight based on the total weight of the cooled recycle stream.

59. The continuous gas fluidized bed method of claim 54, wherein the monomers are ethylene and hexene-1, the controlled reactor bed temperature is from about 78° C. to about 90° C., and the liquid-containing mixture comprises at least about 17.5% liquid by weight based on the total weight of the cooled recycle stream.

60. The continuous gas fluidized bed method of claim 54, wherein the monomers are ethylene and hexene-1, the controlled reactor bed temperature is from about 100° C. to about 110° C., and the liquid-containing mixture comprises at least about 20% liquid by weight based on the total weight of the cooled recycle stream.

61. The continuous gas fluidized bed method of claim 54, wherein the monomer is propylene.

62. The continuous gas fluidized bed method of claim 54, wherein the monomers are propylene and butene-1.

63. A continuous gas fluidized bed method for making a polymer featuring a condensing agent in a recycle stream comprising:

continuously passing a gaseous stream comprising monomer and the condensing agent through a fluidized bed in a reaction zone having a controlled reactor bed temperature, a lower fluidized bed density, an upper fluidized bed density and a plurality of measuring site$_n$ temperatures, in the presence of catalyst;

withdrawing from the reaction zone polymer product and a stream comprising unreacted gases;

recycling the stream into the reaction zone with sufficient additional monomer to replace monomer polymerized and withdrawn as polymer product;

cooling the recycle stream to condense a portion thereof and form a liquid-containing mixture having a recycle stream dew point temperature, a reactor inlet temperature and comprising from about 17.5% to about 70% liquid by weight based on the total weight of the cooled recycle stream wherein the difference between the controlled reactor bed temperature and the recycle stream dew point temperature of the mixture is greater than or equal to about 5° C.; and introducing the mixture into the reaction zone wherein the liquid in the mixture is vaporized;

wherein, simultaneously, $\Delta\rho$ satisfies the condition 30 kg/m$^3 \leq \Delta\rho < 40$ kg/m$^3$ and at least a critical number of A$_n$ satisfy the condition $0.55 \leq A_n < 0.6$; and wherein $\Delta\rho$ is equal to the (lower fluidized bed density) minus the (upper fluidized bed density) and $$A_n = \frac{(\text{controlled reactor bed temperature}) - (\text{measuring site}_n \text{ temperature})}{(\text{controlled reactor bed temperature}) - (\text{reactor inlet temperature})}.$$

64. The continuous gas fluidized bed method of claim 63, wherein the monomer is ethylene, the controlled reactor bed temperature is from about 100° C. to about 115° C., and the liquid-containing mixture comprises at least about 21.8% liquid by weight based on the total weight of the cooled recycle stream.

65. The continuous gas fluidized bed method of claim 63, wherein the monomers are ethylene and butene-1, the controlled reactor bed temperature is from about 80° C. to about 95° C., and the liquid-containing mixture comprises from about 17.5% to about 40% liquid by weight based on the total weight of the cooled recycle stream.

66. The continuous gas fluidized bed method of claim 63, wherein the monomers are ethylene and hexene-1, the controlled reactor bed temperature is from about 78° C. to about 90° C., and the liquid-containing mixture comprises at least about 17.5% liquid by weight based on the total weight of the cooled recycle stream.

67. The continuous gas fluidized bed method of claim 63, wherein the monomers are ethylene and hexene-1, the controlled reactor bed temperature is from about 100° C. to about 110° C., and the liquid-containing mixture comprises at least about 20% liquid by weight based on the total weight of the cooled recycle stream.

68. The continuous gas fluidized bed method of claim 63, wherein the monomer is propylene.

69. The continuous gas fluidized bed method of claim 63, wherein the monomers are propylene and butene-1.

70. A continuous gas fluidized bed method for making a polymer featuring a condensing agent in a recycle stream comprising:

continuously passing a gaseous stream comprising monomer and the condensing agent through a fluidized bed in a reaction zone having a controlled reactor bed temperature, a lower fluidized bed density, an upper fluidized bed density and a plurality of measuring site$_n$ temperatures, in the presence of catalyst;

withdrawing from the reaction zone polymer product and a stream comprising unreacted gases;

recycling the stream into the reaction zone with sufficient additional monomer to replace monomer polymerized and withdrawn as polymer product;

cooling the recycle stream to condense a portion thereof and form a liquid-containing mixture having a recycle stream dew point temperature, a reactor inlet temperature and comprising from about 17.5% to about 70% liquid by weight based on the total weight of the cooled recycle stream wherein the difference between the controlled reactor bed temperature and the recycle stream dew point temperature of the mixture is greater than or equal to about 5° C.; and introducing the mixture into the reaction zone wherein the liquid in the mixture is vaporized;

wherein, simultaneously, $\Delta\rho$ satisfies the condition 40 kg/m$^3 \leq \Delta\rho <$ 50 kg/m$^3$ and at least a critical number of $A_n$ satisfy the condition $0.6 \leq A_n < 0.7$; and wherein $\Delta\rho$ is equal to the (lower fluidized bed density) minus the (upper fluidized bed density) and $$A_n = \frac{\text{(controlled reactor bed temperature)} - \text{(measuring site}_n \text{ temperature)}}{\text{(controlled reactor bed temperature)} - \text{(reactor inlet temperature)}}.$$

71. The continuous gas fluidized bed method of claim 70, wherein the monomer is ethylene, the controlled reactor bed temperature is from about 100° C. to about 115° C., and the liquid-containing mixture comprises at least about 21.8% liquid by weight based on the total weight of the cooled recycle stream.

72. The continuous gas fluidized bed method of claim 70, wherein the monomers are ethylene and butene-1, the controlled reactor bed temperature is from about 80° C. to about 95° C., and the liquid-containing mixture comprises from about 17.5% to about 40% liquid by weight based on the total weight of the cooled recycle stream.

73. The continuous gas fluidized bed method of claim 70, wherein the monomers are ethylene and hexene-1, the controlled reactor bed temperature is from about 78° C. to about 90° C., and the liquid-containing mixture comprises at least about 17.5% liquid by weight based on the total weight of the cooled recycle stream.

74. The continuous gas fluidized bed method of claim 70, wherein the monomers are ethylene and hexene-1, the controlled reactor bed temperature is from about 100° C. to about 110° C., and the liquid-containing mixture comprises at least about 20% liquid by weight based on the total weight of the cooled recycle stream.

75. The continuous gas fluidized bed method of claim 70, wherein the monomer is propylene.

76. The continuous gas fluidized bed method of claim 70, wherein the monomers are propylene and butene-1.

77. A continuous gas fluidized bed method for making a polymer featuring a condensing agent in a recycle stream comprising:

continuously passing a gaseous stream comprising monomer and the condensing agent through a fluidized bed in a reaction zone having a controlled reactor bed temperature, a lower fluidized bed density, an upper fluidized bed density and a plurality of measuring site$_n$ temperatures, in the presence of catalyst;

withdrawing from the reaction zone polymer product and a stream comprising unreacted gases;

recycling the stream into the reaction zone with sufficient additional monomer to replace monomer polymerized and withdrawn as polymer product;

cooling the recycle stream to condense a portion thereof and form a liquid-containing mixture having a recycle stream dew point temperature, a reactor inlet temperature and comprising from about 17.5% to about 70% liquid by weight based on the total weight of the cooled recycle stream wherein the difference between the controlled reactor bed temperature and the recycle stream dew point temperature of the mixture is greater than or equal to about 5° C.; and introducing the mixture into the reaction zone wherein the liquid in the mixture is vaporized;

wherein, simultaneously, $\Delta\rho$ satisfies the condition 50 kg/m$^3 \leq \Delta\rho <$ 70 kg/m$^3$ and at least a critical number of $A_n$ satisfy the condition $0.7 \leq A_n < 0.8$; and wherein $\Delta\rho$ is equal to the (lower fluidized bed density) minus the (upper fluidized bed density) and $$A_n = \frac{\text{(controlled reactor bed temperature)} - \text{(measuring site}_n \text{ temperature)}}{\text{(controlled reactor bed temperature)} - \text{(reactor inlet temperature)}}.$$

78. The continuous gas fluidized bed method of claim 77, wherein the monomer is ethylene, the controlled reactor bed temperature is from about 100° C. to about 115° C., and the liquid-containing mixture comprises at least about 21.80% liquid by weight based on the total weight of the cooled recycle stream.

79. The continuous gas fluidized bed method of claim 77, wherein the monomers are ethylene and butene-1, the controlled reactor bed temperature is from about 80° C. to about 95° C., and the liquid-containing mixture comprises from about 17.5% to about 40% liquid by weight based on the total weight of the cooled recycle stream.

80. The continuous gas fluidized bed method of claim 77, wherein the monomers are ethylene and hexene-1, the controlled reactor bed temperature is from about 78° C. to about 90° C., and the liquid-containing mixture comprises at least about 17.5% liquid by weight based on the total weight of the cooled recycle stream.

81. The continuous gas fluidized bed method of claim 77, wherein the monomers are ethylene and hexene-1, the controlled reactor bed temperature is from about 100° C. to about 110° C., and the liquid-containing mixture comprises at least about 20% liquid by weight based on the total weight of the cooled recycle stream.

82. The continuous gas fluidized bed method of claim 77, wherein the monomer is propylene.

83. The continuous gas fluidized bed method of claim 77, wherein the monomers are propylene and butene-1.

84. A continuous gas fluidized bed method for making a polymer featuring a condensing agent in a recycle stream comprising:

continuously passing a gaseous stream comprising monomer and the condensing agent through a fluidized bed in a reaction zone having a controlled reactor bed temperature, a lower fluidized bed density, an upper fluidized bed density and a plurality of measuring site$_n$ temperatures, in the presence of catalyst;

withdrawing from the reaction zone polymer product and a stream comprising unreacted gases;

recycling the stream into the reaction zone with sufficient additional monomer to replace monomer polymerized and withdrawn as polymer product;

cooling the recycle stream to condense a portion thereof and form a liquid-containing mixture having a recycle stream dew point temperature, a reactor inlet temperature and comprising from about 17.5% to about 70% liquid by weight based on the total weight of the cooled recycle stream wherein the difference between the controlled reactor bed temperature and the recycle stream dew point temperature of the mixture is greater than or equal to about 5° C.; and introducing the mixture into the reaction zone wherein the liquid in the mixture is vaporized;

wherein $\Delta\rho$ satisfies the condition $0 \text{ kg/m}^3 \leq \Delta\rho < 10 \text{ kg/m}^3$ and wherein $\Delta\rho$ is equal to the (lower fluidized bed density) minus the (upper fluidized bed density).

85. The continuous gas fluidized bed method of claim 84, wherein the monomer is ethylene, the controlled reactor bed temperature is from about 100° C. to about 115° C., and the liquid-containing mixture comprises at least about 21.8% liquid by weight based on the total weight of the cooled recycle stream.

86. The continuous gas fluidized bed method of claim 84, wherein the monomers are ethylene and butene-1, the controlled reactor bed temperature is from about 80° C. to about 95° C., and the liquid-containing mixture comprises from about 17.5% to about 40% liquid by weight based on the total weight of the cooled recycle stream.

87. The continuous gas fluidized bed method of claim 84, wherein the monomers are ethylene and hexene-1, the controlled reactor bed temperature is from about 78° C. to about 90° C., and the liquid-containing mixture comprises at least about 17.5% liquid by weight based on the total weight of the cooled recycle stream.

88. The continuous gas fluidized bed method of claim 84, wherein the monomers are ethylene and hexene-1, the controlled reactor bed temperature is from about 100° C. to about 110° C., and the liquid-containing mixture comprises at least about 20% liquid by weight based on the total weight of the cooled recycle stream.

89. The continuous gas fluidized bed method of claim 84, wherein the monomer is propylene.

90. The continuous gas fluidized bed method of claim 84, wherein the monomers are propylene and butene-1.

91. A continuous gas fluidized bed method for making a polymer featuring a condensing agent in a recycle stream comprising:

continuously passing a gaseous stream comprising monomer and the condensing agent through a fluidized bed in a reaction zone having a controlled reactor bed temperature, a lower fluidized bed density, an upper fluidized bed density and a plurality of measuring site$_n$ temperatures, in the presence of catalyst;

withdrawing from the reaction zone polymer product and a stream comprising unreacted gases;

recycling the stream into the reaction zone with sufficient additional monomer to replace monomer polymerized and withdrawn as polymer product;

cooling the recycle stream to condense a portion thereof and form a liquid-containing mixture having a recycle stream dew point temperature, a reactor inlet temperature and comprising from about 17.5% to about 70% liquid by weight based on the total weight of the cooled recycle stream wherein the difference between the controlled reactor bed temperature and the recycle stream dew point temperature of the mixture is greater than or equal to about 5° C.; and introducing the mixture into the reaction zone wherein the liquid in the mixture is vaporized;

wherein, simultaneously, $\Delta\rho$ satisfies the condition $10 \text{ kg/m}^3 \leq \Delta\rho < 70 \text{ kg/m}^3$ and at least a critical number of $A_n$ satisfy the condition $0.25 \leq A_n < 0.8$; and wherein $\Delta\rho$ is equal to the (lower fluidized bed density) minus the (upper fluidized bed density) and $$A_n = \frac{(\text{controlled reactor bed temperature}) - (\text{measuring site}_n \text{ temperature})}{(\text{controlled reactor bed temperature}) - (\text{reactor inlet temperature})}.$$

92. The continuous gas fluidized bed method of claim 91, wherein the monomer is ethylene, the controlled reactor bed temperature is from about 100° C. to about 115° C., and the liquid-containing mixture comprises at least about 21.8% liquid by weight based on the total weight of the cooled recycle stream.

93. The continuous gas fluidized bed method of claim 91, wherein the monomers are ethylene and butene-1, the controlled reactor bed temperature is from about 80° C. to about 95° C., and the liquid-containing mixture comprises from about 17.5% to about 40% liquid by weight based on the total weight of the cooled recycle stream.

94. The continuous gas fluidized bed method of claim 91, wherein the monomers are ethylene and hexene-1, the controlled reactor bed temperature is from about 78° C. to about 90° C., and the liquid-containing mixture comprises at least about 17.5% liquid by weight based on the total weight of the cooled recycle stream.

95. The continuous gas fluidized bed method of claim 91, wherein the monomers are ethylene and hexene-1, the controlled reactor bed temperature is from about 100° C. to about 110° C., and the liquid-containing mixture comprises at least about 20% liquid by weight based on the total weight of the cooled recycle stream.

96. The continuous gas fluidized bed method of claim 91, wherein the monomer is propylene.

97. The continuous gas fluidized bed method of claim 91, wherein the monomers are propylene and butene-1.

98. A method for monitoring and providing continuity in a continuous gas fluidized bed method for making a polymer featuring a condensing agent in a recycle stream comprising:

monitoring the fluidized bed reaction zone, wherein the reaction zone has a controlled reactor bed temperature, a lower fluidized bed density, an upper fluidized bed density and a plurality of measuring site$_n$ temperatures;

monitoring the recycle stream into the reaction zone wherein the stream has a reactor inlet temperature;

determining $\Delta\rho$ and comparing $\Delta\rho$ to at least one limit, wherein $\Delta\rho$ is equal to the (lower fluidized bed density) minus the (upper fluidized bed density); and when $\Delta\rho \geq 10 \text{ kg/m}^3$, determining a plurality of $A_n$ and comparing each $A_n$ to a lower value and an upper value, wherein $$A_n = \frac{(\text{controlled reactor bed temperature}) - (\text{measuring site}_n \text{ temperature})}{(\text{controlled reactor bed temperature}) - (\text{reactor inlet temperature})}.$$

99. The method of claim 98, wherein there are 4 measuring site$_n$ temperatures.

100. The method of claim 98, wherein there are 16 measuring site$_n$ temperatures.

* * * * *

UNITED STATES PATENT AND TRADEMARK OFFICE
CERTIFICATE OF CORRECTION

PATENT NO. : 6,759,489 B1
DATED : July 6, 2004
INVENTOR(S) : Nabil M. Turkistani It is certified that error appears in the above-identified patent and that said Letters Patent is hereby corrected as shown below:

<u>Title page,</u>
Item [74], *Attorney, Agent, or Firm*, please change "Jones Day" to
-- Gidon D. Stern
   George A. Senich --

Signed and Sealed this

Twenty-first Day of June, 2005

JON W. DUDAS
*Director of the United States Patent and Trademark Office*